United States Patent
Eiriksson et al.

(10) Patent No.: US 7,831,745 B1
(45) Date of Patent: Nov. 9, 2010

(54) SCALABLE DIRECT MEMORY ACCESS USING VALIDATION OF HOST AND SCATTER GATHER ENGINE (SGE) GENERATION INDICATIONS

(75) Inventors: Asgeir Thor Eiriksson, Sunnyvale, CA (US); Shenze Chen, Cupertino, CA (US); Patricio Fernando Kaplan, Palo Alto, CA (US); George E. Smith, Lancaster, PA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 676 days.

(21) Appl. No.: 11/137,140

(22) Filed: May 24, 2005

Related U.S. Application Data

(60) Provisional application No. 60/574,422, filed on May 25, 2004.

(51) Int. Cl.
*G06F 13/28* (2006.01)
(52) U.S. Cl. ...................................................... 710/22
(58) Field of Classification Search ................... 710/22
See application file for complete search history.

(56) References Cited

U.S. PATENT DOCUMENTS

| | | | |
|---|---|---|---|
| 4,445,116 A | 4/1984 | Grow | |
| 4,533,996 A * | 8/1985 | Hartung et al. ................ | 710/3 |
| 5,497,476 A | 3/1996 | Oldfield et al. | |
| 5,778,189 A | 7/1998 | Kimura et al. | |
| 6,087,581 A * | 7/2000 | Emmer et al. ............. | 174/17 R |
| 6,226,680 B1 | 5/2001 | Boucher et al. ............. | 709/230 |
| 6,240,094 B1 | 5/2001 | Schneider | |
| 6,247,060 B1 | 6/2001 | Boucher et al. ............. | 709/238 |
| 6,334,153 B2 | 12/2001 | Boucher et al. ............. | 709/230 |
| 6,389,479 B1 | 5/2002 | Boucher et al. ............. | 709/243 |
| 6,393,487 B2 | 5/2002 | Boucher et al. ............. | 709/238 |
| 6,397,316 B2 | 5/2002 | Fesas, Jr. | |
| 6,401,177 B1 | 6/2002 | Koike | |
| 6,427,171 B1 | 7/2002 | Craft et al. .................. | 709/230 |
| 6,427,173 B1 | 7/2002 | Boucher et al. ............. | 709/238 |
| 6,434,620 B1 | 8/2002 | Boucher et al. ............. | 709/230 |
| 6,470,415 B1 | 10/2002 | Starr et al. .................. | 711/104 |
| 6,510,164 B1 | 1/2003 | Ramaswamy et al. | |
| 6,591,302 B2 | 7/2003 | Boucher et al. ............. | 709/230 |
| 6,594,268 B1 | 7/2003 | Aukia et al. | |

(Continued)

OTHER PUBLICATIONS

Clark et al., "*An Analysis of TCP Processing Overhead*," IEEE Communications Magazine, Jun. 1989, pp. 23-29.

(Continued)

*Primary Examiner*—Alford W Kindred
*Assistant Examiner*—Brooke J Dews
(74) *Attorney, Agent, or Firm*—Beyer Law Group LLP

(57) ABSTRACT

A host station and a scatter gather engine (SGE) station communicate with each other. In the host station, a host generation indication is maintained. In the SGE station, an SGE generation indication is maintained. Information, including the host generation indication maintained in the host station, is written into an entry of a data structure in a memory associated with the host station. In the SGE station, information is received from each of at least one of the entries of the data structure. The received information is processed, including comparing the SGE generation indication maintained in the SGE station to the host generation indication in the entry to determine whether the information in that entry includes valid information.

46 Claims, 26 Drawing Sheets

U.S. PATENT DOCUMENTS

| | | | |
|---|---|---|---|
| 6,625,671 B1 | 9/2003 | Collette et al. | |
| 6,658,480 B2 | 12/2003 | Boucher et al. | 709/239 |
| 6,681,244 B1 | 1/2004 | Cross et al. | |
| 6,687,758 B2 | 2/2004 | Craft et al. | 709/250 |
| 6,697,868 B2 | 2/2004 | Craft et al. | 709/230 |
| 6,708,223 B1* | 3/2004 | Wang et al. | 719/315 |
| 6,708,232 B2 | 3/2004 | Obara | |
| 6,717,946 B1 | 4/2004 | Hariguchi et al. | |
| 6,751,665 B2 | 6/2004 | Philbrick et al. | 709/224 |
| 6,757,245 B1 | 6/2004 | Kuusinen et al. | |
| 6,757,746 B2 | 6/2004 | Boucher et al. | 709/250 |
| 6,798,743 B1 | 9/2004 | Ma et al. | |
| 6,807,581 B1* | 10/2004 | Starr et al. | 709/250 |
| 6,813,652 B2* | 11/2004 | Stadler et al. | 710/22 |
| 6,862,648 B2 | 3/2005 | Yatziv | |
| 6,941,386 B2 | 9/2005 | Craft et al. | 709/250 |
| 7,031,267 B2 | 4/2006 | Krumel | |
| 7,093,099 B2 | 8/2006 | Bodas et al. | |
| 7,114,096 B2 | 9/2006 | Freimuth et al. | |
| 7,133,902 B2* | 11/2006 | Saha et al. | 709/212 |
| 7,133,914 B1 | 11/2006 | Holbrook | |
| 7,191,318 B2 | 3/2007 | Tripathy et al. | |
| 7,239,642 B1 | 7/2007 | Chinn et al. | |
| 7,254,637 B2 | 8/2007 | Pinkerton et al. | |
| 7,260,631 B1* | 8/2007 | Johnson et al. | 709/224 |
| 7,284,047 B2 | 10/2007 | Barham et al. | |
| 7,313,623 B2 | 12/2007 | Elzur et al. | |
| 7,376,147 B2 | 5/2008 | Seto et al. | |
| 7,408,906 B2 | 8/2008 | Griswold et al. | |
| 2001/0010046 A1* | 7/2001 | Muyres et al. | 705/52 |
| 2001/0021949 A1 | 9/2001 | Blightman et al. | 709/219 |
| 2001/0036196 A1 | 11/2001 | Blightman et al. | 370/465 |
| 2001/0037406 A1 | 11/2001 | Philbrick et al. | 709/250 |
| 2002/0039366 A1 | 4/2002 | Sano | |
| 2002/0087732 A1 | 7/2002 | Boucher et al. | 709/250 |
| 2002/0091844 A1 | 7/2002 | Craft et al. | 709/230 |
| 2002/0095519 A1 | 7/2002 | Philbrick et al. | 709/250 |
| 2002/0156927 A1 | 10/2002 | Boucher et al. | 709/250 |
| 2002/0161919 A1 | 10/2002 | Boucher et al. | 709/238 |
| 2003/0018516 A1* | 1/2003 | Ayala et al. | 705/10 |
| 2003/0035436 A1 | 2/2003 | Denecheau et al. | |
| 2003/0140124 A1 | 7/2003 | Burns | 709/220 |
| 2003/0200284 A1 | 10/2003 | Philbrick et al. | 709/219 |
| 2004/0003094 A1 | 1/2004 | See | |
| 2004/0003126 A1 | 1/2004 | Boucher et al. | 709/250 |
| 2004/0030745 A1 | 2/2004 | Boucher et al. | 709/203 |
| 2004/0054813 A1 | 3/2004 | Boucher et al. | 709/250 |
| 2004/0062245 A1 | 4/2004 | Sharp et al. | 370/392 |
| 2004/0062246 A1 | 4/2004 | Boucher et al. | 370/392 |
| 2004/0064578 A1 | 4/2004 | Boucher et al. | 709/236 |
| 2004/0064589 A1 | 4/2004 | Boucher et al. | 709/250 |
| 2004/0064590 A1 | 4/2004 | Starr et al. | 709/250 |
| 2004/0073703 A1 | 4/2004 | Boucher et al. | 709/245 |
| 2004/0078480 A1 | 4/2004 | Boucher et al. | 709/237 |
| 2004/0088262 A1 | 5/2004 | Boucher et al. | 705/65 |
| 2004/0100952 A1 | 5/2004 | Boucher et al. | 370/389 |
| 2004/0111535 A1 | 6/2004 | Boucher et al. | 709/250 |
| 2004/0117509 A1 | 6/2004 | Craft et al. | 709/250 |
| 2004/0158640 A1 | 8/2004 | Philbrick et al. | 709/230 |
| 2004/0165592 A1 | 8/2004 | Chen et al. | |
| 2004/1058793 | 8/2004 | Blightman et al. | 714/758 |
| 2004/0190533 A1 | 9/2004 | Modi et al. | |
| 2004/0199808 A1* | 10/2004 | Freimuth et al. | 714/4 |
| 2004/0213235 A1 | 10/2004 | Marshall et al. | |
| 2004/0240435 A1 | 12/2004 | Craft et al. | 709/250 |
| 2005/0071490 A1 | 3/2005 | Craft et al. | 709/230 |
| 2005/0120037 A1 | 6/2005 | Maruyama et al. | |
| 2005/0122986 A1 | 6/2005 | Starr et al. | 370/412 |
| 2005/0135378 A1 | 6/2005 | Rabie et al. | |
| 2005/0135412 A1 | 6/2005 | Fan | |
| 2005/0147126 A1 | 7/2005 | Qiu et al. | |
| 2005/0190787 A1 | 9/2005 | Kuik et al. | |
| 2005/0216597 A1 | 9/2005 | Shah et al. | |
| 2005/0259678 A1 | 11/2005 | Gaur | |
| 2005/0289246 A1 | 12/2005 | Easton et al. | |
| 2006/0039413 A1 | 2/2006 | Nakajima et al. | |
| 2006/0080733 A1 | 4/2006 | Khosmood et al. | |
| 2006/0133267 A1 | 6/2006 | Alex et al. | |
| 2006/0206300 A1 | 9/2006 | Garg et al. | |
| 2006/0209693 A1 | 9/2006 | Davari et al. | |
| 2006/0221946 A1 | 10/2006 | Shalev et al. | |
| 2006/0281451 A1 | 12/2006 | Zur | |
| 2007/0064737 A1 | 3/2007 | Williams | |
| 2007/0110436 A1 | 5/2007 | Bennett | |
| 2008/0002731 A1 | 1/2008 | Tripathy et al. | |
| 2008/0232386 A1 | 9/2008 | Gorti et al. | |

OTHER PUBLICATIONS

Woodside et al., "*The Protocol Bypass Concept for High Speed OSI Data Transfer,*" Research Paper. Available at:http://citeseer.ist.psu.edu/cache/papers/cs/26104/http:zSzzSzwww.sce.carleton.cazSzftpzSzpubzSzcmwzSzbpjan90.pdf/woodside90protocol.pdf.

Rütsche et al., "*TCP/IP on the Parallel Protocol Engine,*" High Performace Networking, (IV, C-14), Elsevier Science Publishers, B.V. North Holland 1993.

Thia et al., "*High-Speed OSI Protocol Bypass Algorithm with Window Flow Control,*" IFIP WG6.4 Third International Workshop on Protocols for High-Speed Networks, Stockholm, Sweden, May 13-15, 1992, pp. 53-68.

Thia et al., "*A Reduced Operation Protocol Engine (ROPE) for a Multiple-Layer Bypass Architecture,*" Protocols for High-Speed Networks IV, 4th IFIP International Workshop, Aug. 10-12, 1994, Vancouver, B.C., Canada, pp. 224-239.

Rütsche et al., "*Architectures of Multimedia Communication Subsystems,*" IFIP Transactions; vol. C-23 archive, Proceedings of the IFIP TC6 International Conference on Information Networks and Data Communication table of contents, pp. 217-230, Year of Publication: 1994.

Dalton et al., "*Afterburner: Architectural Support for High-Performance Protocols,*" http://www.hpl.hp.com/techreports/93/HPL-93-46.pdf, Jul. 1993, 18 pages.

TRM Technologies, Inc., "*L4/L7 Switching,*" Downloaded from http://www.trm.ca/pages/t-tech7.html on Feb. 16, 2006, 3 pages.

Madsen et al., "*Wireless Data Communication,*" Fall 2003 Presentation, Wireless Networks Division (WING), Allborg University.

Yocum et al., "*Anypoint: Extensible Transport Switching on the Edge,*" Proceedings of the 4th USENIX Symposium on Internet Technologies and Systems, Mar. 26-28, 2003, Seattle, WA, USA.

International Search Report in PCT/US02/12679, dated Jul. 23, 2002.

Office Action in U.S. Appl. No. 10/474,500, mailed Oct. 4, 2007.

Office Action in U.S. Appl. No. 11/137,146, mailed Mar. 5, 2008.

Office Action in U.S. Appl. No. 11/250,894, mailed Jun. 26, 2008.

Notice of Allowance in U.S. Appl. No. 10/474,500, mailed Jul. 1, 2008.

Allowed Claims from U.S. Appl. No. 10/474,500.

Office Action in U.S. Appl. No. 11/217,661, mailed Sep. 18, 2008.

Office Action in U.S. Appl. No. 11/313,003, mailed Aug. 22, 2008.

Office Action in U.S. Appl. No. 11/330,898, mailed Oct. 8, 2008.

Office Action in U.S. Appl. No. 11/137,146, mailed Nov. 3, 2008.

Office Action in U.S. Appl. No. 11/356,850 mailed Dec. 3, 2008.

U.S. Appl. No. 60/690,465, filed Jun. 14, 2005.

U.S. Appl. No. 60/718,418, filed Sep. 19, 2005.

Office Action in U.S. Appl. No. 11/282,933 mailed Feb. 20, 2009.

Office Action in U.S. Appl. No. 11/250,894 mailed Jan. 26, 2009.

Office Action in U.S. Appl. No. 11/130,898 mailed Apr. 2, 2009.

Office Action in U.S. Appl. No. 11/747,790 mailed May 12, 2009.

\* cited by examiner

SCALABLE DIRECT MEMORY ACCESS USING VALIDATION OF HOST AND SCATTER GATHER ENGINE (SGE) GENERATION INDICATIONS

CROSS REFERENCE TO RELATED APPLICATIONS

This application claims priority under 35 USC §119 to U.S. Provisional Patent Application No. 60/574,422, filed May 25, 2004, entitled "IMPLEMENTING DIRECT MEMORY ACCESS AND A MESSAGE PASSING PROTOCOL TO INTERFACE WITH, AND TO CONTROL A TCP/IP OFF-LOAD ENGINE" which is incorporated herein by reference for all purposes. This application is also related to U.S. patent application Ser. No. 11/137,146 filed concurrently herewith, entitled "IMPLEMENTING A MESSAGE PASSING PROTOCOL TO INTERFACE, AND TO CONTROL AN OFF-LOAD ENGINE".

TECHNICAL FIELD

The present patent application relates to a method and apparatus to implement Direct Memory Access (DMA) between a host computer and a Network Interface Card (NIC), and a method to encapsulate a message passing control protocol (CPL) on top of the DMA mechanism that controls the operation of a Host Bus Adapter (HBA). The HBA optionally implements TCP/IP protocol offload (TOE) in addition to the regular TCP/IP NIC function. The DMA method is scalable to a large number of queue pair (QP) host end points. The CPL has the characteristics of low header overhead, and that control messages are ordered end-to-end with respect to the data moving messages. The ordering attribute is useful to implement well defined ordering rules among the different CPL messages.

BACKGROUND

Direct memory access (DMA) is a method typically used to transfer large amounts of data between a host central processing unit (CPU) and a DMA input/output (I/O) device. Briefly, the host CPU provides the DMA I/O device with information about where to place (for input) or from where to fetch (for output) data from the host memory such that the I/O device can independently perform the data transfer operation. As a result of the I/O device independently performing the I/O operation, the host CPU is relieved of handling much of the processing associated with the I/O operation.

The information about where to place or from where to fetch, among other information describing and/or controlling the to-be-performed data transfer, is known as independently performing the I/O operation, the host CPU is relieved of handling much of the processing associated with the I/O operation.

The information about where to place or from where to fetch, among other information describing and/or controlling the to-be-performed data transfer, is known as "overhead information", and the overhead information is transferred from the host CPU to the I/O device as part of the data transfer. For example, the volume of data to be transferred may be so large that it does not fit contiguously into the host memory. In this case, different regions of the host memory may be utilized and the locations of these different regions are conveyed to the I/O device in the transfer of overhead information from the host CPU. The host CPU typically is informed of the arrival DMA data through status information on a pre-determined status page in host memory.

The information exchanged in the DMA transfer between the host CPU and I/O device includes network packets, status information or free-list information. The network packets are transferred from the host using host network send packet buffers, and are transferred to the host using network receive packet buffers. The network receive packet buffers include a global anonymous pool of buffers referred to as free-list buffers, and also tagged pool buffers. Finally, status information from the I/O device to the CPU device is usually implemented using a pre-determined location in CPU memory. The I/O device writes to this status location to inform the CPU about progress in carrying out the CPU requested DMA operations, and informs the CPU about packets that the I/O device has written to the CPU memory.

SUMMARY

The CPU and I/O device communicate using a message passing protocol (CPL) that is layered on top of a DMA transfer mechanism. The DMA transfer mechanism is scalable to many CPU endpoints in that it does not require the CPU to read status descriptors to determine the progress of the I/O device in carrying out DMA instructions it has received from the CPU, and to inform the CPU of DMA transfers the I/O device has made to the CPU memory. Instead, a generation-bit mechanism is employed to make the validity of response queue entries self describing.

DETAILED DESCRIPTION

Theory of Operation

The CPL Control/Data Plane Protocol

Figure 4:
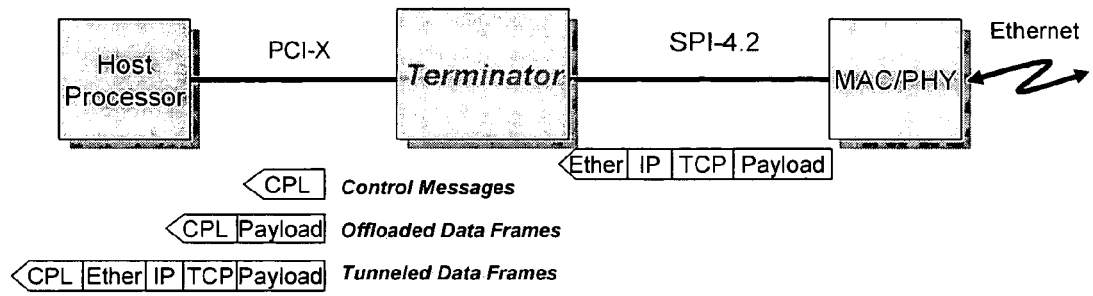
FIG. 4 illustrates another method of overlaying a messaging passing control protocol (CPL) over a DMA communication mechanism.

Terminator and the host/control plane processor communicate via a protocol called CPL (Chelsio Protocol Language) that encompasses both control and data path operations. Terminator and the Host communicate with CPL control messages and CPL-encapsulated packets, as shown in the Host Bus Adapter-like configuration in FIG. 4, including host commands to Terminator, Terminator's responses to the host, and both TX and RX data. CPL encapsulates both offloaded data frames, for which Terminator does the TCP/IP termination, and tunneled (non-offloaded) data frames, for which the host processor does the termination.

CPL's Control Plane Commands:
  Setup/teardown TCP connections
  Control connection attributes
  Manage flow control
  Manage direct placement buffers.

CPL's Data Plane Commands:
  Encapsulate offloaded TCP payloads for transfer between the core (i.e. host) and Terminator
  Encapsulate non-offloaded, tunneled packets
  Signal the transfer of data that Terminator has placed directly in core memory space using DMA, for connections that use this option.

Figure 5:
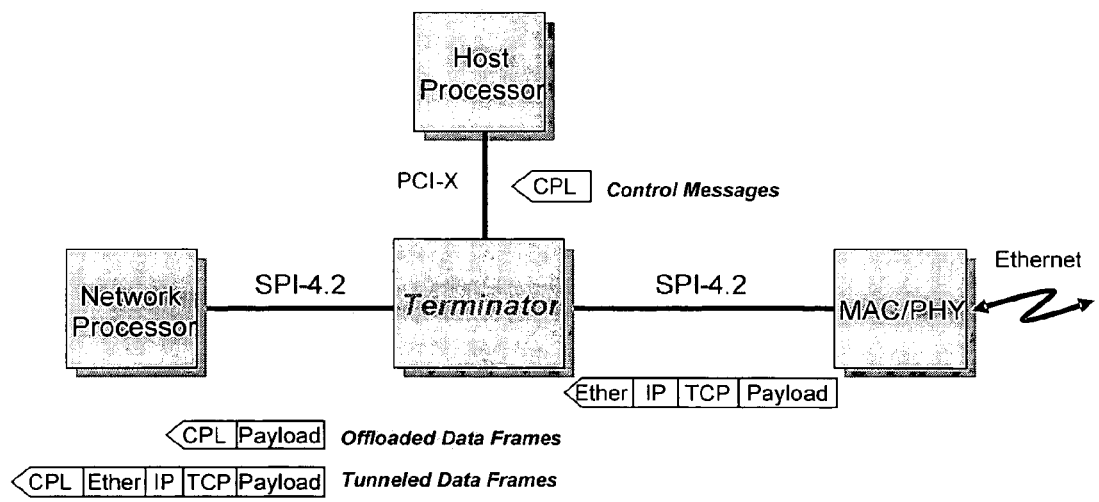
FIG. 5 illustrates another method of overlaying CPL over a DMA communication mechanism.

Terminator design can have different paths for the control and data planes, as shown in FIG. 5.

A summary of CPL message types is described in Table 1. Detailed CPL specifications appear in Section.

TABLE 1

CPL Message Categories

| Message Category | Description |
| --- | --- |
| Passive Open Support for Connections | Supports posted listening servers on Terminator. The control plane configures listening servers. |
| Active Open Support for Connections | Supports the establishment of TCP connections to remote peers. |
| Connection Control and Status | Supports the control of global and per connection attributes for offloaded TCP connections. Also supports connection status information. |
| Connection Close and Abort | Supports the teardown of offloaded TCP connections and posted listening servers. |
| Tunneled Frames | Transfers non-offloaded data (e.g. non-TCP traffic). |
| Offloaded TCP Payload | Transfers TCP payload data for offloaded connections. |
| Direct Data Placement for payload | For direct placement of data into the host (TCP payload, RDMA payload, and iSCSI payload). |
| Routing and ARP | Supports the configuration of routing and ARP mechanisms on Terminator. |
| Administration | For administrative tasks, such as read/reset MIB counters, etc. |

For an HBA implementation (e.g. the T101 PCI-X card), the Core might correspond to a PCI-X HBA host device driver and accompanying protocol support (e.g. socket layer).

Figure 6:
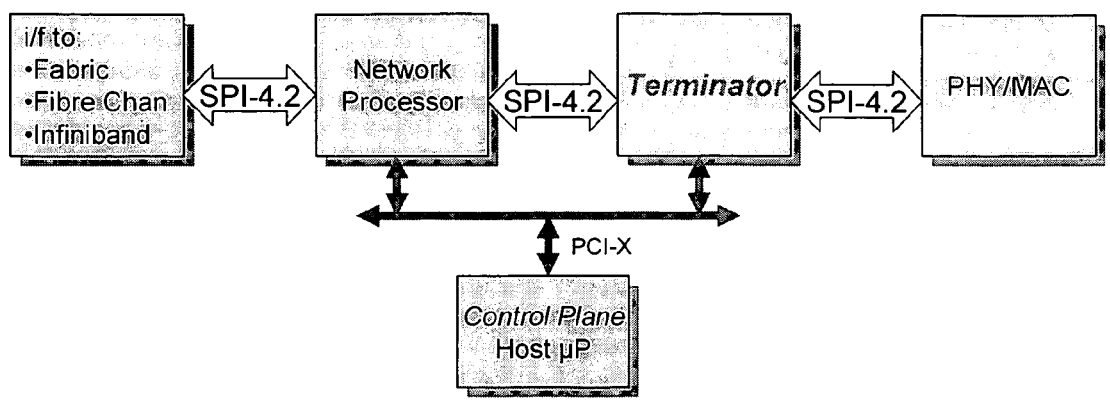
FIG. 6 illustrates the use of CPL in an intermediate system application.

In an intermediate system, the Core could be an NPU connected to Terminator via SPI-4.2 interface and a control plane processor connected to Terminator via PCI bus, as shown in FIG. 6.

One element carried in CPL messages for both the control and data planes is the Connection ID called tid, that Terminator assigns and returns to the core. After connection set up, its tid is the reference that the core and Terminator use to identify a connection. The control plane maintains a connection table that binds the TCP 4-tuples (comprising the IP address and port or process number for sender and receiver) and their associated tids.

CPL in an HBA Configuration

In an end-system such as an HBA, Terminator integrates into a networking stack, and CPL acts as a handshake protocol between the Terminator TOE and the host TCP stack. Examples of CPL operations include:

The host uses CPL to create a socket on Terminator in the listen state, and the Terminator in turn uses CPL to send an acknowledge message to the host when the socket is successfully created.

For a connection request coming in from the network, Terminator uses CPL to tell the host stack about the connection request, and the host stack in turn responds with a CPL message that tells Terminator whether the connection request is granted, and if it is, whether the TCP connection is to be offloaded to Terminator or handled by the host stack.

CPL is also used in transferring data (both offloaded and non-offloaded) between the host and Terminator.

In case of a PCI-X HBA, CPL is used to 1) passively open TCP connections, 2) actively open TCP connections, 3) pass peer close TCP connections request to control plane, 4) request the close of TCP connections, 5) post per connection direct placement receive buffers, 6) manage flow control between the host and Terminator, 7) signal the transfer of directly placed data, and 8) encapsulate the transfer of both offloaded and non-offloaded data between the host and Terminator.

CPL in an Intermediate System Configuration

An intermediate system sits between two end systems, such as a client and server. Typical examples include L4-L7 web switches, IP-to-FC (Fibre Channel) gateways, and IP-to-IB (InfiniBand) gateways, etc.

FIG. 6 shows an intermediate system block diagram using Terminator. In this case, Terminator will terminate TCP connections and deliver reliable byte streams to an NPU (network processor unit). The NPU will then formulate new frames with the data bytes and deliver them to the output interfaces (whether it be switch fabric, Fibre Channel, or InfiniBand, etc).

In this type of intermediate system, the control plane is responsible for control of when (and how) to set up and tear down a TCP connection in Terminator, handle ARP and ICMP packets, and perform network administration tasks, such as SNMP, etc. Control plane CPL messages can be delivered between control plane and Terminator either across the PCI-X bus or the SPI-4 interface to the NPU. The data path between Terminator and NPU crosses the SPI-4.2 interface, and the data flows from Terminator through NPU towards switch fabric or FC/IB interface.

All data segments between Terminator and NPU are encapsulated with CPL headers. It is the NPU's responsibility to recognize the CPL header, remove the header, encapsulate the data payload into other appropriate format, and deliver to the switch fabric or FC/IB interfaces.

The NPU might have certain buffer capability for speed match or traffic management. Depending on the design, NPU may have limited buffer space available, so a credit based flow control is used between Terminator and NPU wherein Terminator can send data to NPU only if it has enough appropriate credits.

There is a special scenario: Terminator finished the connection set up 3-way handshake and is to inform control plane of the ESTABLISHED state. At the same time, Terminator already received data from remote peer on this connection, which is to be delivered over the data path to the NPU. This scenario is handled carefully to avoid any data loss. There are several choices available to intermediate system designers (for definitions of CPL messages mentioned below, please refer to later discussion for details):

Design 1:
Typically, when control plane is informed that a new connection moved to ESTABLISHED state, it needs to provide enough info (such as tid) to NPU so that NPU knows what to do with follow up data received in CPL_RX_DATA message. If NPU got a CPL_RX_DATA message but doesn't recognize the tid (not informed by control plane yet), NPU might drop it. So the right sequence should be:
1. Terminator sends CPL_PASS_ESTABLISH to control plane via PCI-X
2. Control plane sets necessary state info for this connection in NPU 3. NPU sends CPL_RX_DATA_ACK to Terminator via SPI-4 that informs NPU is ready to receive data with specified buffer space.
4. Terminator sends CPL_RX_DATA with payload to NPU over SPI-4.

Design 2:
5. TP sends CPL_PASS_ESTABLISH followed by CPL_RX_DATA with payload to NPU via SPI-4.
6. NPU sees this and knows this is a new connection. It buffers the data and forwards the CPL_PASS_ESTABLISH header to control plane.
7. Control plane establishes necessary state info and sends back to NPU.
8. Now NPU knows how to deal with the data in its buffer.

Design 3:
1. Terminator sends the CPL_PASS_ESTABLISH followed by a CPL_RX_DATA with payload data to control plane via PCI-X. (Actually, for load balancer, the first client packet that carries HTTP request does send to control plane for analysis).
2. Control plane establishes necessary state info and sends it to NPU, along with the data.
3. NPU sets up state and sends RX_DATA_ACK to Terminator over SPI-4 that carries receive buffer credits for future data.

Designs 2 and 3 may not operate properly if NPU runs out of receive buffer. In this case, the 'reliable bytes' are dropped and cannot be recovered. So NPU has enough 'reserved' buffers for this purpose. After this first payload, follow up data from Terminator to NPU will be flow-controlled by RX_DATA_ACK.

Connection Management

Passive Open/Listening Servers

Figure 7:
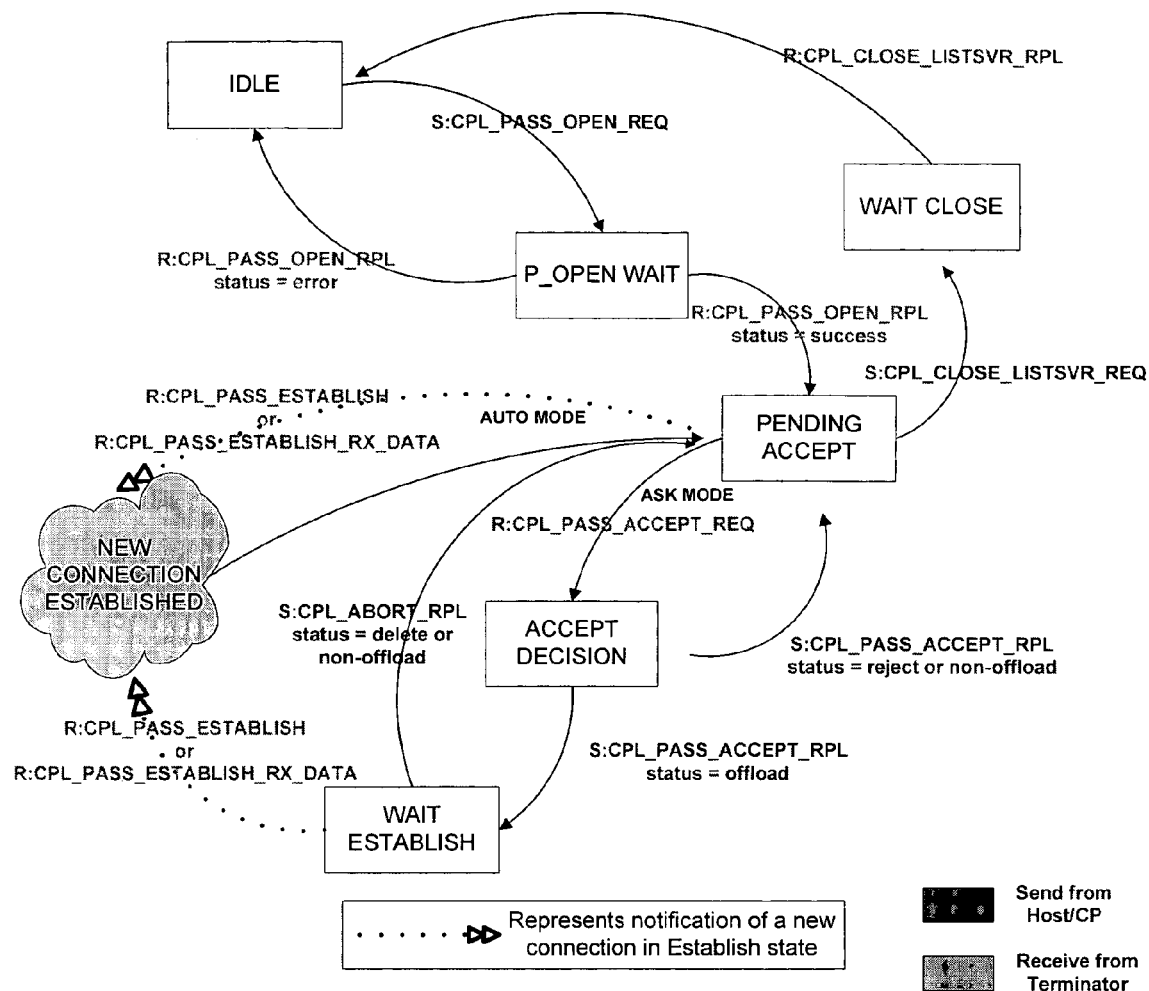
FIG. 7 illustrates the process for creating listening servers and connections based on those servers.

FIG. 7 illustrates the process for creating listening servers and connections based on those servers. Items prepended by S: represent commands from the host to Terminator. Items by R: are commands sent by Terminator to the host. Some states illustrated correspond to the state of the listening server at various stages in its lifecycle (IDLE, P_OPEN WAIT, PENDING ACCEPT, and WAIT CLOSE). Other states in the diagram show the handling of a candidate connection based on the listening server in PENDING ACCEPT state. Note that multiple candidate connections can be pending at any given time (all in various states). NEW CONNECTION ESTABLISHED is not a state per se for a candidate connection, but represents a new connection being successfully spawned from the listening server (see FIG. 14 for the state machine corresponding to the resulting offloaded connection). The creation of a new connection (i.e. the candidate connection logic) depends on the permission mode of the listening server (defined in CPL_PASS_OPEN_REQ), as well as TCP protocol transactions between the listening server and the network (e.g. the 3-way handshake).

The ladder diagrams of FIGS. 8 to 29 show typical paths through the passive open mechanism, showing the relationship between the host and TCP protocol transactions.

Figure 8:
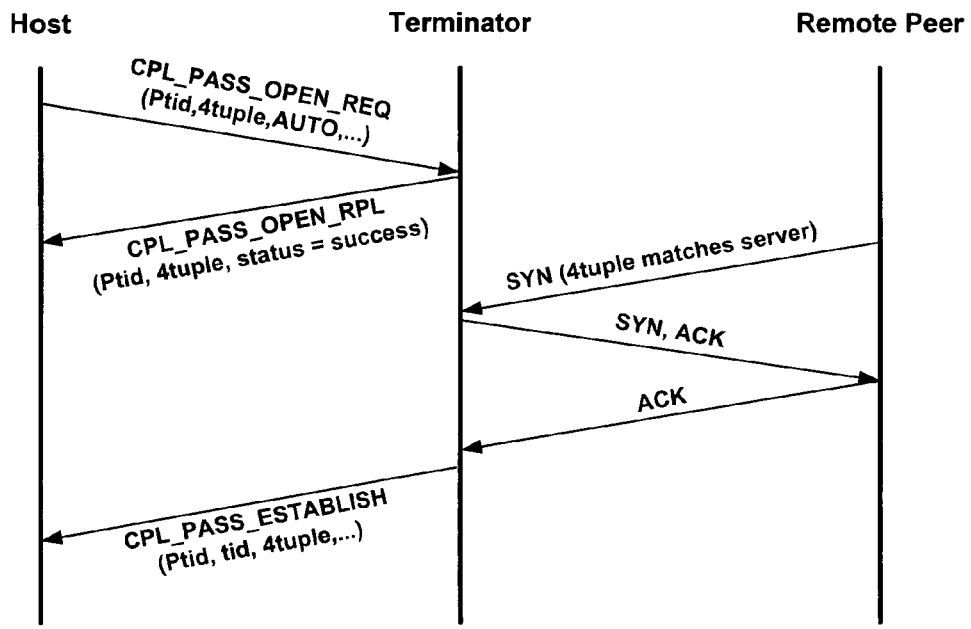
FIG. 8 shows a listening server being created, followed by the establishment of a connection with a remote peer.

FIG. 8 shows a listening server being created, followed by the establishment of a connection with a remote peer. In this example, the listening server is created in AUTO mode, so Terminator completes the 3-way handshake with the remote peer without involving the host/control plane. The example shown is of a remote peer connecting with 4-tuple attributes matching the listening server. In this case Terminator creates a new offloaded connection, and sends the establishment notification to the host.

Figure 9:
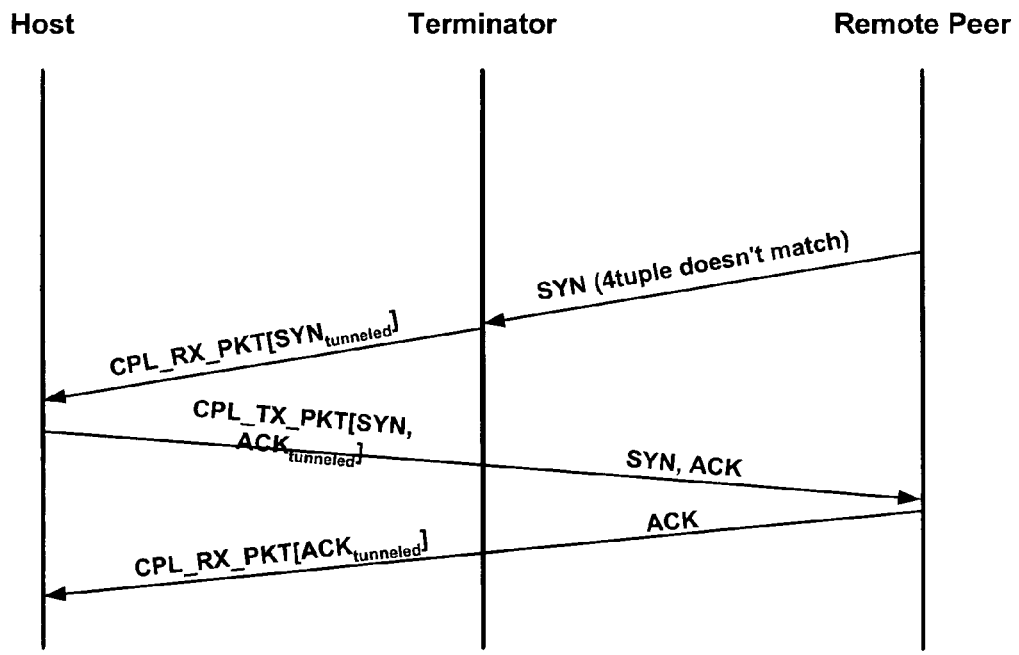
FIG. 9 shows a case in which a remote peer connection does not match on any listening server entry (e.g. incorrect destination port or IP).

FIG. 9 shows a case in which a remote peer connection does not match on any listening server entry (e.g. incorrect destination port or IP). In this case the SYN segment and all later segments for the connection are instead tunneled to and from the host via CPL_RX_PKT and CPL_TX_PKT.

Figure 10:
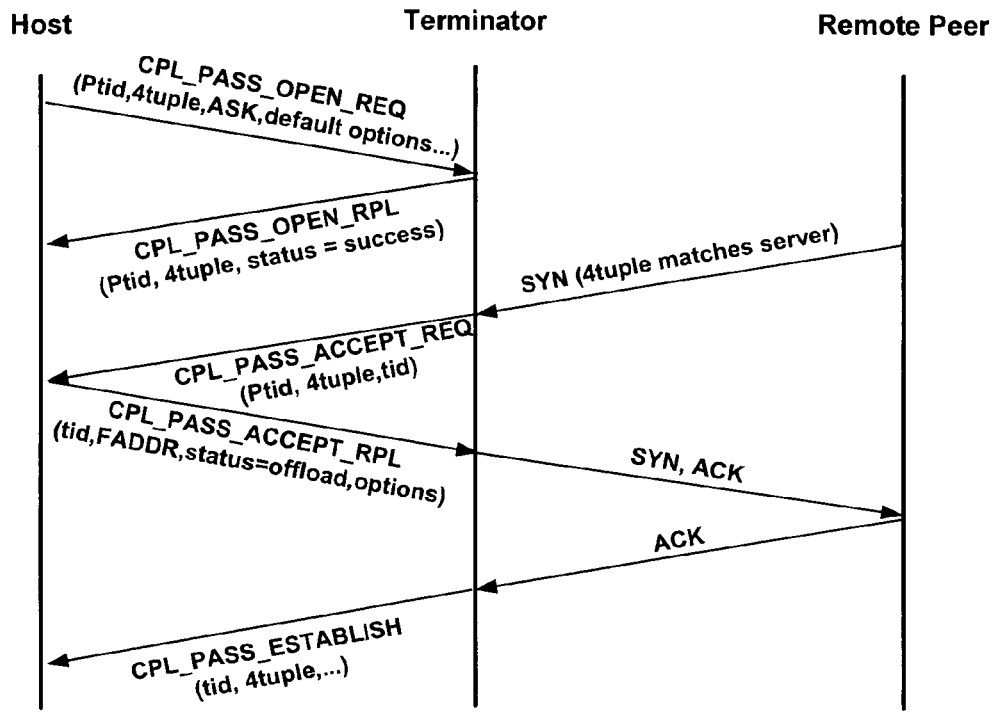
FIG. 10 shows a listening server being created, followed by the establishment of a connection with a remote peer.

FIG. 10 shows a listening server being created, followed by the establishment of a connection with a remote peer. In this example, the listening server is created in ASK mode, so Terminator first asks the host if it is okay to establish the connection. The host responds by telling Terminator to accept the connection as an offloaded connection. Terminator then sends the SYN/ACK, the remote peer sends the ACK, Terminator creates a new offloaded connection, and sends the establish notification to the host.

Figure 11:
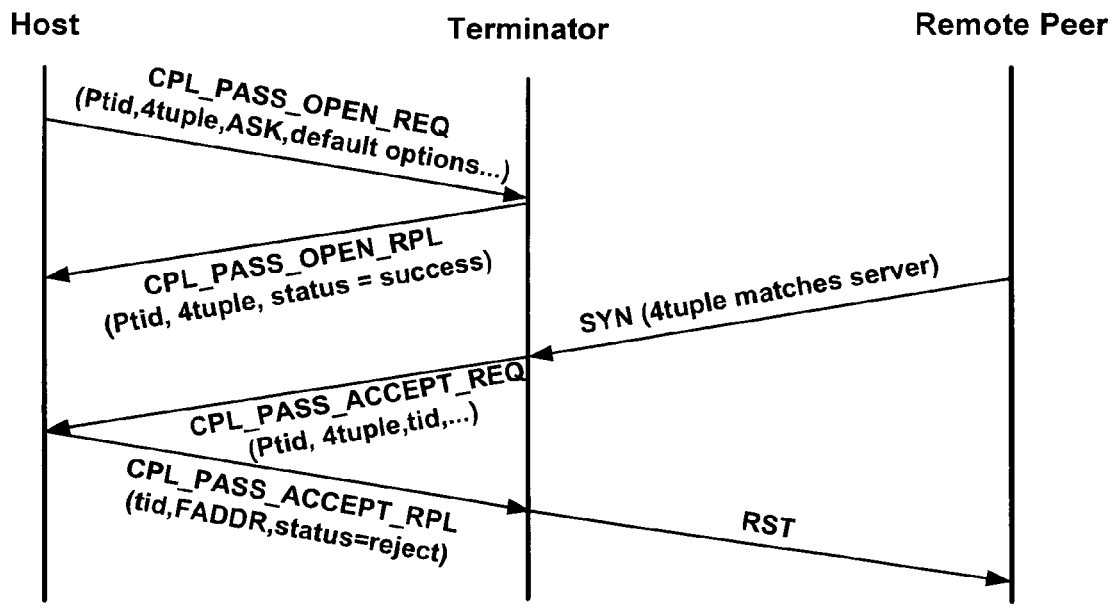
FIG. 11 shows a case in which an attempt to connect is rejected by the host, causing a RST to be sent to the remote peer.

FIG. 11 shows a case in which an attempt to connect is rejected by the host, causing Terminator to send a RST to the remote peer.

Figure 12:
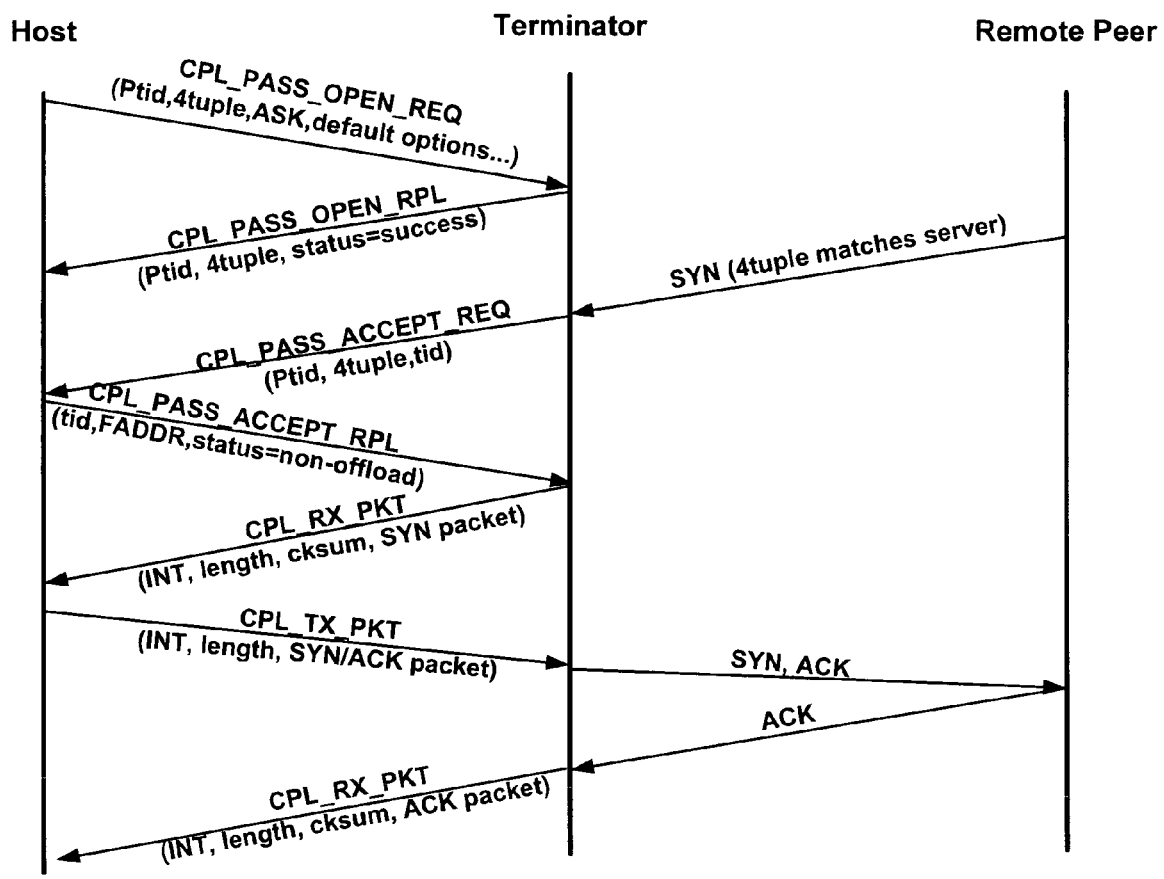
FIG. 12 shows a case in which an attempt to connect is accepted by the host, but only as a tunneled (non offloaded) connection.

FIG. 12 shows a case in which an attempt to connect is accepted by the host, but only as a tunneled (non offloaded) connection. Terminator sends the CPL_PASS_ACCEPT_REQ, the host responds with CPL_PASS_ACCEPT_RPL w/non-offload status to inform Terminator it wants to handle the connection itself. Terminator responds by passing up the SYN packet, including layer 2 and 3 envelopes in a CPL_RX_PKT command. The host then builds a SYN/ACK TCP segment, encapsulates it in its layer 3 and 2 envelopes, then sends the packet to Terminator with a CPL_TX_PKT command. Terminator then puts the SYN/ACK segment on the wire. The remote peer sends back the ACK, and Terminator tunnels it to the host using a CPL_RX_PKT command.

Figure 13:
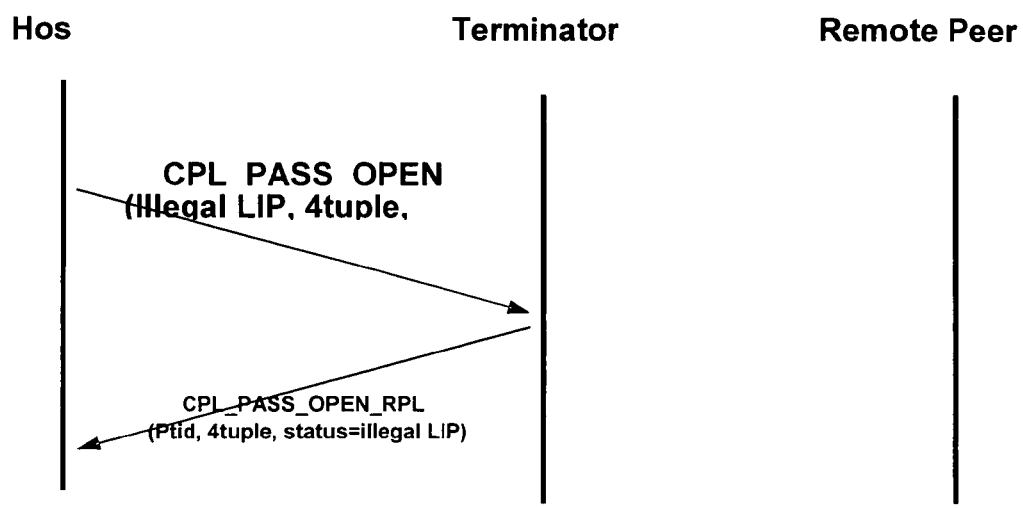
FIG. 13 shows a case in which the user has incorrectly asked for a Local IP address for which Terminator has not been configured.

FIG. 13 shows a case in which the user has incorrectly asked for a Local IP address for which Terminator has not been configured.

Active Open/Offloaded Connections

Figure 14:
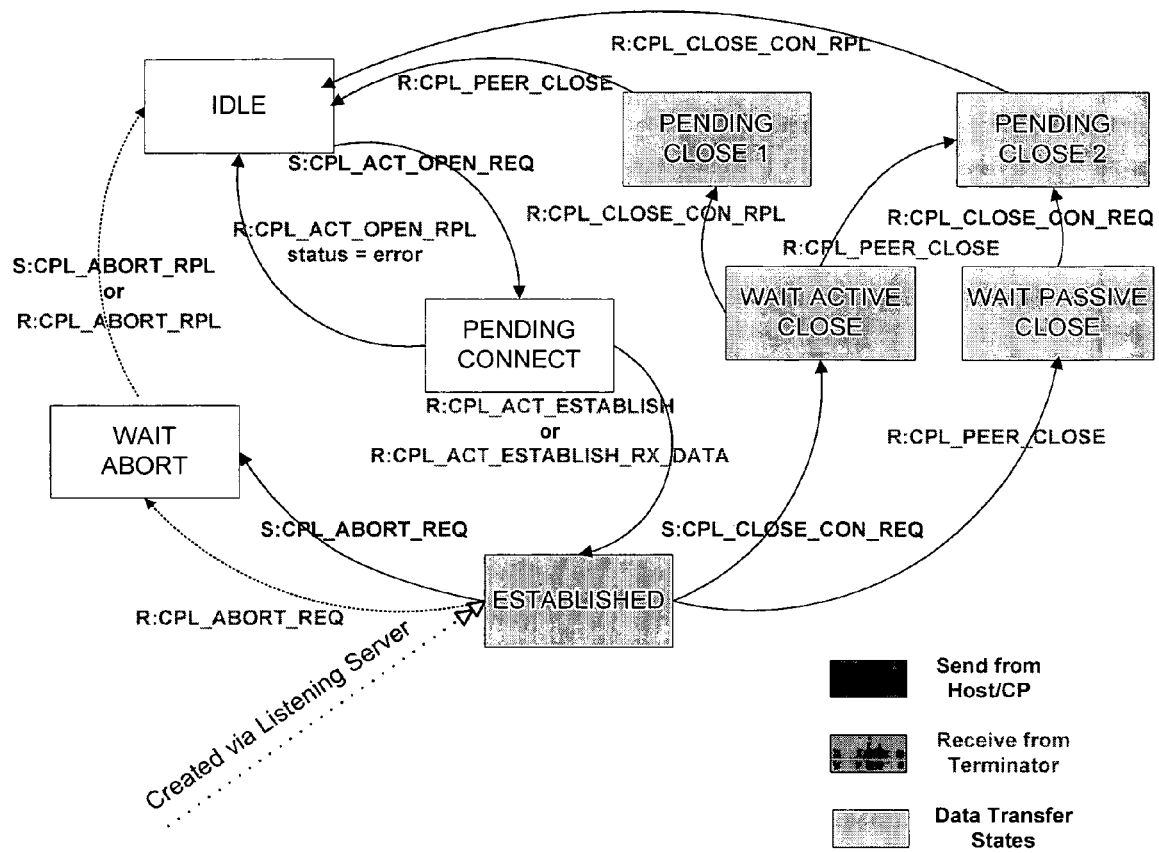
FIG. 14 illustrates the process for creating connections based on active open.

FIG. 14 illustrates the process for creating connections based on active open. Connections can also be created via listening server as detailed in FIG. 7. Connections created from a listening server are depicted above in the Created via Listening Server path into the Established state. Items prepended by S: represent commands from the host to Terminator. Items prepended by R: are commands sent by Terminator to the host. Gray boxes represent states in which connection data can flow between the host and Terminator (Wait Close is included for half-open connections—receive data from the remote peer can continue to arrive until the remote peer sends a FIN segment).

Figure 15:
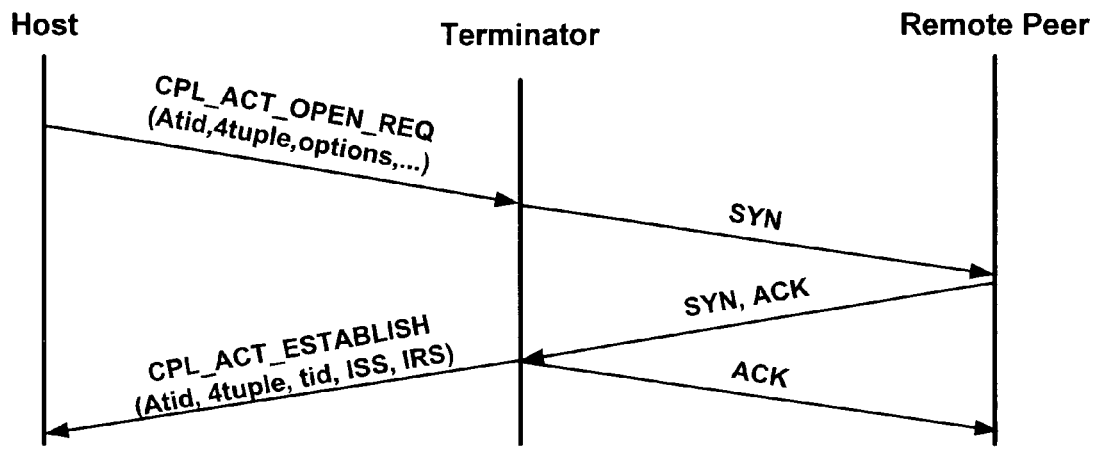
FIG. 15 shows an active open.

FIG. 15 shows an active open.

Figure 16:
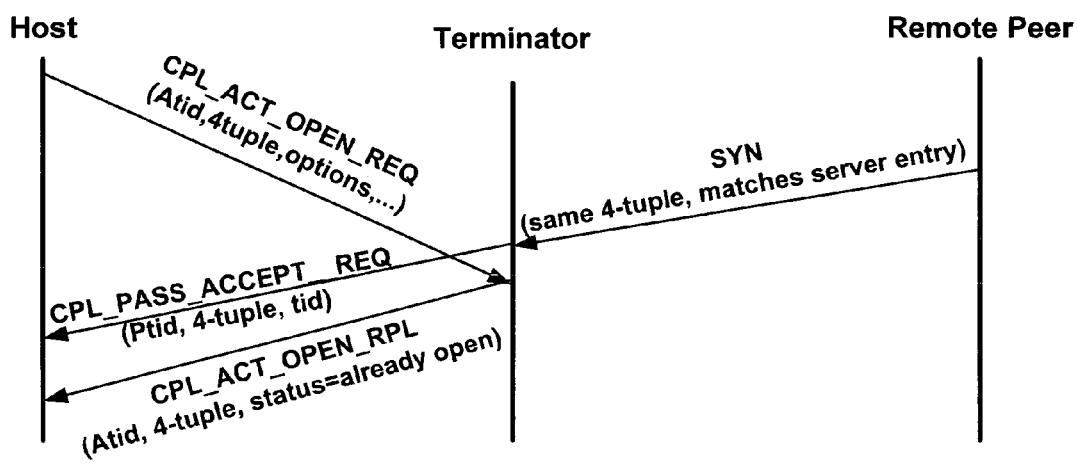
FIG. 16 shows an active open failure because of a simultaneous open race with the remote peer.

FIG. 16 shows an active open failure because of a simultaneous open race with the remote peer. The host would get the same error if it tried to actively open an already open connection.

Figure 17:
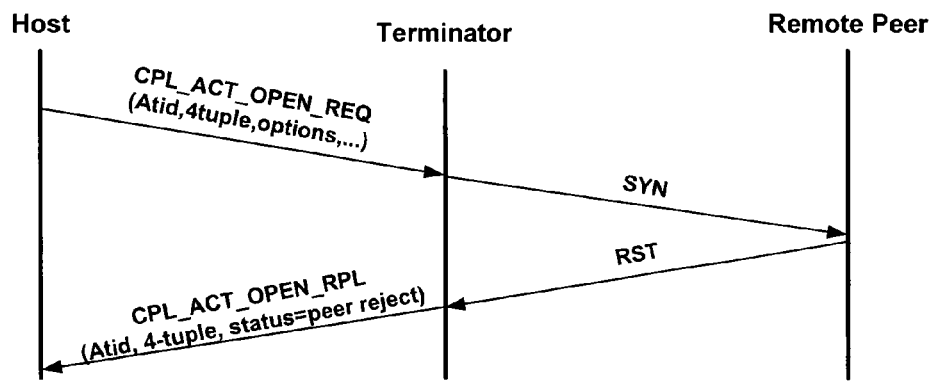
FIG. 17 shows an active open failure because the peer sends RST.

FIG. 17 shows an active open failure because the peer sends RST. This differs from the case wherein the peer sends RST on an established connection, whereupon Terminator sends a CPL_ABORT_REQ. The reason for this is that the Atid is only remembered by Terminator up to the point a connection is established, after which the tid is used to refer to the connection. The CPL_ACT_OPEN_RPL returns an Atid, and the CPL_ABORT_REQ returns the tid, which Terminator had not seen prior to the reset and would not be able to use to look up the connection record.

Figure 18:
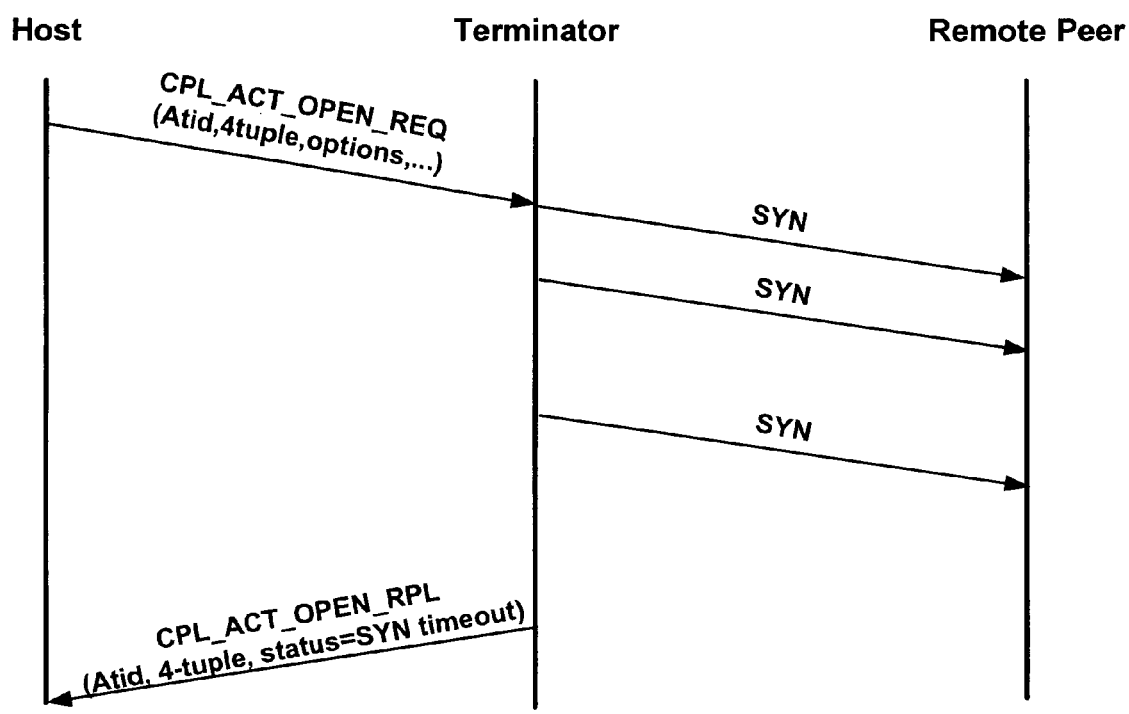
FIG. 18 shows an active open failure because the connection establishment timer times out.

FIG. 18 shows an active open failure because the connection establishment timer times out. Connection Establishment timer is actually a count of the number of SYNs that will be sent before the attempt to establish a connection is aborted. This count is a global value, not a per connection value. On timeout, Terminator notifies the host by sending a CPL_ACT_OPEN_RPL with a "connection establishment timed out" status.

Figure 19:
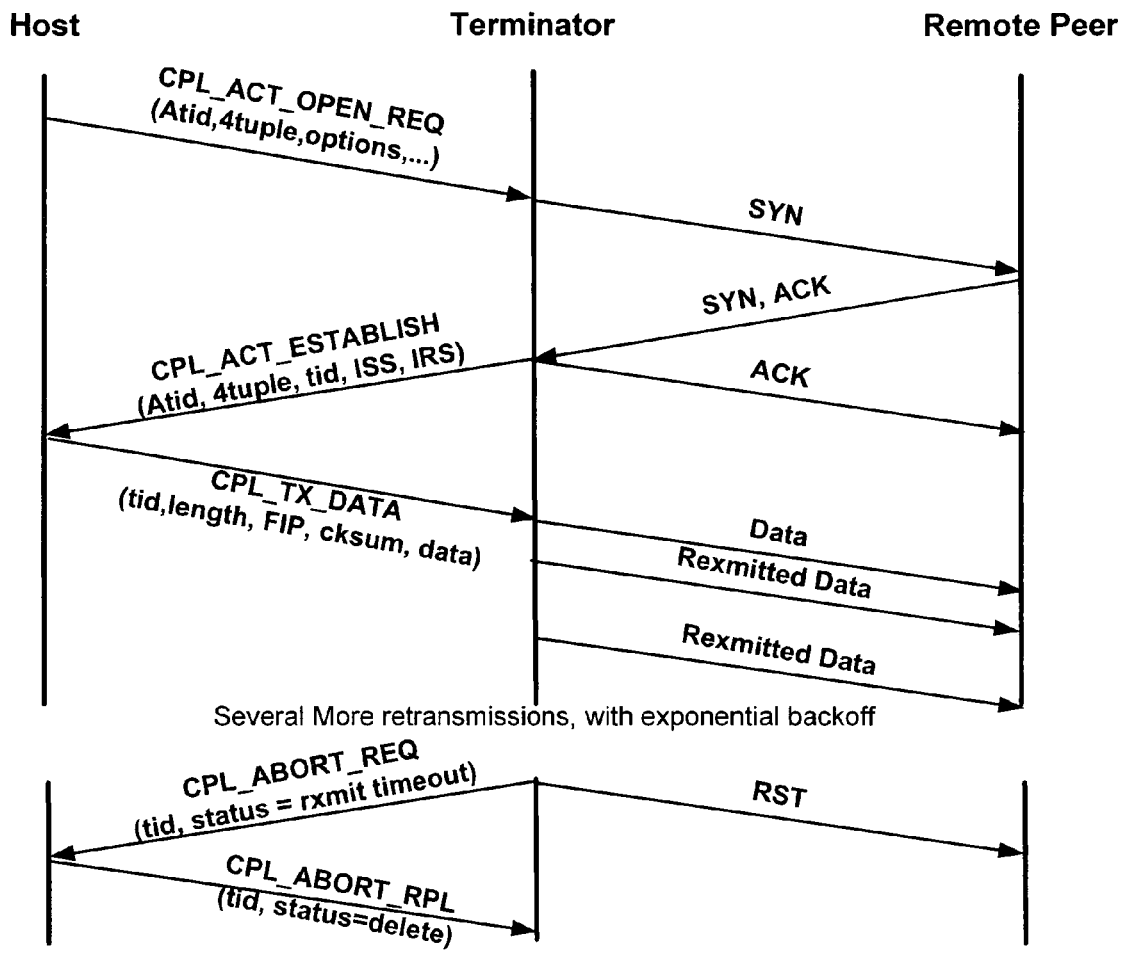
FIG. 19 shows a connection being aborted because several repeated retransmissions of data did not result in an ACK from the remote TCP.

FIG. 19 shows a connection being aborted because several repeated retransmissions of data did not result in an ACK from the remote TCP. The same basic pattern will apply to a failure to respond to repeated persist probes and repeated KEEPALIVE probes and repeated ARP failures. (See W. Richard Stevens 1994 TCP/IP Illustrated, Volume 1 Chapters 21-23, Addison-Wesley.)

Connection Close and Abort

Figure 20:
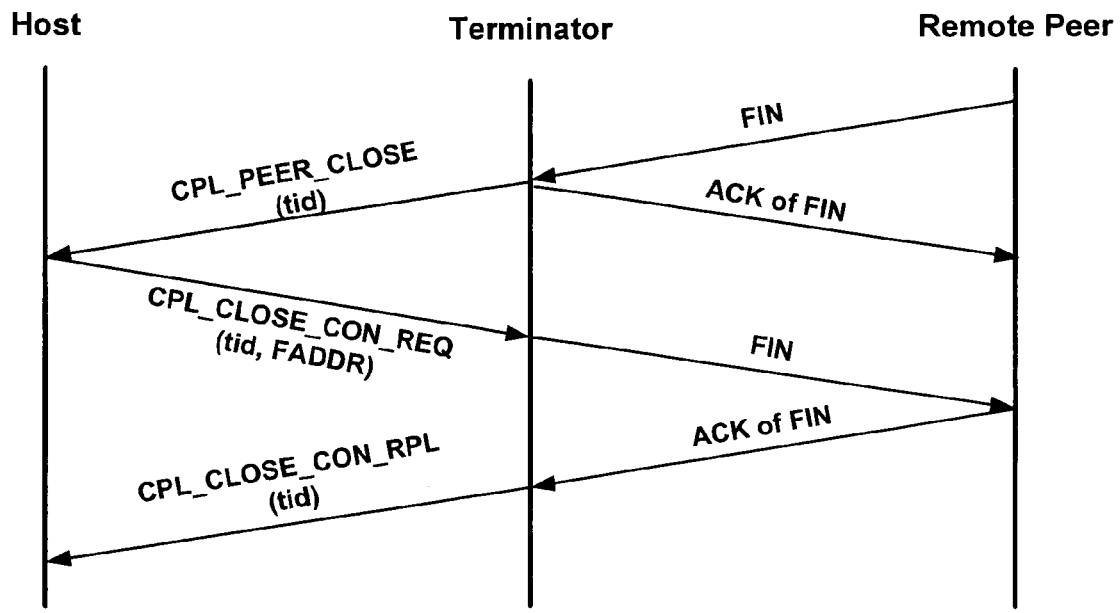
FIG. 20 shows the normal passive close of an offloaded connection.

FIG. 20 shows the normal passive close of an offloaded connection. This is a simple case in which there is no buffered receive or send data within Terminator and the host has no more data to send.

Figure 21:
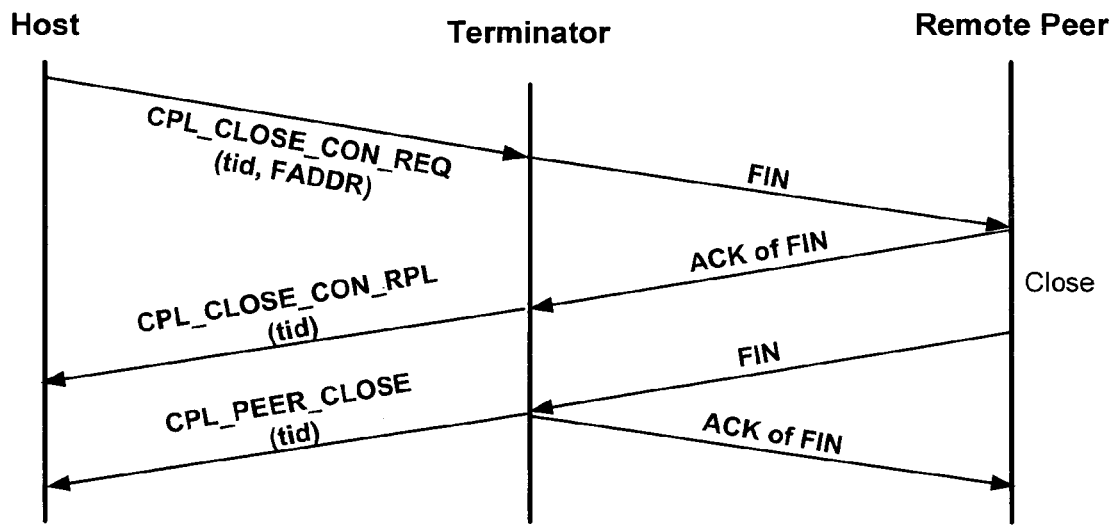
FIG. 21 shows the normal active close of an offloaded connection.

FIG. 21 shows the normal active close of an offloaded connection. This is a simple case in which there is no buffered receive or send data within Terminator and the peer has no more data to send.

Note that the CPL_CLOSE_CON_RPL and CPL_PEER_CLOSE are received in the opposite order as in the Normal Passive Close case in FIG. 20. The CPL_PEER_CLOSE is always associated with the reception of a FIN from the remote, and the CPL_CLOSE_CON_RPL is always associated with the receipt of the ACK of the FIN. Terminator would normally keep connection in TIME_WAIT state for 2MSL, which would prevent reopening of connection, but tie up resources in Terminator. The host can optionally configure Terminator to reclaim its internal memory resources immediately upon sending CPL_CLOSE_CON_RPL. In this mode, host software can use the ASKconnection policy to implement a 2MSL timer, or can optionally disable the 2MSL timer if there is no danger of old segments wandering around the network and corrupting data in a new incarnation of the connection.

Figure 22:
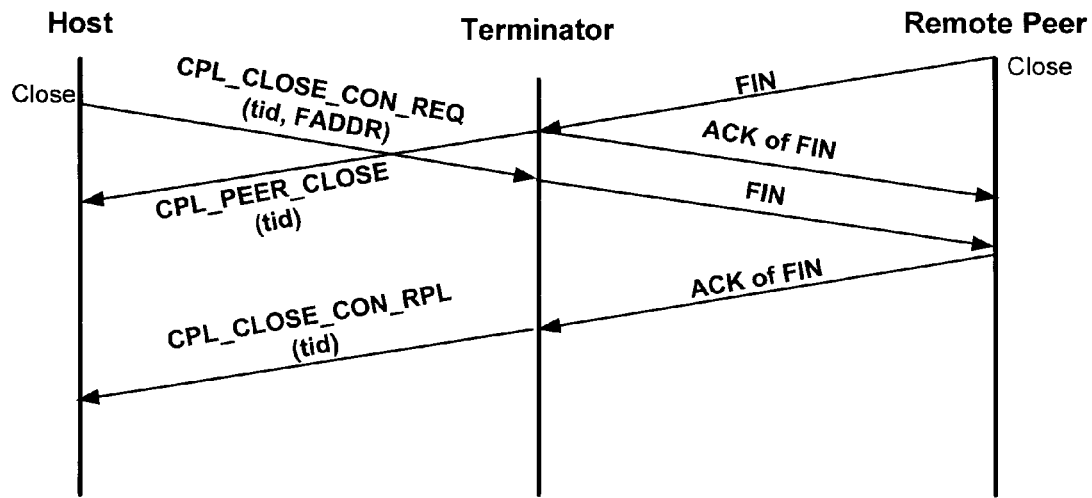
FIG. 22 shows a simultaneous close of an offloaded connection.

FIG. 22 shows a simultaneous close of an offloaded connection. Note that in this case, the CPL_PEER_CLOSE and the CPL_CLOSE_CON_RPL will be returned in the opposite order that they were in FIG. 21 even though the host thinks it is trying to perform an active close.

Figure 23:
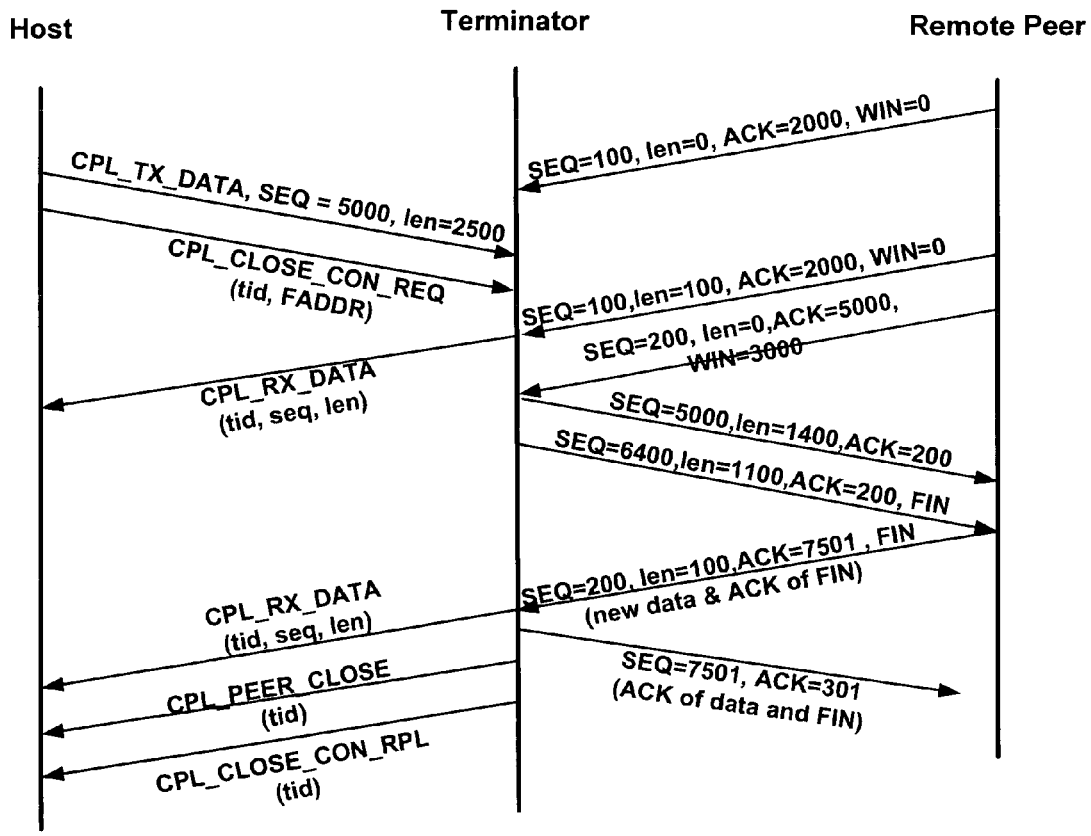
FIG. 23 shows an active close with buffered data.

FIG. 23 shows an active close with buffered data. The Terminator receives an ACK from the remote, telling it that its window is zero and that Terminator cannot send any more data to the remote peer. The host sends the last block of data to transmit to terminator, followed by the CPL_CLOSE_CON_REQ. Terminator cannot send the FIN immediately because it must first send its buffered data.

The remote sends a block of data that arrives after the close. Terminator passes this up to the Host. The Host can decide whether to discard the data or whether to pass it on to the application, depending on whether the application closed or half-closed.

The remote now opens its window, permitting Terminator to send the buffered data. It has to send the data in two segments because it has more data than fits in one MSS for the connection. The second segment contains a FIN.

The remote sends back a segment that contains:
ACK of the last two data blocks
ACK of the FIN
One more block of data from the remote
FIN from the remote
Terminator sends:
ACK of the data and an ACK of the FIN to the remote
Data to the host
A CPL_PEER_CLOSE to the host
A CPL_CLOSE_CON_RPL to the host Half Close vs Full Close In one example, when host sends CPL_CLOSE_CON_REQ to Terminator for an active close, it does not tell whether it's a half close or a full close. When received the CPL_CLOSE_CON_REQ, Terminator behaves as following:

sends FIN to peer
If received ACK for FIN and data from peer, it
delivers the data to host
sends ACK for the data to peer
starts FIN_WAIT_2 timer
If received more data from peer, the data is acked, delivered to host, and the FIN_WAIT 2 timer is re-started.

If host called a half close, the chip emulates the half close behavior and the connection may stay forever as long as peer keeps sending Terminator data. The connection will be closed after Terminator does not receive any more data from peer for TIME_WAIT_2 period of time (default 10 minutes).

If host called a full close, when host receives data from Terminator after it sends CPL_CLOSE_CON_REQ, host should send CPL_ABORT_REQ to Terminator, which in turn sends RST to peer to tear down the connection. Note: the peer may receive an ACK for its data before gets the RST.

In another example, CPL_CLOSE_CON_REQ will carry a bit explicitly indicating full close or half close.

Figure 24:
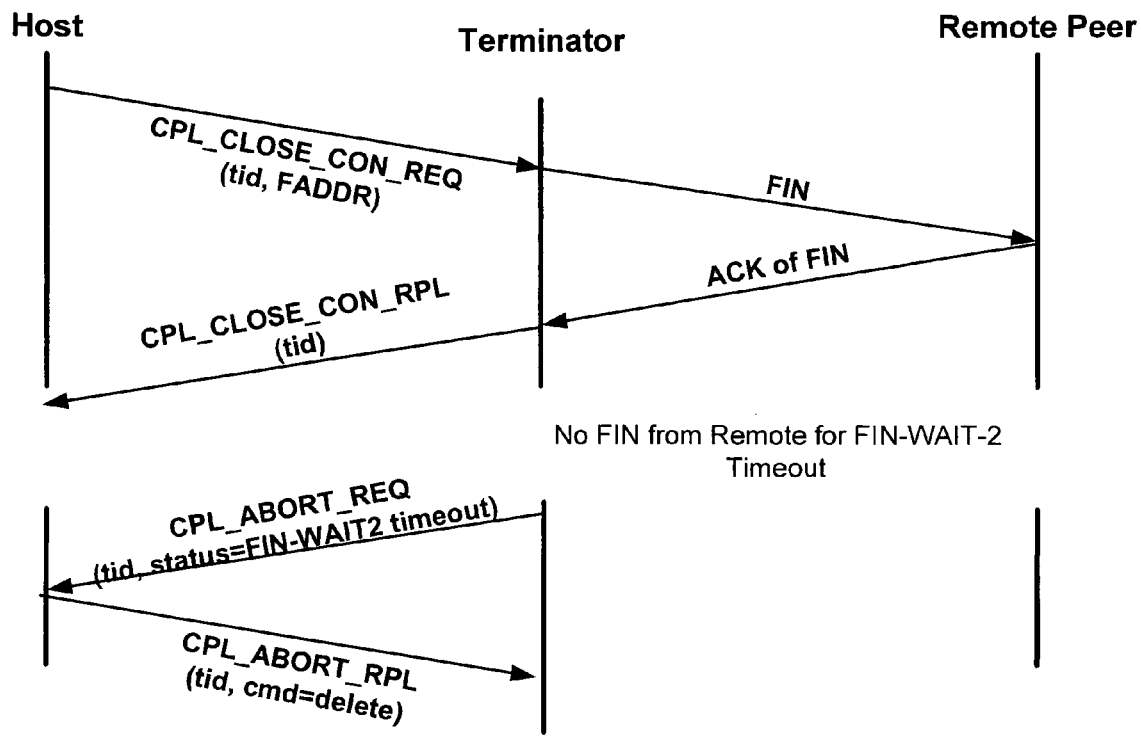
FIG. 24 shows what happens when the remote peer ACKs Terminator's FIN but never sends back a FIN or RST for its half of the connection.

FIG. 24 shows what happens when the remote peer ACKs Terminator's FIN but never sends back a FIN or RST for its half of the connection. (This is typically caused by either a poorly written remote application or a loss of connectivity to the remote.)

The host would have the option of sending a "retry" command with the CPL_ABORT_RPL to extend the FIN-WAIT-2 timeout if desired.

Figure 25:
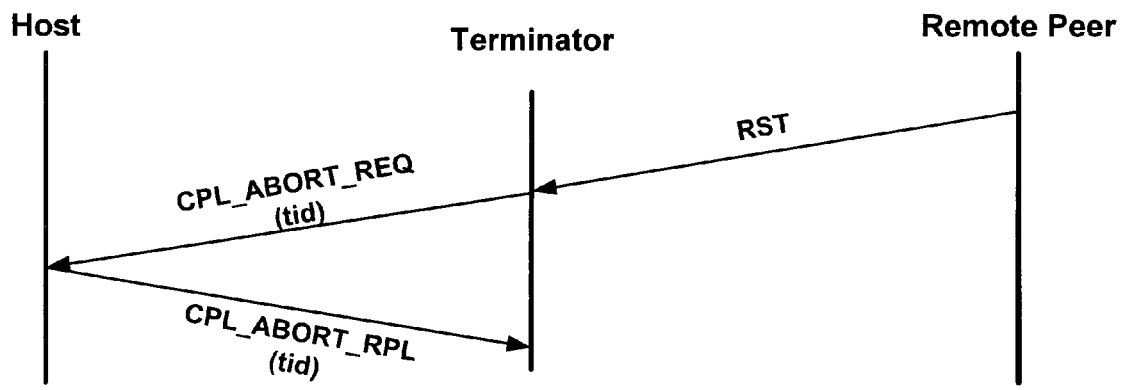
FIG. 25 shows the remote peer resetting an established connection.

FIG. 25 shows the remote peer resetting an established connection. The host should send the CPL_ABORT_RPL to Terminator before Terminator will free up the connection's memory resources. This is done to avoid race conditions between the arrival of the RST from the remote TCP and the host issuing CPL commands to the same connection. The host should not issue any more commands for this connection after the CPL_ABORT_RPL, as the tid of those commands either won't be valid or will have been reassigned to a new connection. A CPL_TX_DATA command sent after a CPL_ABORT_ RPL could result in data intended for the old connection to get sent to a new passively opened connection by mistake. (CPL_ARP_MISS_RPL commands are the only exception to this rule.)

Figure 26:
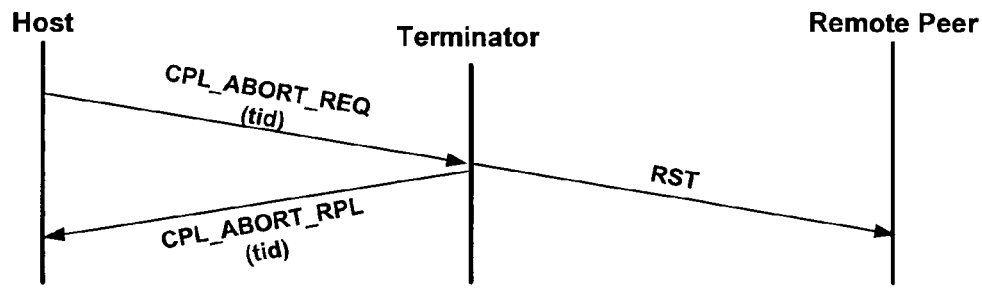
FIG. 26 shows the host resetting a connection.

FIG. 26 shows the host resetting a connection. Once the CPL_ABORT_RPL is received, the host can be confident that no more responses will be sent from Terminator for this connection with the given tid.

Figure 27:
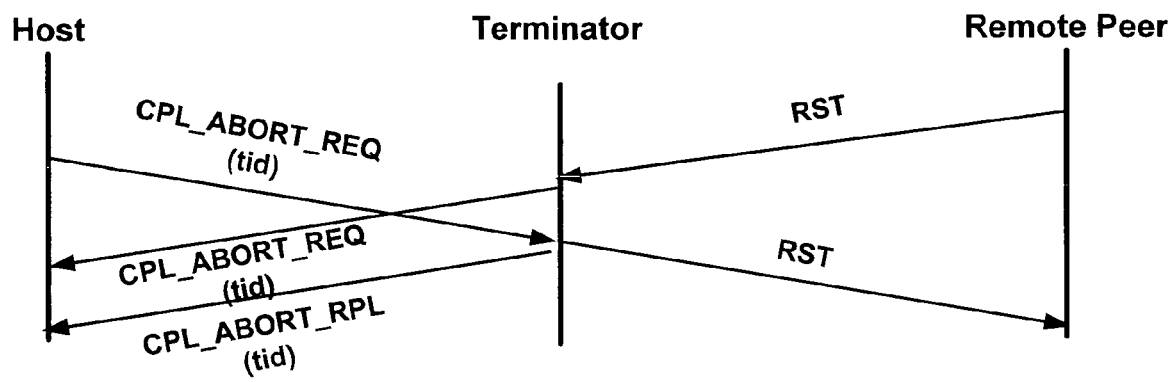
FIG. 27 shows a Host and Peer resetting a Connection Simultaneously.

FIG. 27-Host and Peer resetting a Connection Simultaneously. When host has sent a CPL_ABORT_REQ to Terminator and is waiting for CPL_ABORT_RPL, if it received a CPL_ABORT_REQ from Terminator on the same connection, it should not send CPL_ABORT RPL to Terminator to avoid a race condition. Once the host receives the CPL_ABORT RPL, it can be confident that Terminator will send no more responses for this connection with the given tid.

Figure 28:
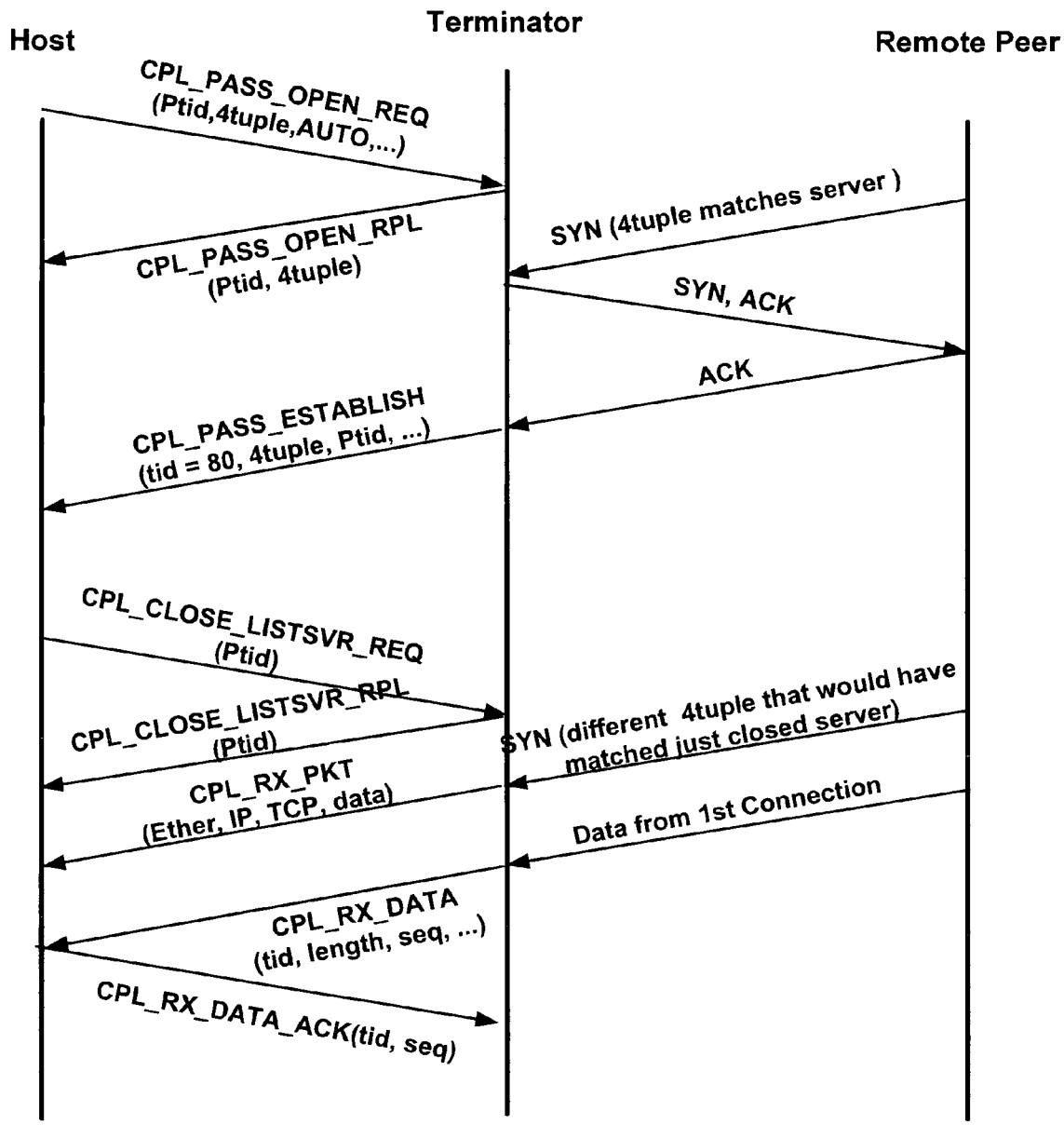
FIG. 28 shows a listening server being created in AUTO mode.

FIG. 28 shows a listening server being created in AUTO mode. After the listening server is created, a matching 4-tuple arrives, and a child connection is established. In an unrelated event, the server application closes the listening server via CPL_CLOSE_LISTSVR_REQ, and Terminator sends back a CPL_CLOSE_LISTSVR_RPL. If a new SYN from a remote peer arrives, trying to open a different 4-tuple for that server, by default, Terminator tunnels the segment to the host.

The child connection continues running. We show first segment of data on that connection arriving, and Terminator passing it along to the child process spawned earlier. The connection is eventually closed via the active or passive close sequence as shown in FIG. 20 and FIG. 21.

Figure 29:
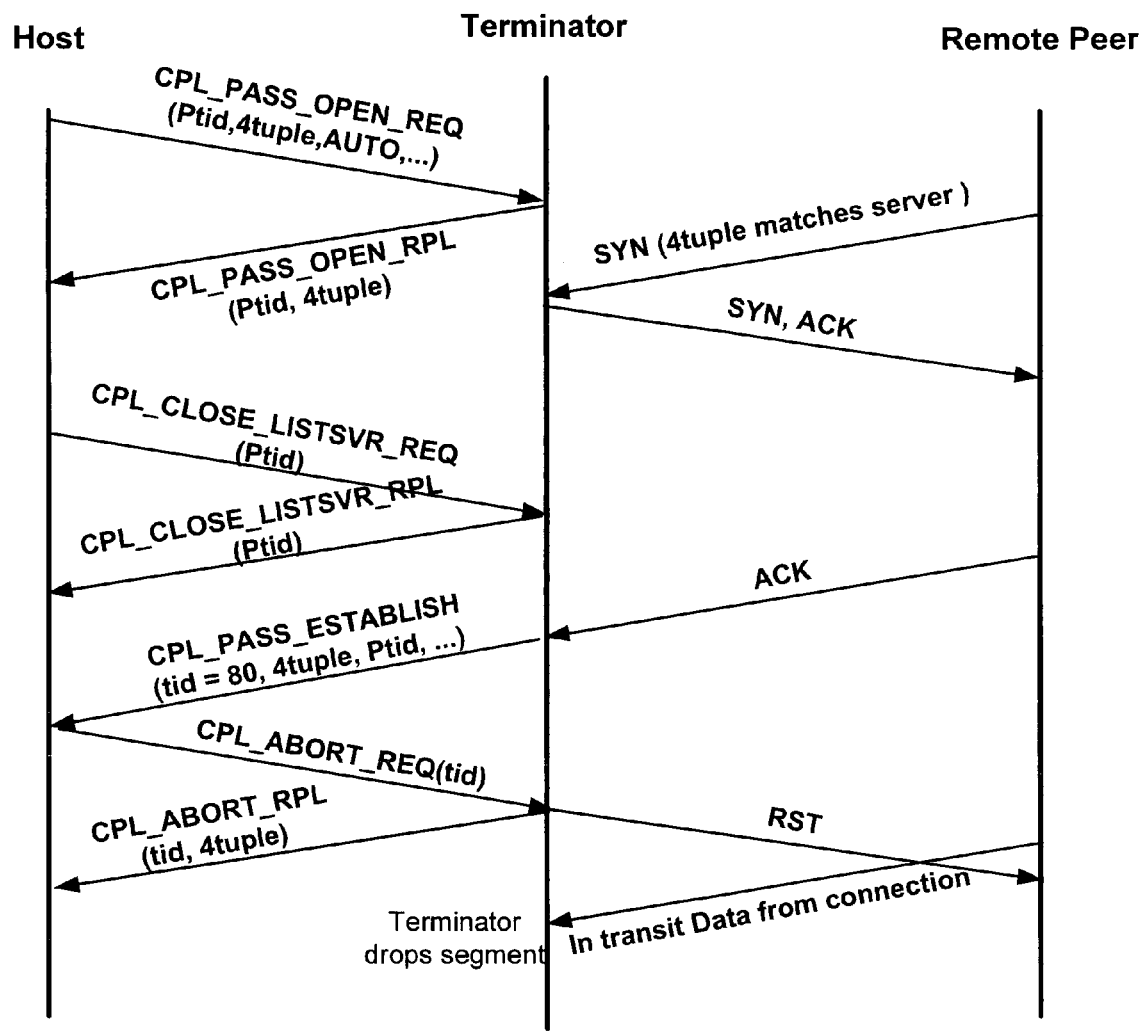
FIG. 29 shows a subtle variation from FIG. 28 that can trigger subtle interactions.

FIG. 29 shows a subtle variation from FIG. 28 that can trigger subtle interactions. In this case the host closes the listening server while an incomplete child connection to the listening server is in process.

Terminator does not keep track of parent child relationships once the child connection is spawned, other than to return the Ptid to the host. So when the ACK arrives, Terminator passes the ACK to the host (note that this diagram assumes that SYN cookie defense mode is disabled). The host then makes a decision for this connection, and in the case shown chooses to abort the connection via CPL_ABORT_—

Note also that RX connection data that arrives after the CPL_ABORT_REQ will be dropped. However, if data had arrived prior to CPL_ABORT_REQ, then this data would also have been passed up to the host for processing. The host needs to allow for this possibility and respond appropriately.

Non-Offloaded TCP Connection Management

In addition to offloaded connections, Terminator also supports non-offloaded TCP connections that run on host TCP stack. Terminator can be configured to run in one of the two global modes: protection mode and compatibility mode, which treat incoming packets from non-offloaded connections differently.

In compatibility mode, Terminator will act as a conduit (i.e. tunnel) for all TCP segments that belong to non-offloaded connections. Terminator saves no state information in this case (no TCAM entry and TCB allocated), and the host is fully responsible for managing the connection.

In protection mode, Terminator will keep track of non-offloaded connections and tunnel TCP segments to the host only if the 4-tuple of a segment matches a valid non-offloaded connection. In other words, in protection mode, all non-offloaded and offloaded connections need to have valid TCAM entries.

The correct selection of protection mode is based on the behavior desired. Some attributes of each mode are listed below.

Compatibility Mode:
All ingress TCP packets that missed TCAM lookup are tunneled to host
Terminator does not maintain state information for non-offloaded connections
host must be prepared to handle all tunneled segments (e.g. DoS attack)

Protection Mode:
all ingress TCP packets that missed TCAM lookup are dropped. This ensures only legitimate TCP packets are sent to host. This reduces the load on the host from invalid segments (e.g. DoS attack protection)
requires Terminator to maintain state for non-offloaded connections (in addition to state for offloaded connections which it normally maintains). In Protection Mode, each non-offloaded connection must have a TCAM entry and a TCB which includes a flag NON-OFFLOAD.
requires host software integration so that Terminator is notified of connection setup/teardown events for non-offloaded connections also.

The protection mode must be selected at configuration time, and can only be changed if all active connections are closed.

To open a non-offloaded connection in Compatibility Mode, the host performs normal active or passive open over the OS native TCP stack.

To open a non-offloaded connection in Protection Mode the following needs to be executed:

Active Open:
- Host first needs to call CPL_ACT_OPEN_REQ with NON-OFFLOAD bit set, along with a SYN segment in payload, which results in Terminator allocating a TCAM entry and a TCB for the connection, setting the connection state to NON-OFFLOAD in TCB, and sending out the SYN.
- Terminator returns CPL_ACT_OPEN_RPL with status=0 (success)
- All ingress packets of this connection are matched to the TCAM entry and then tunneled to host. All egress packets are tunneled directly from host to wire.
- When the connection is closed, host needs to send CPL_CLOSE_CON_REQ to Terminator. Terminator removes TCAM entry and TCB, and then returns CPL_CLOSE_CON_RPL to host.

Passive Open:
- Host calls CPL_PASS_OPEN_REQ with Connection Policy=ASK.
- When received a SYN from wire, Terminator allocates TCAM entry and TCB for this connection, and sends CPL_PASS_ACCEPT_REQ to host.
- Host driver synthesize the original SYN packet based on the info carried in CPL_PASS_ACCEPT_REQ and forwards to host TCP/IP stack, and then sends CPL_PASS_OPEN_RPL to Terminator with Status=NON-OFFLOAD. Note: if the driver cannot synthesize the SYN, then a later retransmitted SYN will arrive at Terminator, which in turn tunnels the SYN to host stack.
- Terminator saves the NON-OFFLOAD into TCB as connection state.
- All follow up ingress and egress packets are tunneled through.
- When the connection is closed, host needs to send CPL_CLOSE_CON_REQ to Terminator. Terminator removes TCAM entry and TCB, and then returns CPL_CLOSE_CON_RPL to host.

Figure 30:
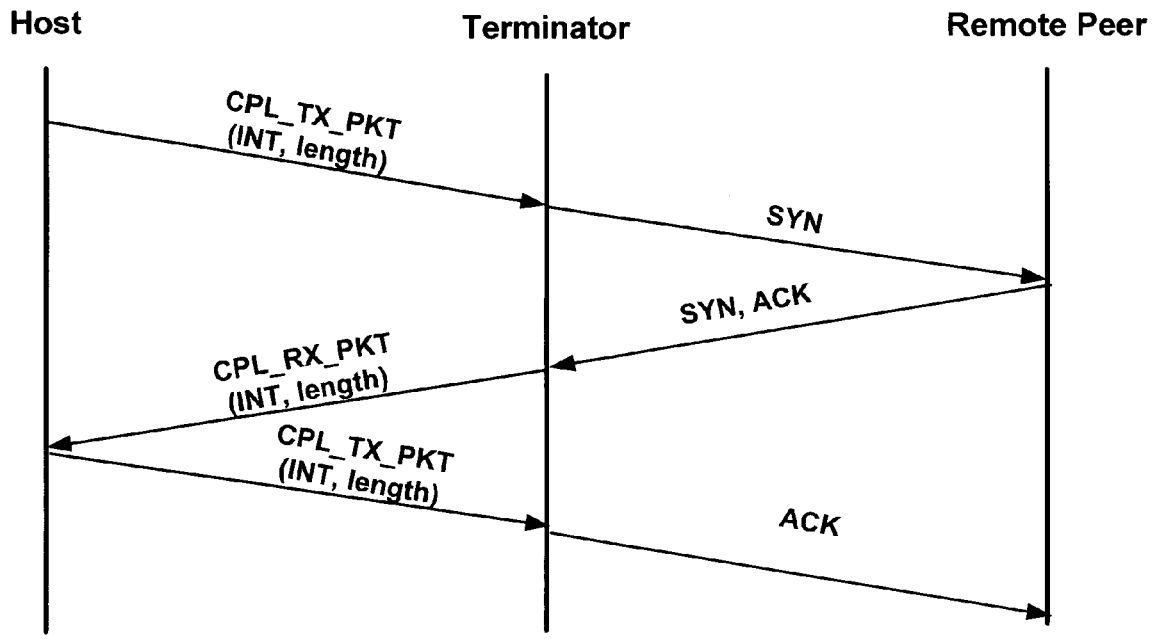
FIG. 30 shows an active open for a non-offload connection under compatibility mode.

FIG. 30 shows an active open for a non-offload connection under compatibility mode. The only CPL commands used are CPL_TX_PKT and CPL_RX_PKT, which are wrappers for actual Ethernet frames to and from the MAC. There is no need to inform Terminator of the connection, as Terminator does not maintain state information for the connection in this mode. When compatibility mode is active, Terminator tunnels all unrecognized segments (i.e. segments that do not belong to an offloaded connection) to the host.

Figure 31:
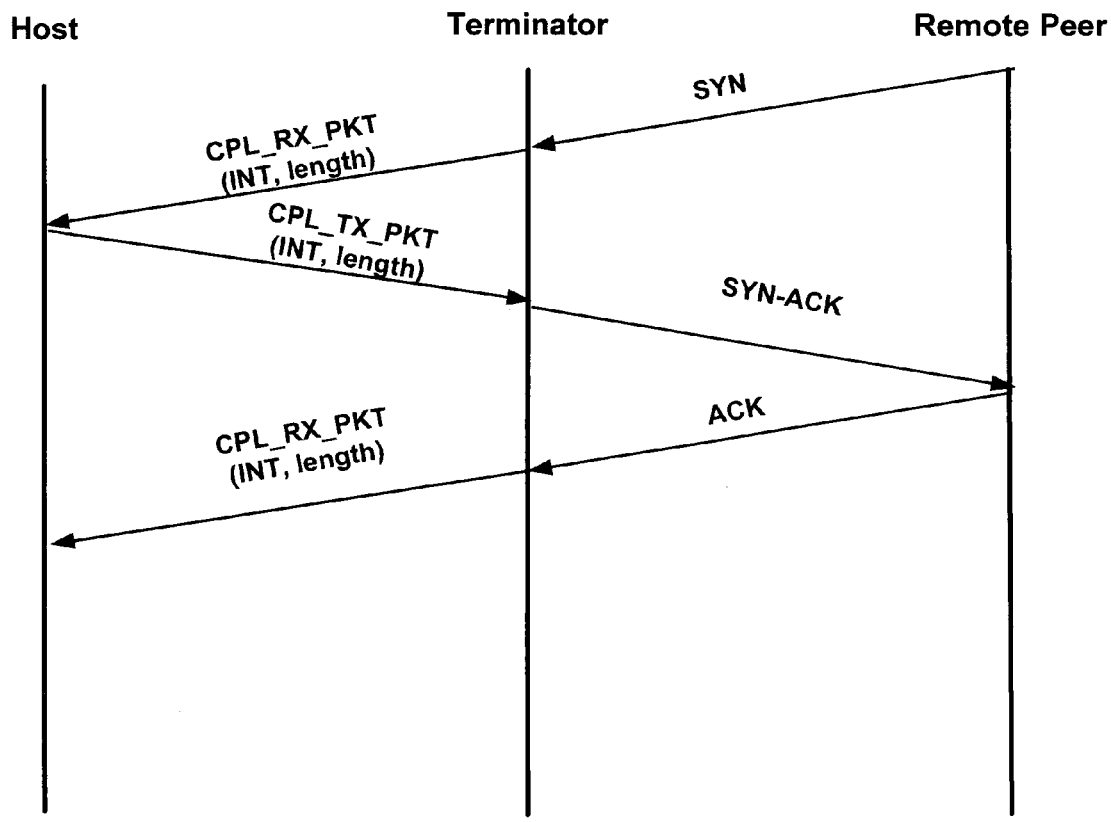
FIG. 31 shows a passive open for non-offload connection under compatibility mode.

FIG. 31 shows a passive open for non-offload connection under compatibility mode. It's the same as active open case, the only CPL commands used are CPL_TX_PKT and CPL_RX_PKL. There is no need to inform Terminator of the listening server as well as the incoming connections, since there is no state info maintained by Terminator for non-offload connections in compatibility mode.

Figure 32:
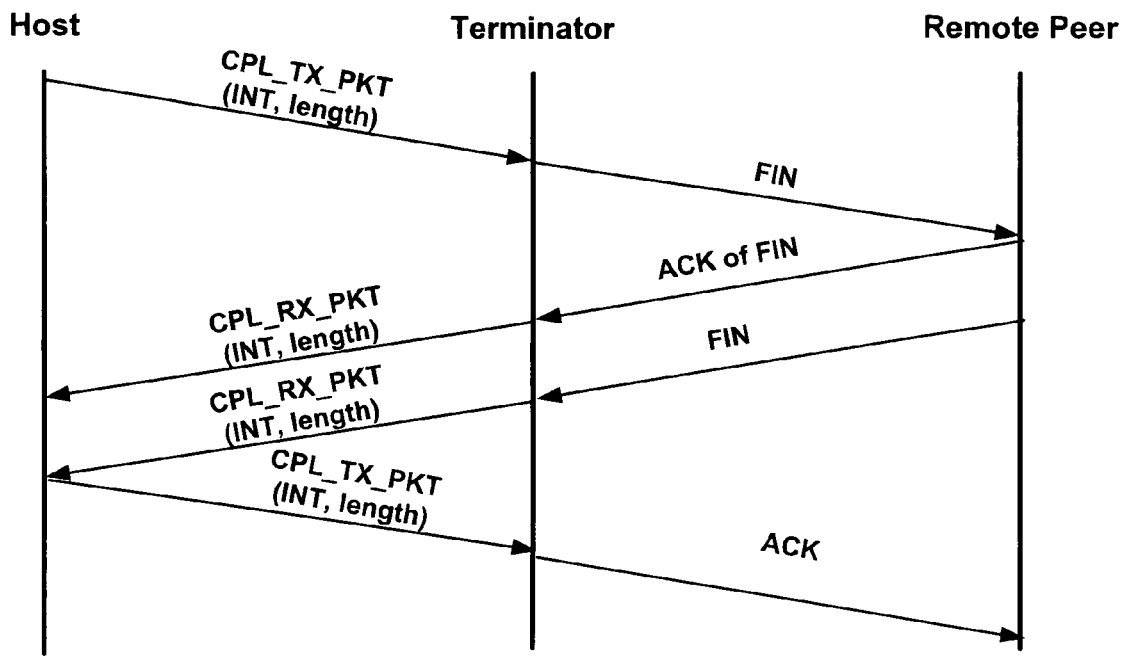
FIG. 32 shows an active close for a non-offload connection under compatibility mode.

FIG. 32 shows an active close for a non-offload connection under compatibility mode. Again, in this mode all TCP segments that do not match a TCAM entry are tunneled to/from the host, and no connection state notification is sent to Terminator since Terminator maintains no state for the connection.

Figure 33:
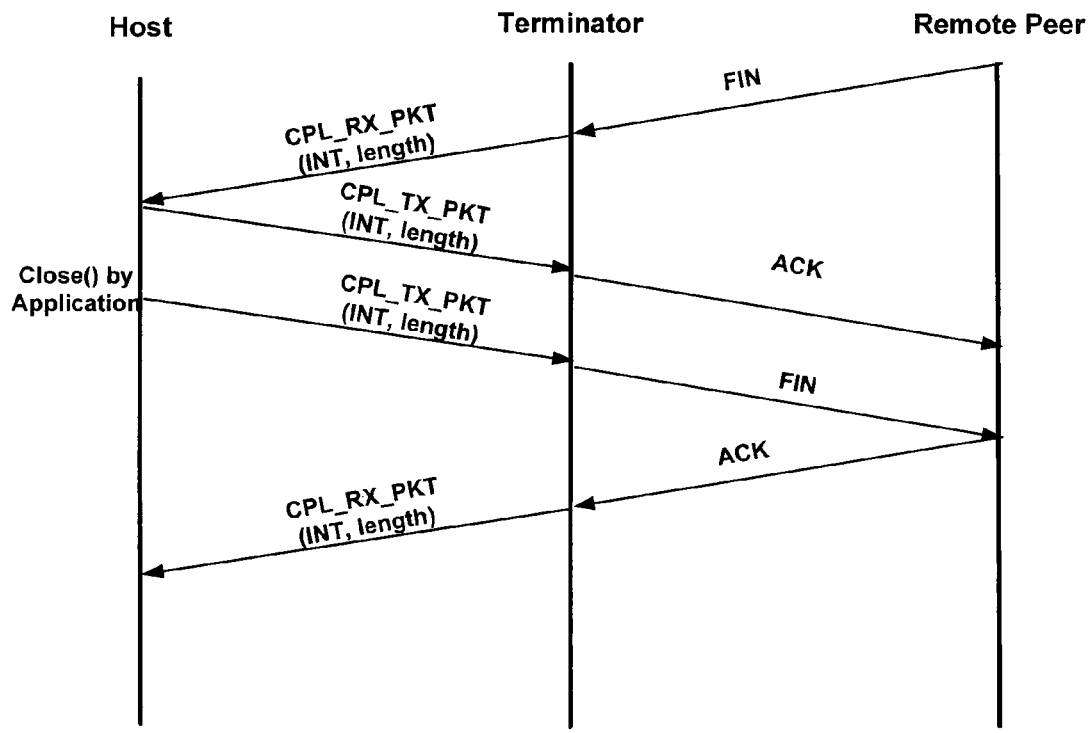
FIG. 33 shows a passive close for a non-offload connection under compatibility mode.

FIG. 33 shows a passive close for a non-offload connection under compatibility mode. Note there is no need to send a CPL_CLOSE_CON_REQ as no tid is in use for the connection.

Figure 34:
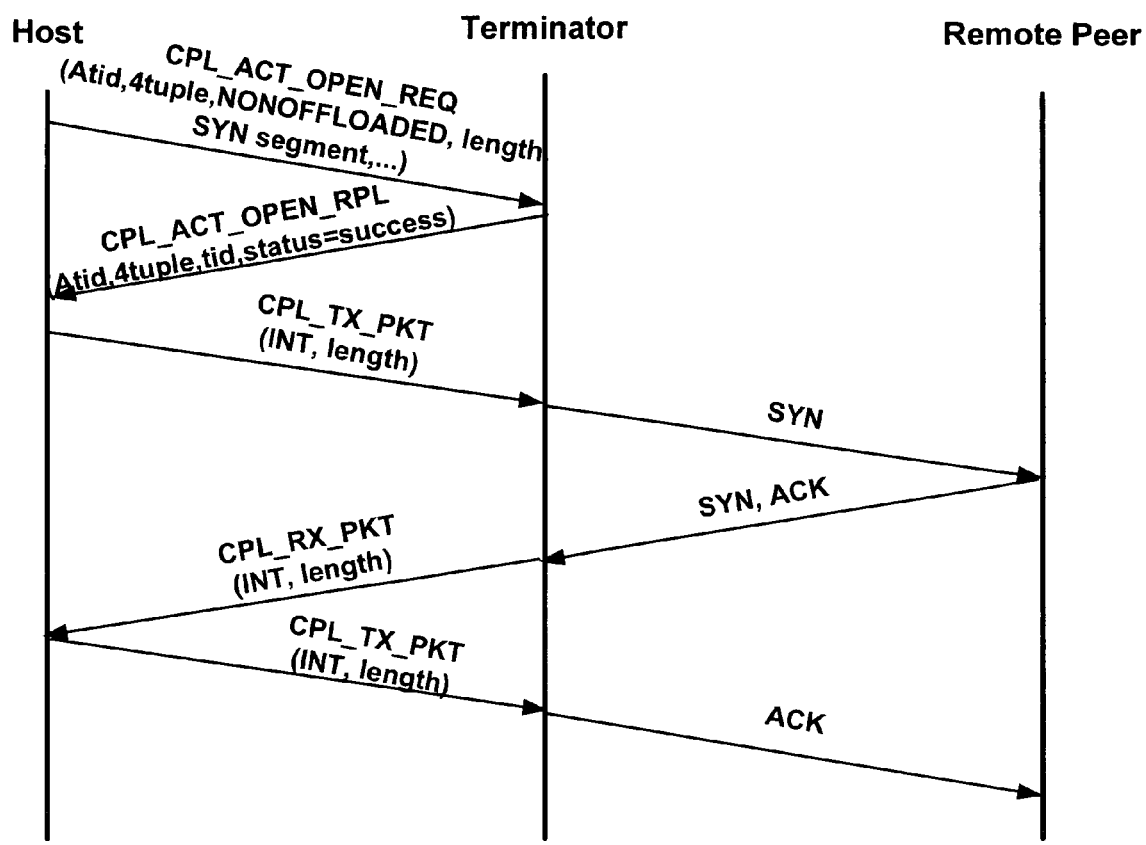
FIG. 34 shows an active open for a non-offload connection when protection mode is active.
Figure 35:
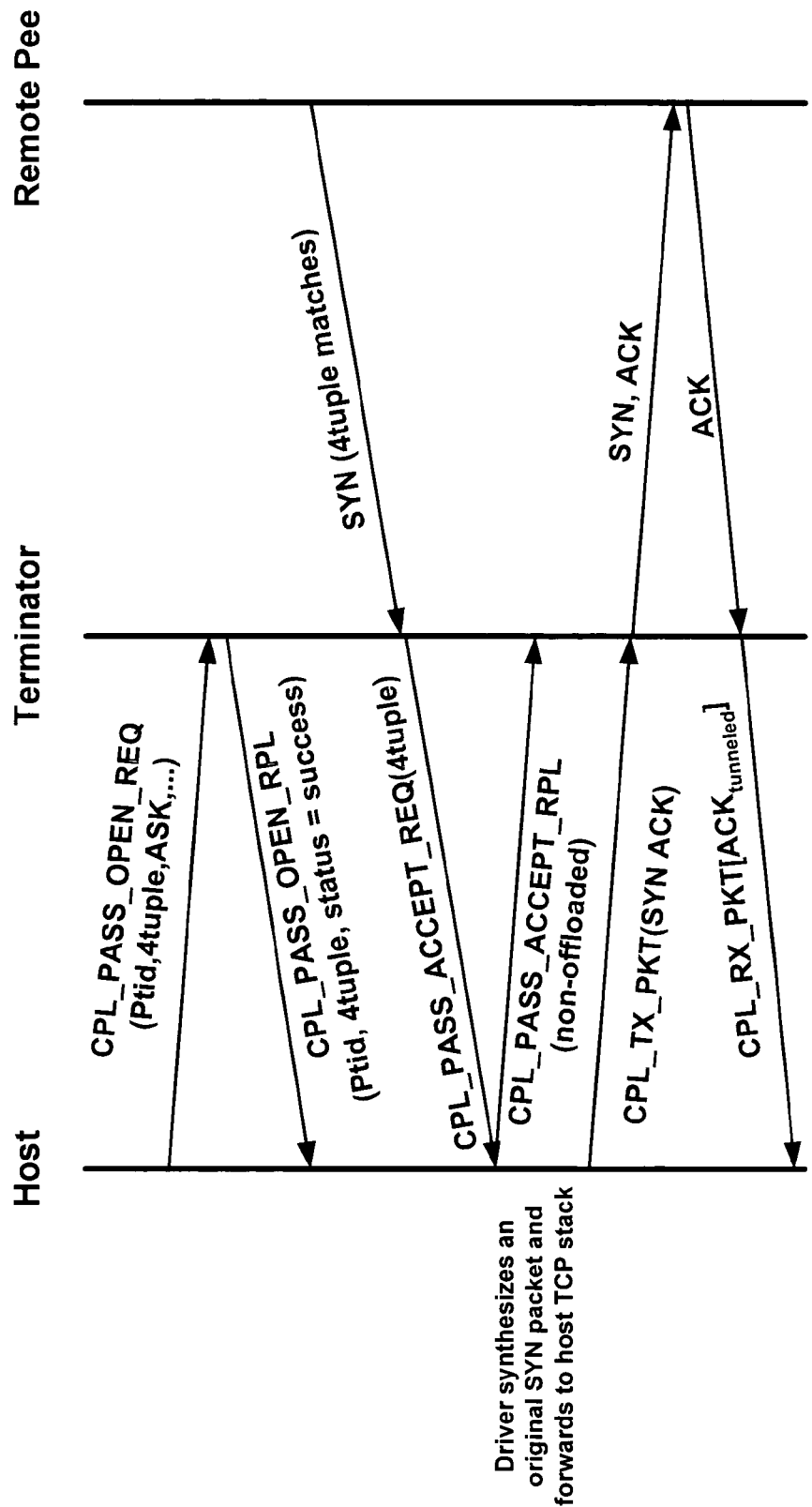
FIG. 35 shows a host wants to set a passive open listening server that allows nonoffload connections under protection mode.

FIG. 34 shows an active open for a non-offload connection when protection mode is active. In protection mode, Terminator keeps track of non-offload connections so that it can drop unrecognized TCP segments (based on the 4-tuple) without host intervention.

In FIG. 34, the control plane/host needs to issue CPL_ACT_OPEN_REQ with NON-OFFLOAD bit set to Terminator before letting the OS native TCP stack send the first SYN segment. When received CPL_ACT_OPEN_REQ, Terminator will allocate a TCAM entry and a TCB this (non-offloaded) connection, and then returns CPL_ACT_OPEN_RPL to host, which indicates the Tid assigned to the connection. At this point, the host TCP stack can send the first SYN (in tunneled format) to remote peer. All of the follow up packets are exchanged between host stack and remote peer and are tunneled through by Terminator.

FIG. 32 shows a host wants to set a passive open listening server that allows non-offload connections under protection mode. In this case, the server Connection Policy is required to be ASK mode. In this case, when SYN segment arrives from a remote peer, Terminator does not forward the SYN packet directly: instead it sends a CPL_PASS_ACCEPT_REQ to the host. Host driver needs to synthesize the original SYN packet and forward to the OS native TCP/IP stack. Then host sends CPL_PASS_ACCEPT_RPL with Status=NON-OFFLOAD to Terminator. Terminator saves the connection state in TCB as NON-OFFLOAD. Subsequent segments for the connection are tunneled to and from the host via CPL_RX_PKT and CPL_TX_PKT (such as the SYN ACK segments shown).

Note: if host driver cannot synthesize the original SYN because missing information, such as unrecognized TCP options by Terminator, the driver simply drops the packet. Later on, the remote peer will retransmit the SYN which is then tunneled to host since the TCB already has a connection state NON-OFFLOAD.

Figure 36:
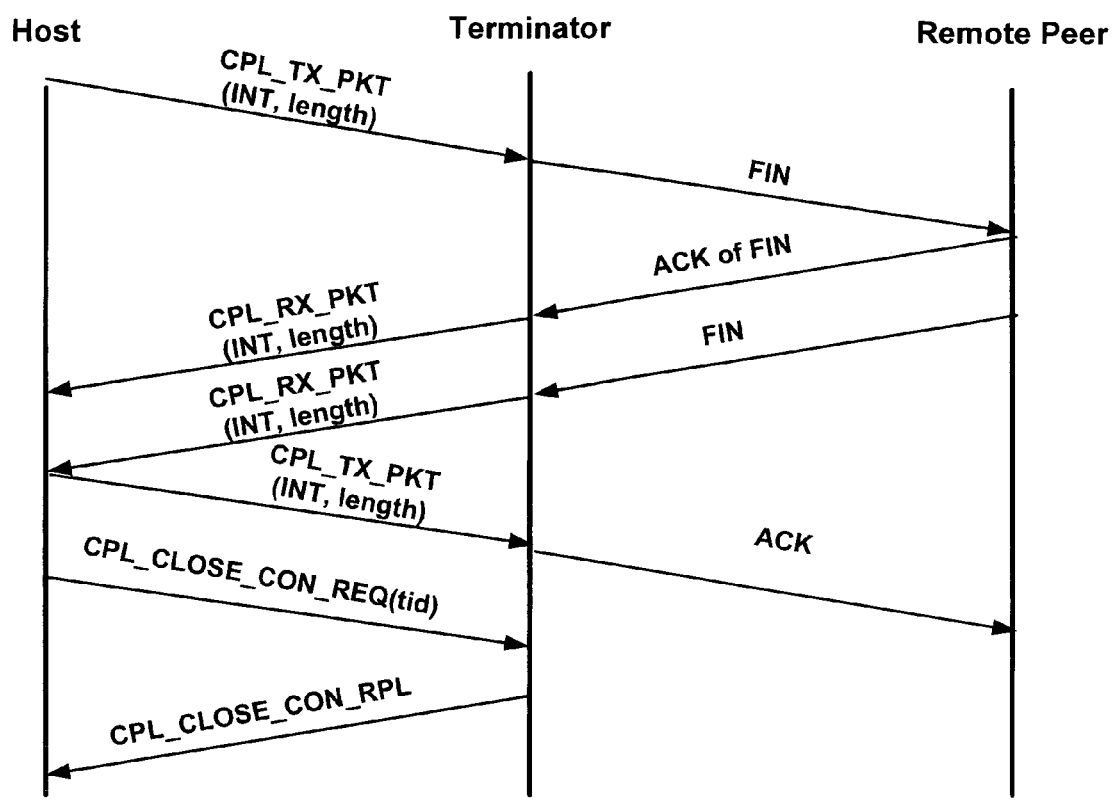
FIG. 36 shows an active close for a non-offload connection when protection mode is active.

FIG. 36 shows an active close for a non-offload connection when protection mode is active. In this case, the host stack finishes the normal 4-way handshake, moves into TIME_WAIT state, and starts the 2MSL timer. When the 2MSL timer expired, host issues the CPL_CLOSE_CON_REQ to Terminator. Terminator in turn removes the TCAM entry and TCB for this non-offloaded connection, and returns CPL_CLOSE_CON_RPL to host.

Figure 37:
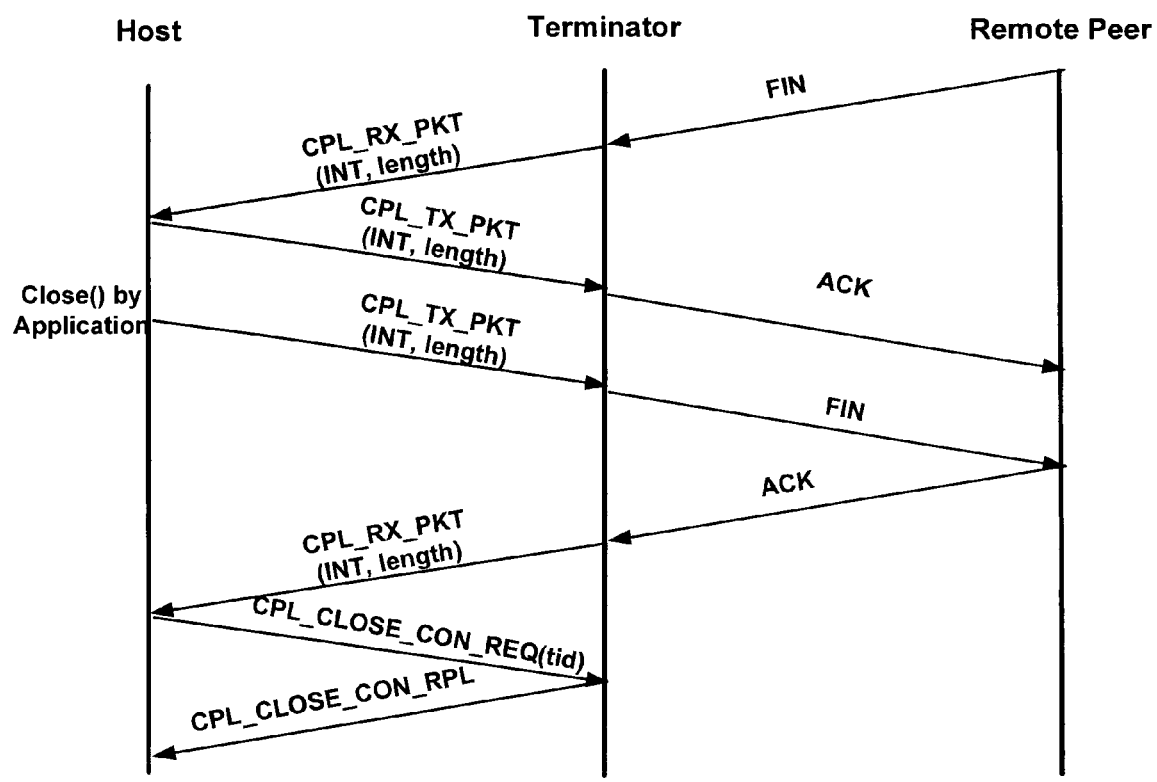
FIG. 37 shows a passive close of a tunneled connection when protection mode is active.

FIG. 37 shows a passive close of a tunneled connection when protection mode is active. After the connection teardown is complete, the host must send a CPL_CLOSE_CON_REQ to Terminator so that state information associated with the connection can be released. CPL_CLOSE_CON_REQ being sent immediately upon receipt of the ACK of the FIN.

Scatter Gather Engine (SGE)

The SGE (Scatter Gather Engine) is a Terminator module that fetches, decodes, and executes DMA commands. The resulting DMAs transfer data between Terminator and the host. In a transmission (from host to Terminator) the SGE gathers software buffers into blocks on the Terminator. In a reception (from Terminator to host), the SGE scatters blocks from the Terminator into the host's non-contiguous buffers.

Queues and Token-based Flow Control

The SGE is tightly coupled to the device driver software. The driver maintains queues in the host that it and Terminator use to communicate:

Command queues hold commands for Terminator to fetch. There are two command queues from which Terminator can be programmed to fetch in, for example, strict priority or round-robin fashion.

Free list queues contain pointers to available anonymous host memory buffers. Terminator fetches these to identify where to scatter (i.e., deposit) incoming packets. In one example, there are two Free list queues from which Terminator fetches according to a pre-programmed packet size threshold. Alternatively, the Free List queues can be configured one for offloaded traffic and the other one or more for non-offloaded traffic, as described later.

A response queue is for Terminator to send response messages back to the host.

The driver is responsible for flow control of the queues, and in one example uses an algorithm based on tokens, which are variables that the driver maintains representing how much space is available in Terminator's command queues and free list queues. When the driver sends data to these queues, it decrements the tokens accordingly. When Terminator has freed the queues, it sends tokens-update information to the driver via messages in the response queue.

Figure 1:
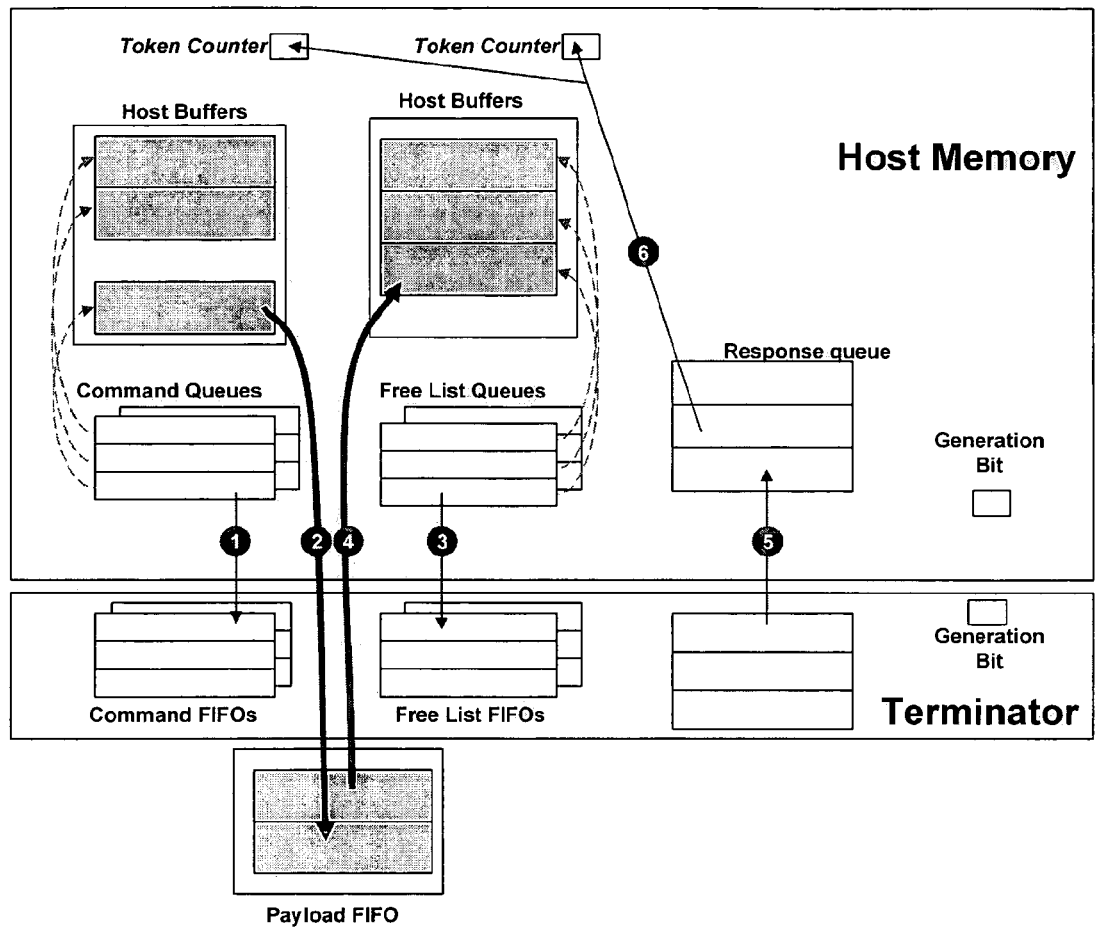
FIG. 1 illustrates an example of a DMA I/O device in accordance with an aspect of the invention.

FIG. 1 shows an example of the various memory elements that coordinate Terminator and the Driver, and the data movements between them. The list below the figure refers to the numbers in the figure.

4. Terminator fetches commands from the host memory's Command Queues using DMA into its Command Queue FIFOs. Each command identifies a buffer containing a CPL command and possibly payload data bytes. See TABLE 13 for an example of command structure; see Table 2 for an example of Queue and FIFO structure.
5. Terminator DMAs data from host buffers into Terminator's Payload FIFO.
6. Terminator fetches entries from host memory's Free-List Queue via DMA into its Free List Queue FIFOs. These entries identify available host buffers into which Terminator can fill in with received data. See Table 3 for an example of Free List Entry structure.
7. Terminator DMAs data to available host buffers.
8. Terminator sends certain responses to the Response Queue in host memory, such as to return command tokens or indicate filled free-list buffers, to the driver so that the driver can react according to these response.
9. The Driver, upon receiving token returns, increments the token counters which it uses in its flow control algorithm.

Figure 2:
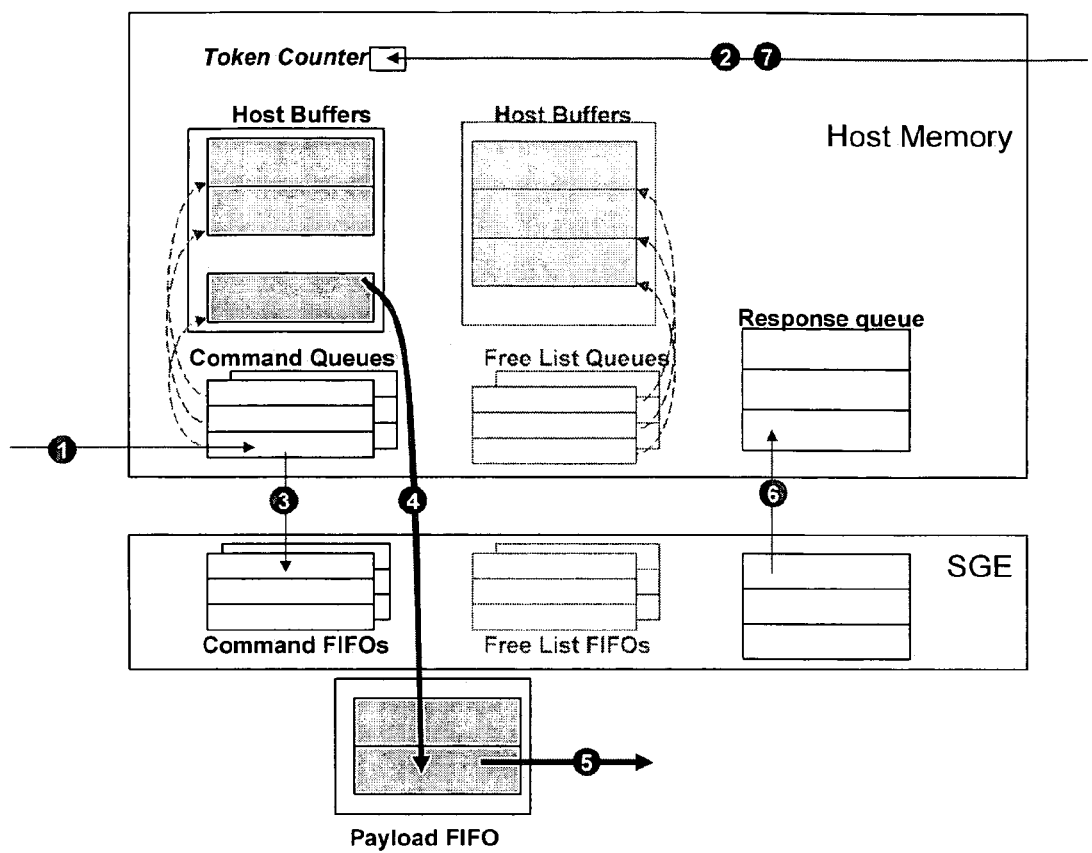
FIG. 2 illustrates a method of using the FIG. 1 DMA I/O device to DMA read data from the CPU memory to the I/O device.

FIG. 2 shows an example of the gather operation used in a transmit operation. The list below the figure refers to the numbers in the figure.

Figure 3:
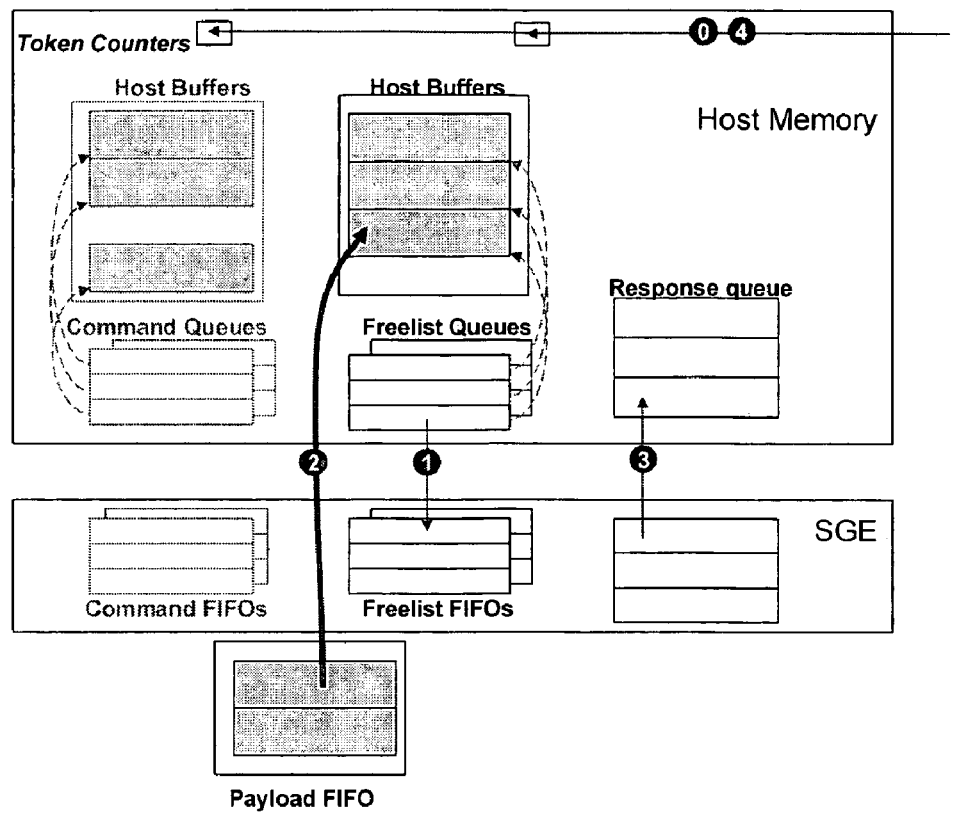
FIG. 3 illustrates a method of using the FIG. 1 DMA I/O device example to DMA write data from the I/O device to the CPU memory.

0. At initialization stage, the driver builds the two command queues with N1 and N2 command entries. Then it sets the two Command Token Counters to N1 and N2 respectively. When driver receives an egress data block from upper layer, including a CPL header and possibly payload data, it generates one or more SGE commands, one for each gathered buffer, and deposits these commands into one of the two Command Queues according to priority criteria. If Terminator is in sleep mode, the doorbell register is rung to wake it up.
1. To support flow control, the driver decrements the Command Token Counter, indicating fewer available spaces in the Command Queue.
2. Upon wakeup, Terminator keeps fetching commands from host Command Queue to its Command FIFOs until the host Command Queue is empty.
3. Terminator executes these commands: it gathers data from host buffers into PM (payload memory) using DMA. Note: this data comprises CPL headers and payload data.
4. Terminator dispatches the data from the Payload FIFO to the TCP/IP protocol engine for processing and then transmits packets over Ethernet.
5. When Terminator finished and collected enough command tokens (e.g. 32), it sends a token-return response message to the Response Queue in host memory, indicating that Terminator has consumed those commands.
6. Driver increments the Command Token Counter, which the flow control algorithm uses FIG. 3 shows an example of the scatter operation used in a receive operation. The list below the figure refers to the numbers in the figure.

0. At initialization stage, driver decides to create two free lists of M1 and M2 buffers, one associated with small buffers and one associated with big buffers. Then the driver sets Free-List Token Counters to M1 and M2 respectively. When it builds (or produces) an empty buffer descriptor and inserts the buffer descriptor in a free-list, it decrements the Free-List Counter by one. At the end of the initialization, when the driver has inserted all M1 and M2 empty buffers into the two Free-Lists, the two Token Counters equal to 0.
1. Terminator's SGE engine pre-fetches available host Free-List buffer descriptors into the on-chip Free-list FIFOs, and waits for the ingress packets to arrive.
2. When a new packet arrives, Terminator allocates one or more free-list buffers according to packet size and scatters data to these host buffers using DMA. Terminator uses a (programmable) packet size threshold to determine if a 'small' free buffer or a 'big' free buffer should be allocated.
3. Terminator sends one Response message to the host Response Queue for each free-list buffer used, indicating to the driver that Terminator "consumed" entries in the Free List Queues.
4. For each Response received, the driver increments the corresponding Free-List Queue Token Counter by one, which the flow-control algorithm uses. Then the driver may pass the buffer pointer to upper layer, and when upper layer finishes processing and returns the buffer to driver, the driver may insert the freed buffer into free-list again followed by a decrement of the Free-List Token Counter.

With this flow control mechanism, whenever the driver sees the Free-List Token Counter equals to M1 (or M2), it knows the Terminator has run out of free-list buffers. An alarm of high watermark of free-list usage can be set according to the Token Counter values.

Command Queues

SGE fetches commands from two command queues over the host-bus interface into two on-Terminator FIFOs. The execution of commands from the two Command Queues can be programmed for example to have Queue 0 higher priority, Queue 1 higher priority, or round-robin, by setting bits in the SG_Control register. The host-based queues have a programmable base address (for example, SG_Cmd0BaseUpr[31:0] and SG_Cmd0BaseLwr[31:12] for queue 0) and a programmable size (SG_CmdSize[16:0]). In one example, the queues' base addresses are 4 Kbytes aligned, and the size register specifies how many 16-Byte entries the queue holds, which allows for a total of 65,536 commands in 1 Mbyte.

Token-Based Flow Control

The flow control of the queues uses an algorithm based on tokens. At reset time, the driver sets the size of the command queues and assumes it has as many tokens as entries in the queue. As the driver pushes commands into the command queues, it decrements the number of available tokens. When it consumes all the tokens, the driver stops pushing commands into the queue until the SGE returns some tokens with Response messages.

When the SGE consumes commands, it returns tokens via the response queue, and the driver increments its token counters accordingly. The token return also serves as an acknowledgment for the commands consumed. In one example, Terminator sends token-return response whenever it accumulated 32 command tokens. At the same time, command tokens can also be piggy-backed in other Response messages, such as delivering of a free-list buffer to the host for received packets.

Fetching Mechanism

All the queues in the SGE use a generation bit protocol to mark valid entries. At reset time, the driver initializes the queues to zeroes and sets the current command generation to one. The SGE will reset its internal FIFO pointers and set its current command generation also to one, and then it will enter a quiet mode that we call SLEEP mode.

After the driver puts some commands in a Command Queue, it will ring its doorbell by PIO writing to a register SG_DoorBell that will wake up the fetch engines. The SGE will issue a DMA read to the queue and if it finds the next command it will keep fetching from the last entry found. The way the SGE knows if an entry is valid or not is by comparing its generation bit to the one on the command.

If a command fetch fails to bring at least one new command, the fetch module for this queue will enter the SLEEP mode and notify the driver through a special Go-to-Sleep response message. The driver wakes up the fetch engines using the door bell later when new commands are written to the queues.

There is a special corner case where a fetch engine is moving to SLEEP mode and at that exact time, the response logic runs out of tokens so it can not notify the driver that it is going to sleep, and it will not fetch more commands because it is in SLEEP mode. This event will generate an interrupt to the host. The register SG_RspQueueCredits can then be queried to figure out if the interrupt reason is the lack of response credits.

If the on-chip FIFO for the queue fills up, the fetch engine for that queue will enter the IDLE mode and will only exit that mode when the queue is half full.

Once the SGE consumes a number of tokens equal to the size of the queue, its fetch pointer wraps and the generation bit is inverted. The driver recognizes this wrap situation and flips its own generation bit also.

Command Decode

In one example, each command is 16 bytes long. Table 2 shows an example of the bit distribution and definition, which is in Little Endian format from host driver point of view (i.e., the Byte 0 is the first byte in host memory). The Terminator DMA engine SGE can be configured to support both Big Endain and Little Endian format of commands in host memory.

TABLE 2

Structure of 16-byte SGE commands

| Byte Location | Bit Location | Data |
|---|---|---|
| Bytes 12:15 | 31:28 | Response queue selector for returned response tokens (only 1 now) |
| | 27:16 | Response Tokens returned to the SGE |
| | 15:8 | Cmd ID for debug purposes |
| | 7:5 | RSVD |
| | 4 | Token valid |
| | 3 | EOP (only meaningful when Data Valid is set) |
| | 2 | SOP (only meaningful when Data Valid is set) |
| | 1 | Data Valid |
| | 0 | Generation bit |
| Bytes 8:11 | 31:0 | Address[63:32] |
| Bytes 7:4 | 31:0 | Address[31:0] |
| Bytes 3:0 | 31 | Generation bit |
| | 30:0 | Length in bytes of buffer (only meaningful when Data Valid is set) |

The SOP and EOP bits have the following use: host data to be transmitted might be composed of several buffers scattered across physical memory. When the driver wants to transmit these buffers as a block to the Terminator, it puts one command in the command queue for each of the memory buffers.

The command describing the first block of the set to be transmitted has the SOP bit set. The commands for the following blocks except for the last one have both SOP and EOP unset, and the last command has EOP set.

If the memory to be transmitted consists of only one block of memory, then both SOP and EOP are set.

The SGE has no notion of what each block of memory represents. It does not know that the first block of memory will probably be a header and the rest data. It is up to the driver to order the commands in such a way that the SGE makes valid blocks out of them. The only warranty that the SGE provides is that commands will be fetched in order and if the two command queues are enabled, the commands from the queues will not be interleaved between SOP and EOP blocks. In other words, if the SGE has just executed an SOP from queue 0 and there are commands pending in both queues, it will keep executing commands from queue 0 until the EOP command shows up regardless of the arbitration policy between the queues.

The SGE keeps a count of the total commands consumed per queue and the number of DMA commands consumed per queue. It returns these command tokens to the driver through a response message after a threshold of 32 tokens is reached or when all the queues enter the SLEEP mode.

A command can carry data information, returned Response queue tokens, or both. Bit 1 set means that the command carries data and therefore the Address, Length, SOP and EOP bits are meaningful. Bit 4 set means that the command carries Response queue tokens, and the Response queue selector (in one example, only one Response queue is available) and Response Credits fields are valid.

The two generation bits are provided to prevent a race condition or transit error where host CPU and the Terminator access the same host memory location at the same time when a command is DMAed across I/O bridge and PCI bus from host memory to Terminator. Basically, the first and last bits of the commands are Generation bits. When SGE de-queues for a command from its Command Queue FIFO, it checks whether these two Generation bits are the same. Otherwise, SGE puts the queue into SLEEP mode, and sends a Response to the host. Since this is a transit error, when driver wakes up the SGE queue again, this command entry should be valid and can be executed.

Command Execution

Commands with bit 4 set increment the Response queue token register with the Response Token field value.

Commands with bit 1 set are DMA commands. SGE will issue a DMA read command to the host bus interface, which some time later returns the data. SGE forwards this data to the Terminator protocol engine without touching it.

Free List Queues

There are two free list queues in the SGE. For example, physically the queues are implemented as a fetch unit. The fetch unit may be identical to the one described for the command queues. The free list entry is a buffer descriptor that includes a pointer to a host anonymous memory buffer plus a length. Each descriptor is 16 bytes.

When a block is injected from the Terminator protocol engine into the SGE to be put in host memory, the SGE decides which free list queue to use. Driver can select one of the two SGE free-list selection criteria (a) all tunneled packets go to free-list 1, and all offloaded packets go to free-list 0, or (b) all packets smaller than a threshold (defined in register SG_FLTHRESHOLD) go to free-list 0, and all packets greater than that threshold go to free-list 1. The offload/non-offload criterion allows different starting byte alignments for buffers in these two free-lists. The packet size criterion provides the flexibility to the driver to adjust the buffer sizes to an optimal point depending on the average block size. For example, if 60% of the blocks to be put in memory are 750 bytes, the driver can set the threshold register to 750, and put buffers of alternating 256 and 512 bytes in queue 0.

After allocating or consuming one or more free-list buffers, the SGE returns free-list buffer tokens to the driver in a FIFO order. It enters the SLEEP mode if the buffer descriptor in front of the free-list queue is invalid.

As with transmit data, the SGE is data agnostic. The only processing typically is to determine if the block is directly placed in memory or if it needs to use a free list entry.

The Terminator protocol engine sends blocks of data which can be just a CPL header or a CPL header plus a data block. A simple decode field provides this information in the first flit, and it also provides the length of the following data block if there is one. An address field provides the direct placement address for some cases, e.g., where it is needed.

All CPL headers are written to free list entry buffers. Data is only placed in free list buffers if they are not direct-placed.

The aligner allows the incoming block to be written to host buffers that start at any byte address in memory.

For each free list entry consumed, the SGE will queue a response command to the driver. The SGE uses the same SOP and EOP bits to mark the beginning and end of a received block. If a block coming from the Terminator protocol engine is longer than one buffer, the first response will have the SOP bit enable but the EOP disabled, and the last response corresponding to the last free list entry used for that block will have the EOP bit set. If the block fits in one buffer, both bits will be set. It is possible that a CPL header and its associated payload data be DMAed into the same free-list buffer.

Free List Entry Decode

Free list entries or buffer descriptors are, for example, 16 bytes long. The following table provides an example bit layout, which is in Little Endian format from host driver point of view. The Terminator DMA engine SGE can be configured to support both Big Endain and Little Endian format of Free-List entries in host memory.

TABLE 3

Free list queue entry or buffer descriptor format

| Byte Location | Bit Location | Data |
|---|---|---|
| Bytes 15:12 | 31:1 | Reserved |
|  | 0 | Generation bit |
| Bytes 11:8 | 31:0 | Address[63:32] |
| Bytes 7:4 | 31:0 | Address[31:0] |
| Bytes 3:0 | 31 | Generation bit |
|  | 30:0 | Length in bytes of buffer |

Similar to the command format, there are two Generation bits that protect against a potential transit error caused by simultaneous accesses of the same host memory location by CPU and the Terminator SGE.

Response Queue

The response queue is the only queue where the SGE is a producer and the host is a consumer. After chip reset the SGE sets the generation bit to a one and the token register to zero. The host zeroes out its queue (i.e., make all queue entries empty and available for new Responses) before sending tokens to the SGE. Once the SGE has tokens it is free to write to the queue at any time, so the driver makes the memory all zeroes.

When the SGE writes a number of entries equal to the size of the queue, it will wrap its pointer to the base of the queue and flip its generation bit.

Response Commands have Three Sources:

The transmit engine sends command token return messages. When SGE executed a transmit command from a command queue, it returns the command queue token back to host driver. These tokens return can be piggybacked on Responses for incoming packets or Response for "Go to Sleep" message, or can be included in a dedicated Response whenever SGE has accumulated 32 command queue tokens.

The host "moving to a SLEEP state condition" message has the following purpose:
  It notifies the I/O device that host is out of the interrupt handlers and wants to be interrupted again (allows for the mixing of polling and interrupt modes)
  Carries a new interrupt coalescing timer which enables "adaptive" interrupt coalescing, i.e. additionally piggy-backs "adaptive" information
  Carries the last address read by the host, which informs the I/O device about the state of the CPU when it sends the message
  In addition we note that it is a fire-and-forget mode message, the cheapest mechanism available to communicate with the host CPU.

The fetch engines send "moving to SLEEP state conditions" when there are no more commands in command queues.

The receive engine sends DMA completion messages. For each incoming packet arrived from wire, SGE will DMA the packet into host free-list memory, and then send a Response to host driver, indicating the new arrival. This type of Response aligns with the free-list buffer, i.e., the packet can be found in the buffer at the top of the free-list.

As a rule-of-thumb, the Response queue size is at least the sum of the two Free-List queue sizes plus the two Command queue sizes divided by 32.

Since each Response is an 8-byte unit, which results in a small PCI bus transaction, the SGE engine supports an optimization mechanism to coalesce multiple Responses and delivers them to host memory in one big PCI DMA transaction. Specifically, a programmer can specify an accumulation timer value in SG_RespAccumTimer register (in units of Terminator core clock cycle). SGE will DMA all accumulated Response to host memory (and generate or interrupt if needed) when it has either accumulated 16 Responses or the Response Accumulation Timer has expired.

Response Decode

Responses are 8 bytes long. The following tables describe an example bit layout, which is in Little Endian format from host driver point of view. The Terminator DMA engine SGE can be configured to support both Big Endain and Little Endian format of Responses in host memory.

TABLE 4

Responses in the SGE Response Queue

| Byte location | Bit location | Data |
| --- | --- | --- |
| Bytes 4:7 | 31 | Free list 1 asleep |
|  | 30 | Free list 0 asleep |
|  | 29 | Command queue 1 asleep |
|  | 28 | Command queue 0 asleep |
|  | 27:23 | Command queue 1 token return |
|  | 22:18 | Command queue 1 DMAs completed |
|  | 17:13 | Command queue 0 token return |
|  | 12:8 | Command queue 0 DMAs completed |
|  | 7:6 | Free List queue ID |
|  | 5 | Token Valid |
|  | 4 | Data Valid |
|  | 3 | OffLoad: this bit tells the driver whether the packet is offloaded or tunneled to host native stack. It is only valid when SOP is valid and when the CPL bit in the SG_Control register is enabled. |
|  | 2 | EOP (only meaningful when Data Valid is set) |
|  | 1 | SOP (only meaningful when Data Valid is set) |
|  | 0 | Generation bit |
| Bytes 3:0 | 31:0 | Length in bytes of buffer (only meaningful when Data Valid is set) |

Token-Based Flow Control

The token-based flow control mechanism is similar to the command queues, except in that here, the host is a producer and the SGE a consumer. At chip reset time the host will set the response queue size and it will own all the Response queue tokens. Since the consumer (the host) has all the tokens, the SGE does not send any responses after queues are initially enabled, and the host "returns" some tokens for responses to show up in the queue. As responses are consumed by the host driver, it returns them to the SGE through commands.

Out of Response Token Interrupt

Under normal circumstances, SGE should not run out of Response queues because that can produce a deadlock in the SGE between the transmit and the receive paths. The host provides Response tokens to SGE in timely fashion so that this situation does not occur. If SGE does run out of Response tokens, an interrupt will be issued to the host with cause register SG_INT_Cause bit 1 set. In order to break the deadlock, the host should keep a few tokens reserved for this purpose and give those tokens to the SGE thru a write to the SG_RspQueueCredits register after an interrupt due to lack of tokens. It is noted that this is not the "correct" way of passing response tokens to the SGE, but just a backdoor mechanism.

Queues Enabling Mechanism

All consumer queues (command 0, command 1, free list 0 and free list 1) come out of reset in the disabled and SLEEP mode. This means that they will not generate fetches until the host enables and wakes them up.

The register SG_CONTROL has a bit map where each bit represents a queue. After reset the register is set to all zeros, and it is up to the host to enable a particular queue.

Once a queue is enabled, it is awakened using the SG_DOORBELL register, which is also a bitmap with the same mapping, which enables the host to wake up queues selectively.

A door bell write with a bit set for a queue that is disabled has no effect.

If a PIO write to the enable register disables a queue, the queue will automatically be frozen and no more fetches or executions will occur for that particular queue until the queue being enabled again.

Peer's State and Interrupt Mechanism

The host and the SGE each keep a local variable with the state of the other. Both the host and the SGE set the local value of the peer's state to asleep at initialization time.

The host driver will let the SGE know that it is going to SLEEP mode by writing to a register called SG_Sleeping. The value written to the register is the offset of the response queue where a new entry is expected.

The SGE will let the host driver know that one of its queues is going to sleep by sending a response queue entry with a message. If the "Go-to-Sleep" received by the host driver does not acknowledge all the outstanding DMA commands in the queue, then the host driver can ring the doorbell and wake up the queue in question.

The SGE will wake up the host with an interrupt (SGE0 in PL_INT_CAUSE register) when it has a Response sent to the Response queue and it thinks that the host is asleep. To minimize the number of interrupts to host, SGE may do the following:

Whenever the host driver goes to the SLEEP mode, i.e., the SG_Sleep register is written, SGE starts an Interrupt Latency Timer.

If there are new packets arrived, they are DMAed into the free lists or direct placed host memories, and one or more Responses are DMAed into the host Response queue. But no interrupts are generated.

When the Interrupt Latency Timer expires, SGE checks to see if there are new Responses sent to the host Response queue during this period. If so, then an interrupt is generated to wake up the host.

In this way, an interrupt will be generated only if the Timer has expired and there are new jobs for the host to do since the last time the host went to sleep. As long as the host is not in SLEEP mode, no interrupt is generated. Therefore, the max interrupt rate to host is governed by the Interrupt Latency Timer value, which is programmable by setting the SG_IntrTimer register.

The host driver will wake up the SGE after modifying the state of the queues if it thinks the SGE is asleep.

Note:

Using Go-to-Sleep message can reduce the number of PIO writes (ringing doorbells). However, a driver can decide to ring doorbell whenever it puts some commands in a Command Queue. In this case, the driver can disable the Go-to-Sleep message.

SGE Bi-Endianess Support

The above Command Queues, Free-List Queues, and Response Queue are defined in Little Endian format that fits well with Intel-based Little Endian machines. For Big Endian machines, driver can organize these queues in Big Endian format in host memory, and then set bit 9 in SGE control register (SG_Control). This bit enables SGE to handle queue entries in Big Endian format in host memory.

Terminator API-CPL Messages

Introduction

CPL (Chelsio Protocol Language) defines the communication message interface between control plane/NPU/host and Terminator chip. This section describes the CPL message headers. For SPI-4, upper layer payload follows CPL header immediately. For PCI-X, upper layer payload can be DMAed separately from CPL header into different locations in host/control plane memory.

In general, the first 8-bit in each CPL header defines the message type (or opcode). CPL messages are roughly classified into four categories that are identified by top 2-bit in message type field:

| Message Type (opcode) | Description |
| --- | --- |
| 00xxxxxx (00-3F) | Connection setup/tear-down and control |
| 01xxxxxx (40-7F) | Reserved |
| 10xxxxxx (80-BF) | Data move |
| 11xxxxxx (C0-FF) | Administration |

For example, most messages with opcode 00xxxxxx or 11xxxxxx are control plane messages, and most messages with 10xxxxxx are for data plane traffic.

All data on Terminator are stored and processed in Big Endian order. For all CPL headers, the Terminator expects to see the opcode byte first. For Little Endian machines, driver makes sure the Opcode byte is placed in the Least-Significant-Byte of a word in host memory. For Big Endian machines, the Opcode byte is placed in the Most-Significant-Byte of a word in host memory.

In the following tables:
Commands identified by * are host to Terminator.
Commands identified by ● are Terminator to host.
Commands identified by Δ are bi-directional.

Message Summary

TABLE 5

CPL Message Summary

| | Command | Parameters | Opcode |
| --- | --- | --- | --- |
| * | CPL_PASS_OPEN_REQ | Ptid, 4-tuple, Opt0, Opt1, | 01 |
| ● | CPL_PASS_OPEN_RPL | Ptid, 4-tuple, status | 02 |
| ● | CPL_PASS_ACCEPT_REQ | Ptid, 4-tuple, TOS, tid, TCP-Options, DMAC SMAC, VLAN tag, IRS, Unknown-TCP-Options | 0E |
| * | CPL_PASS_ACCEPT_RPL | tid, Opt0, status | 04 |
| ● | CPL_PASS_ESTABLISH | Ptid, 4-tuple, TOS, tid, ISS, IRS | 03 |
| * | CPL_ACT_OPEN_REQ | Atid, 4-tuple, Opt0, Interface/VLAN-tag | 05 |
| ● | CPL_ACT_OPEN_RPL | Atid, 4-tuple, tid, status. | 06 |
| ● | CPL_ACT_ESTABLISH | Atid, 4-tuple, TOS, tid, ISS, IRS | 17 |
| * | CPL_SET_TCB | tid, length | 26 |
| * | CPL_SET_TCB_FIELD | Tid, offset, mask, value | 27 |

TABLE 5-continued

CPL Message Summary

| | Command | Parameters | Opcode |
| --- | --- | --- | --- |
| ● | CPL_SET_TCB_RPL | Tid, status | 28 |
| * | CPL_PCMD | tid, dlen_in, dlen_out, <pcmdinfo> | 29 |
| * | CPL_GET_TCB | tid, | 24 |
| ● | CPL_GET_TCB_RPL | tid, length, status | 25 |
| * | CPL_CLOSE_CON_REQ | tid, | 07 |
| ● | CPL_CLOSE_CON_RPL | tid, status, SendNextSeqNum, RcvNextSeqNum | 08 |
| * | CPL_CLOSE_LISTSVR_REQ | Ptid | 09 |
| ● | CPL_CLOSE_LISTSVR_RPL | Ptid, status | 0A |
| Δ | CPL_ABORT_REQ | tid, status | 0B |
| Δ | CPL_ABORT_RPL | tid, Status | 0C |
| ● | CPL_PEER_CLOSE | Tid | 0D |
| * | CPL_TX_DATA | tid, length, Urgent-Pointer, More-Data-bit, Shove-bit, ULP-mode, ULP-submode | B1 |
| ● | CPL_TX_DATA_ACK | tid, credit | B0 |
| ● | CPL_RX_DATA | tid, length, seq, urgent-pointer, status | A0 |
| * | CPL_RX_DATA_ACK | tid, credit | A3 |
| ● | CPL_RX_DATA_DDP | tid, length, seq, next-expected-seq, ULP_CRC, DDP_Valid, status | A1 |
| * | CPL_TX_PKT | interface, length | B2 |
| ● | CPL_RX_PKT | interface, cksum/(partial cksum), length | AD |
| * | CPL_RTE_DELETE_REQ | Atid, L2T_LUT_BASE, L2T_LUT_IX | C0 |
| ● | CPL_RTE_DELETE_RPL | Atid, status | C1 |
| * | CPL_RTE_WRITE_REQ | Atid, Control, L2T_LUT_BASE, L2T_LUT_IX, L2T_IX, NETMASK, FADDR | C2 |
| ● | CPL_RTE_WRITE_RPL | Atid, status | D3 |
| * | CPL_RTE_READ_REQ | Atid, L2T_LUT_BASE, L2T_LUT_IX | C3 |
| ● | CPL_RTE_READ_RPL | Atid, L2T_IX, NETMASK, FADDR, status | C4 |
| * | CPL_L2T_WRITE_REQ | Atid, L2T_IX, INT, VLAN, DMAC | C5 |
| ● | CPL_L2T_WRITE_RPL | Atid, status | D4 |
| * | CPL_L2T_READ_REQ | Atid, L2T_IX | C6 |
| ● | CPL_L2T_READ_RPL | Atid, INT, VLAN, DMAC, status | C7 |
| * | CPL_SMT_WRITE_REQ | Atid, INT, MAX_MTU_IX, SMAC0, SMAC1 | C8 |
| ● | CPL_SMT_WRITE_RPL | Atid, status | D5 |
| * | CPL_SMT_READ_REQ | Atid, INT | C9 |
| | CPL_SMT_READ_RPL | Atid, MAX_MTU_IX, SMAC0, SMAC1, status | CA |
| ● | CPL_ARP_MISS_REQ | tid, FADDR, reason | CD |
| * | CPL_ARP_MISS_RPL | Tid | CE |
| ● | CPL_ERROR | Tid, error_code | D7 |

Status Codes

Error codes used in CPL messages are defined below. These error codes are returned from Terminator to control plane or host.

0: success
1: TCAM parity error
2: TCAM invalid region*
3: TCAM full
4: TCAM deletion failed
5: CM deletion failed*
10: illegal local IP*

11: inconsistent options*
12: invalid TID*
14: invalid PTID*
15: invalid length*
16: memory error*
invalid CPL format*
invalid routing entry*
20: remote reject/reset
22: connection already exist
23: ARP miss
24: SYN arrived in wrong state
30: connection establish timed out
31: retransmit timed out
32: persist timed out
33: FIN_WAIT 2 timed out
34: keepalive timed out
35: 2MSL timed out
40: connection in FIN_WAIT_2 state*
41: connection in WAIT_ARP RPL state
99: general error
* Those status codes are not supported in one example.

CPL Commands

TABLE 6

CPL_PASS_OPEN_REQ
CPL_PASS_OPEN_REQ
core->term :: passive open listening connection

| Flit | Field | Type |
|---|---|---|
| 0 | 63:56 | 0x01 |
| 0 | 55:32 | Ptid (assigned by core) |
| 0 | 31:16 | LP (local port) |
| 0 | 15:0 | FP (foreign port) |
| 1 | 63:32 | LADDR (local IP address) |
| 1 | 31:0 | FADDR (foreign IP address) |
| 2 | 63:8 | Option 0 |
| 2 | 7:0 | reserved |
| 3 | 63:0 | Option 1 |

Command Description

CPL_PASS_OPEN_REQ is sent from the control plane to Terminator to start a server/connection that listens on a specified local port (and IP address). The passive open attributes are defined by the command parameters described below. When mapping to a sockets API, this command would typically be sent as the result of a process called to listen( ). (However, the level of control using CPL_PASS_OPEN_REQ is greater than that provided by socket/bind/listen semantics.)

Terminator can be configured to operate in either Protection Mode or Compatibility Mode (in global configuration register TP_CLOBAL_CONFIG).

Protection Mode:

In this mode, all connections, including non-offloaded connections, have a TCAM entry. This is to ensure only legitimate ingress packets (that have a match to a TCAM entry when doing lookup) are sent to control plane/host. Therefore, CPL_PASS_OPEN_REQ is sent for each passive opened server. For non-offloaded server, it is set to ASK mode, and when remote SYN arrived, host will set NON-OFFLOAD in CPL_PASS_ACCEPT_RPL. This ensures a TCAM entry for the non-offloaded connection.

Compatibility Mode

In this mode, only an offloaded connection has a TCAM entry. Terminator will tunnel every ingress packet that has a TCAM lookup miss. CPL_PASS_OPEN_REQ is sent for offloaded listening servers only. If control plane wants to deny packets designated to a local port or IP address, it can issue CPL_PASS_OPEN_REQ with ConnectionPolicy=DENY.

At Terminator initialization stage, host driver configures a server region in TCAM that holds one entry for each passive opened server. Each entry in this server region is addressed (or indexed) by an identifier PTID, which is ranged by value set in register TP_TCAM_SVR_BASE and TP_TCAM_ROUT_BASE. It is host SW's responsibility to manage the configured PTID space and allocate a PTID when call the CPL_OPEN_REQ.

Terminator supports a server to be opened with SYN-cookie ON that protects against the SYN-flooding attack and ACK attack. Depending on the pretend server usage, host SW needs to pre-configure the TCAM server region usage (in TP_GLOBAL_ONFIG register) as:

All servers be opened with SYN-cookie OFF (default).

Some servers be opened with SYN-cookie ON, and some with SYN-cookie OFF. In this case, host SW allocates odd PTIDs for SYN-cookie ON servers and even PTIDs for SYN-cookie OFF servers.

All servers be opened with SYN-cookie ON.

Note:

All SYN-cookie ON servers use AUTO mode in parameter Option 1.

The TP_GLOBAL_CONFIG server region usage definition and Option 1 parameter definition on SYN cookie should be consistent. If there is a conflict (e.g., because of a software bug), the Option 1 definition is ignored or an error is reported.

When allocating PTID, host SW ensures that wildcard servers take higher PTIDs than non-wildcard servers, since TCAM performs "first-match" when lookups.

To configure a firewall filter, control plane can open a server with Policy=DENY. In this case, all incoming 4-tuple that match this server's 4-tuple (can be wildcard) will be dropped. Because of TCAM "first-match" behavior, firewall filters should take lower PTIDs than normal servers.

As a result of CPL_PASS_OPEN_REQ command, Terminator will return CPL_PASS_OPEN_RPL to the control plane indicating the listening server entry created successfully or failed.

The Option 0 below defines per connection configurable parameters. Therefore Option 0 is also used in CPL_ACT_OPEN_REQ and CPL_PASS_ACCEPT_RPL for individual connection setup. When used in CPL_PASS_OPEN_REQ, all connections to the server use the same parameters specified here. However, if the server is ConnectionPolicy=ASK, then control plane can reset these parameters on per connection basis in CPL_PASS_ACCEPT_ RPL.

The TCAM_BYPASS mode in Option 0 defines how Terminator resolves layer 2 information for egress packets of a connection (such as Destination MAC, Source MAC, VLAN tag, outbound interface, etc). If TCAM_BYPASS bit is set, Terminator will use and only use the L2T_IX cached in per-connection TCB to index into an on-chip Layer 2 Table (L2T) and find the layer 2 info for Ether header assembly. Otherwise, Terminator may lookup TCAM Routing Region to find the desired L2T_IX. This is especially useful when Connection Policy=AUTO, which allows Terminator to automatically finish the 3-way handshake. The following list shows different scenarios of configuring Connection Policy and TCAM_BYPASS mode:

AUTO & TCAM_BYPASS:

The L2T_IX in CPL_PASS_OPEN_REQ Option 0 is saved in TCBs of all connections to this server. Terminator automatically sends SYN-ACK to peer by using this L2T_IX to index into the L2T table for layer 2 information.

All clients to this server are located behind one router. This scenario may rarely occur in real deployment.

AUTO & ~TCAM_BYPASS:

All incoming SYN will result a TCAM Routing Region lookup.

If the lookup returns a valid L2T_IX (non zero), then the L2T_IX is saved in TCB, and a SYN-ACK is sent to remote peer automatically.

If the lookup returns an invalid L2T_IX (zero), Terminator issues a CPL_ARP_MISS_REQ to host to resolve the miss. Then host will update the L2T table, set the L2T_IX in TCB, and send CPL_ARP_MISS_RPL to Terminator to. A peer retransmitted SYN will hit a valid TCAM and L2T entry, and Terminator in turn sends out a SYN-ACK to peer.

ASK & TCAM_BYPASS:

When SYN received, Terminator sends a CPL_PASS_ACCEPT_REQ to host.

Host is responsible for ensure a valid entry in L2T table for this connection, and then host passes the right L2T_IX in Option 0 of CPL_PASS_ACCEPT_RPL to Terminator, which in turn saves this L2T_IX in TCB and sends a SYN_ACK out to peer.

ASK & ~TCAM_BYPASS:

This is an invalid configuration.

Note: in this release, after initial L2T_IX being set correctly in TCB, Terminator will use the TCB cached L2T_IX for all followup egress packets of the connection, regardless of TCAM_BYPASS or not. If a connection does not transmit packet for a while, and the ARP aged out, host may set the TCB L2T_IX to 0 so that the corresponding entry in L2T table can be re-allocated to other connections. Later if the connection starts to transmit, host is responsible to set a valid L2T_IX in TCB before it sends the data to Terminator. If Terminator received data from peer and wants to send ACK to peer, but find the TCB L2T_IX=0, Terminator will send a CPL_ARP_MISS_REQ to host. Host in turn resolves the ARP miss, updates the L2T_IX in TCB, and sends CPL_ARP_MISS_RPL to Terminator.

The Option 1 defines per server configurable parameters, and therefore is dedicated to CPL_PASS_OPEN_REQ.

For most parameters in Option 0 and Option 1, if not set, then default value will be used. If set, then value defined here overrides the default value.

Selected Field Descriptions:

| Field | Type | Description |
|---|---|---|
| Ptid | Range | The parent/server tag as specified by the control plane. The control plane is responsible for guaranteeing uniqueness and managing reuse of Ptid values for listening servers. The TP_TCAM_ROUT_BASE is a base address configured in TCAM for the Routing Region, which is above the Server Region physically. If the TP_GLOBAL_CONFIG register's "TCAM Server Region Usage" (bits 9:8) is configured to be mixture of SYN-cookie ON and OFF servers, then must assign odd Ptid to SYN-cookie ON servers and even Ptid to SYN-cookie OFF servers. |
| | MIN TP_TCAM_SVR_BASE: | |
| | MAX TP_TCAM_ROUT_BASE − 1 | |

| Field | Type | Description |
|---|---|---|
| LP | 16-bit non-zero port value | The local port of the listening server being requested. |

| Field | Type | Description |
|---|---|---|
| FP | 16-bit port value<br>0 = "any foreign port" | The foreign port of the listening server being requested. This is typically zero to allow any remote peer port to connect (e.g. the sockets API has no way to specify this for a listening socket). However, a non-zero value can be set to limit the listening server to a specific remote peer port. |

| Field | Type | Description |
|---|---|---|
| LADDR | 32-bit IPv4 Address<br>0 = wildcard | The local address of the listening server being requested. A zero value tells the listening server to accept any specified $IP_{dst}$ in a remote peer's connection request. |

| Field | Type | Description |
|---|---|---|
| FADDR | 32-bit IPv4 Address<br>0 = "any foreign address" | The foreign address of the listening server being requested. This is typically zero to allow any remote IP address to connect ($IP_{src}$ of the remote peer's connection request). However, a non-zero value can be specified, along with the FADDR_NETMASK in option 1, to limit the listening server to a specific remote peer address. |

Option 0: (per connection options -- common to CPL_PASS_OPEN_REQ. CPL_ACTIVE_OPEN_REQ, and CPL_PASS_ACCEPT_RPL)

| Field | Name | Description |
|---|---|---|
| 55:55 | MAX_SEG_OVERRIDE | If set, use the MAX_SEG value in option instead of default for the interface. |

-continued

Option 0: (per connection options -- common to CPL_PASS_OPEN_REQ, CPL_ACTIVE_OPEN_REQ, and CPL_PASS_ACCEPT_RPL)

| Field | Name | Description |
|---|---|---|
| 54:52 | MAX_SEG | If MAX_SEG_OVERRIDE, MSS to send to remote. Selects one of 8 values from on-chip MAX_MTU table (0-7). Typically, this value should not greater than the max MTU size allowed on an interface. |
| 51:51 | MAXRT_OVERRIDE | If set, use MAXRT instead of system default. |
| 50:47 | CONN_MAXRT | If MAXRT_OVERRIDE, use this for Maximum Retransmission instead of default value. Indicates number of exponential backoffs (or retransmits). Range: 1-16; Default = 13 |
| 46:46 | KEEPALIVE | 0: no TCP keepalive, (default). 1: activates TCP keepalive, |
| 45:42 | WSF | Window Scaling Factor, 4-bit for value of 0-14 (default = 0) |
| 41:41 | NAGLE_ALGO | 0: turn off the Nagel algorithm for this connection 1: turn on the Nagle algorithm (default) |

Option 0: (per connection options -- common to CPL_PASS_OPEN_REQ, CPL_ACTIVE_OPEN_REQ, and CPL_PASS_ACCEPT_RPL)

| Field | Name | Description |
|---|---|---|
| 40:40 | TCAM_BYPASS | 0: Use TCAM lookup to retrieve L2 info (default) 1: Use L2T_IX below instead of looking TCAM routing table. Note: If the Terminator is configured to use 5-tuple (4-tuple + Interface or VLAN Tag) lookup, it's required to use TCAM_BYPASS mode. If a listening server is passively opened with ASK mode (see Option 1 below), then it's required to use TCAM_BYPASS mode. If a listening server is passively opened with AUTO mode, then it can be either TCAM lookup mode or bypass mode. |
| 39:36 | Reserved | unused |
| 35:28 | L2T_IX | L2T_IX to use if TCAM_BYPASS is set. Range: 0-255 |
| 27:26 | SM_SEL | Source Mac Selector. 0: select SMAC0, (default) 1: select SMAC1, |
| 25:25 | No Congestion Control | 0: use normal congestion control (default) 1: turn off congestion control for this connection, no slow start Caution: use this only on direct attached LAN to avoid disturbing Internet. |
| 24:24 | Delayed Ack Enable | 0: turn off delayed Ack for this connection, no delayed Ack. (default) 1: normal delayed Ack (200 ms) |
| 23:18 | TOS | The first 6-bit of TOS field in IP header. (Default = 0) |
| 17:4 | MaxRcvBuffer Size (in Kbytes) | The initial core/host-side receive buffer size set for active connections spawned from this listening server. This limits the amount of RX data that can be outstanding to the host (i.e. the sequence number delta between CPL_RX_DATA and CPL_RX_DATA_ACK). This field is 14-bit long with unit of 1 kB. So the connection receive buffer can range from 1K to 16M (2**24) bytes. (global default = 64K) |
| 3:0 | ULP Mode | Indicate the connection characteristics: 0: PASS // this is a normal TCP connection 1: TCP DDP // this is a direct placed TCP |

-continued

Option 0: (per connection options -- common to CPL_PASS_OPEN_REQ, CPL_ACTIVE_OPEN_REQ, and CPL_PASS_ACCEPT_RPL)

| Field | Name | Description |
|---|---|---|
| | | connection, that supports out-of-order data placement based on sequence number. 2: iSCSI // this is an iSCSI connection 3: iWARP // this is an RDMA/iWARP connection 4: SSL // this is an SSL or TLS connection. |

Option 1 (per server options -- unique to CPL_PASS_OPEN_REQ)

| Field | Name | Description |
|---|---|---|
| 63:32 | FADDR NETMASK | Net mask for foreign IP address for a server connection. If bit is set, then this is a "care" bit, if clear then it is a "don't care" bit. This field, along with the FADDR, allows server to accept connections from specified IP subnets. (default: 0x0) |
| 31:22 | reserved | Unused |
| 21:21 | SYN DEFENSE | Use SYN cookies to protect against SYN attack, meaningful only in AUTO mode. 0: SYN-cookie off (default) 1: SYN-cookie on |
| 20:19 | Connection Policy | 0 AUTO (automatically finish 3-way handshake) (default) 1 = ASK (Ask control plane before sending SYN/ACK) 2 = reserved 3 DENY = (drop the packet) Note: the following requires ASK mode: L2 TCAM_BYPASS mode. 5-tuple lookup mode. Active close configured to "Host in 2MSL" with 0 or small Terminator 2MSL value. |
| 18:18 | reserved | Unused |
| 17:6 | Listen Interface Or VLAN Tag | This field is used for the 5$^{th}$ tuple of the 5-tuple lookup configuration. Whether Listen Interface or VLAN Tag is determined by the bits 18:17 of TP_GLOBAL_CONFIG register. If Listen Interface, it defines a bitmap for interfaces from which the server is allowed to receive connections. E.g. 001000110100 allow interfaces 2, 4, 5, and 9 to receive connections. SYN arrived in other interfaces are dropped. Since Terminator supports max of 10 interfaces, the top two bits are ignored. If VLAN Tag, it defines the VLAN from which the server is allowed to receive connections. This is valid only if Terminator configured to use 5-tuple lookup (4-tuple + Interface or VLAN). Default uses 4-tuple lookup. (default: 111111111111) |
| 5:0 | reserved | Unused |

CPL_PASS_OPEN_RPL

TABLE 7

CPL_PASS_OPEN_RPL
CPL_PASS_OPEN_RPL
term->core :: replies the pass_open_req

| Flit | Field | Type |
|---|---|---|
| 0 | 63:56 | 0x02 |
| 0 | 55:32 | Ptid |
| 0 | 31:16 | LP (local port) |
| 0 | 15:0 | FP (foreign port) |

TABLE 7-continued

CPL_PASS_OPEN_RPL
CPL_PASS_OPEN_RPL
term->core :: replies the pass_open_req

| Flit | Field | Type |
|---|---|---|
| 1 | 63:32 | LADDR (local IP address) |
| 1 | 31:0 | FADDR (foreign IP address) |
| 2 | 63:8 | reserved |
| 2 | 7:0 | status |

Command Description

CPL_PASS_OPEN_RPL is sent from Terminator to the control plane as a reply to a previous CPL_PASS_OPEN_REQ command that requests creation of a listening server/connection.

The result of OPEN request is returned in status field. If a listening server cannot be created, the status indicates FAILED. Otherwise, the status indicates SUCCESS, which is a notification to the control plane that Terminator is ready to support connection attempts from remote peers to the listening server.

Selected Field Descriptions:

Parameter fields in this command (Ptid and the 4-tuple) are all echoed from the original CPL_PASS_OPEN_REQ command.

| Field | Type | Description |
|---|---|---|
| Status | 32-bit code | The status of the OPEN request (see Error Code definition in Section 0)<br>0: open success<br>1: TCAM parity error<br>2: TCAM invalid region<br>10: illegal local IF address<br>11: inconsistent options<br>14: invalid PTID<br>16: memory error<br>99: general error |

CPL_PASS_ESTABLISH

TABLE 8

CPL_PASS_ESTABLISH
CPL_PASS_ESTABLISH
Term->core :: connection notification

| Flit | Field | Type |
|---|---|---|
| 0 | 63:56 | 0x03 |
| 0 | 55:32 | Ptid |
| 0 | 31:16 | LP (local port) |
| 0 | 15:0 | FP (foreign port) |
| 1 | 63:32 | LADDR (local IP address) |
| 1 | 31:0 | FADDR (foreign IP address) |
| 2 | 63:56 | TOS |
| 2 | 55:32 | tid (assigned by terminator) |
| 2 | 31:24 | L2T_IX |
| 2 | 23:0 | reserved |
| 3 | 63:32 | ISS |
| 3 | 31:0 | IRS |

Command Description

CPL_PASS_ESTABLISH is sent from Terminator to the control plane when a new active connection has been spawned from a listening server. Command fields identify the new established connection by 4-tuple and by a tag (tid) that Terminator uses to manage the connection. This tid is then used as a connection id (or handle) by control plane to reference the connection for all transmits and receives.

If the listening server is opened with AUTO mode, this message is the first one from Terminator for a newly established connection.

Selected Field Descriptions:

| Field | Type | Description |
|---|---|---|
| Ptid | Unsigned | The server tag from which this new connection was spawned. |

LP, FP, LADDR, and FADDR are the fully specified 4-tuple for the offloaded TCP connection.

| Field | Type | Description |
|---|---|---|
| TOS | Unsigned | The first 6 bits of TOS field extracted from IP header of incoming packet from remote. |

| Field | Type | Description |
|---|---|---|
| tid | Unsigned | The connection tag assigned by Terminator to identify the newly created connection. Control plane should use the tid to reference this connection during its lifetime. |

| Field | Type | Description |
|---|---|---|
| L2T_IX | 8-bit Layer 2 Table index | When a connection is established, Terminator passes the L2T_IX that is used for this connection (which is saved in TCB) to the control plane. Control plane can use this info to track L2 info for the connection if needed. |

| Field | Type | Description |
|---|---|---|
| ISS | 32-bit TCP sequence number | The initial send TCP sequence number used by Terminator for this offloaded connection. (Terminator → remote peer direction)<br>Note: the value returned here is actually ISS+1, which counted the 1 used by the SYN packet. |

| Field | Type | Description |
|---|---|---|
| IRS | 32-bit TCP sequence number | The initial receive TCP sequence number received by Terminator for this offloaded connection. (Remote Peer → Terminator direction)<br>Note: the value returned here is actually IRS+1, which counted the 1 used by the SYN packet. |

CPL_PASS_ACCEPT_REQ

TABLE 9

| | CPL_PASS_ACCEPT_REQ CPL_PASS_ACCEPT_REQ term->core :: connection request notification | |
|---|---|---|
| Flit | Field | Type |
| 0 | 63:56 | 0x0E |
| 0 | 55:32 | Ptid |
| 0 | 31:16 | LP (local port) |
| 0 | 15:0 | FP (foreign port) |
| 1 | 63:32 | LADDR (local IP address) |
| 1 | 31:0 | FADDR (foreign IP address) |
| 2 | 63:56 | TOS |
| 2 | 55:32 | tid (assigned by terminator) |
| 2 | 31:0 | TCP Options |
| 3 | 63:16 | DMAC (local MAC) |
| 3 | 15:0 | 802.1p bits and VLAN tag |
| 4 | 63:16 | SMAC (foreign MAC) |
| 4 | 15:0 | Reserved |
| 5 | 63:32 | IRS (Initial Receive Seq number) |
| 5 | 31:0 | Unknown TCP Options |

Command Description

When Terminator starts a listening server (that is, when it has received a CPL_PASS_OPEN_REQ command from the host and has returned a CPL_PASS_OPEN_RPL reply), it is ready to accept incoming connections.

With an established listening server for which the Connection Policy is set to ASK, when Terminator receives a connection-setup SYN packet from a remote peer, it sends the CPL_PASS_ACCEPT_REQ to the control plane to notify the host. The host is responsible for determining whether the connection needs to be offloaded, non-offloaded, or rejected.

The priority level (TOS) and TCP options selected by remote are passed to control plane. Control plane may make an accept or reject decision based on some of the information along with the 4-tuple, MAC addresses and VLAN tag.

If a SYN arrived while control plane still has a connection with the same 4-tuple that is in TIME_WAIT state, then control plane can decide to accept the connection if the new SYN's IRS is higher than the last connection's final received sequence number.

Currently, Terminator only supports popular TCP options, such as SACK, Window Scale, Timestamp, MSS, and ECN. If a SYN from remote carried TCP options that are unknown to Terminator, these options' KIND parameters are copied to control plane in Unknown TCP Options field. Control plane can decide to support these TCP options by make the connection non-offloaded, reject the connection, or continue with the connection as offloaded. In case of offloaded, Terminator will turn down the unknown TCP options when it sends out the SYN-ACK. If control plane decides to support some of these options by making it non-offloaded, and needs to know the entire option parameters, then control plane just sends CPL_PASS_ACCEPT_RPL with Status=NON-OFFLOAD to Terminator. Later, a retransmitted SYN packet will be tunneled by Terminator to control plane TCP stack that carries the entire TCP option parameters.

Selected Field Descriptions:

| Field | Type | Description |
|---|---|---|
| Ptid | Unsigned | The server tag corresponding to this connection query. |

LP, FP, LADDR, and FADDR are the fully specified 4-tuple for the proposed TCP connection.

| Field | Type | Description |
|---|---|---|
| TOS | Unsigned | The first 6 bits of TOS field extracted from IP header of incoming packet from remote. |

| Field | Type | Description |
|---|---|---|
| tid | Unsigned | The connection tag used by Terminator to identify the proposed connection. |

| TCP Options | | |
|---|---|---|
| Field | Name | Description |
| 31:16 | Max Segment Size (MSS) | The max segment size selected by remote in SYN. |
| 15:8 | Window Scale factor | Window scale shift count selected by remote |
| 7:7 | Timestamp | 0: Timestamp option disabled by remote |
| | | 1: Timestamp option enabled by remote |
| 6:6 | SACK | 0: SACK option disabled by remote |
| | | 1: SACL option enabled by remote |
| 5:5 | Explicit Congestion Notification (ECN) | 0: ECN option disabled by remote |
| | | 1: ECN option enabled by remote |
| 4:0 | Reserved | |

| Field | Type | Description |
|---|---|---|
| DMAC | Unsigned | The 6-byte destination MAC from the arrived SYN Ether header, which corresponds to a local MAC address. |

| Field | Type | Description |
|---|---|---|
| VLAN tag | Unsigned | The 12-bit VLAN tag and 3-bit 802.1p in Ether header, if any. |

| Field | Type | Description |
|---|---|---|
| SMAC | Unsigned | The 6-byte source MAC from the arrived SYN Ether header, which corresponds to a neighbor's MAC address. |

| Field | Type | Description |
| --- | --- | --- |
| IRS | Unsigned | The Initial Receive Sequence number carried in the remote SYN packet. |

| Field | Type | Description |
| --- | --- | --- |
| Unknown TCP Options | Unsigned | If a remote SYN carried TCP options not supported by Terminator, these options' KIND parameters are copied here and delivered to control plane.<br>31:30 unused<br>29:25 kind for unknown option 6<br>24:20 kind for unknown option 5<br>19:15 kind for unknown option 4<br>14:10 kind for unknown option 3<br>9:5 kind for unknown option 2<br>4:0 kind for unknown option 1 |

CPL_PASS_ACCEPT_RPL

TABLE 10

CPL_PASS_ACCEPT_RPL
CPL_PASS_ACCEPT_RPL
core->term :: response to PASS_ACCEPT_REQ

| Flit | Field | Type |
| --- | --- | --- |
| 0 | 63:56 | 0x04 |
| 0 | 55:32 | Tid |
| 0 | 31:0 | Reserved |
| 1 | 63:32 | Reserved |
| 1 | 31:0 | FADDR (foreign IP address) |
| 2 | 63:8 | Option 0 |
| 2 | 7:0 | Status |

Command Description

When an established listening server is in ASK mode, and Terminator has sent CPL_PASS_ACCEPT_REQ to request that the control plane decide whether to establish a passive connection, the control plane responds with CPL_PASS_ACCEPT_RPL to with its decision in the 'Status' field. Three cases are:

Accept as an offloaded connection: The command may also pass configuration/operating options for the connection that could not be determined until the foreign IP was known, such as SM_SEL, TCAM_BYPASS mode, etc. Once Terminator receives these, it will send a SYN-ACK to finish the 3-way handshake with the remote. If there are any unsupported TCP options in remote SYN, these options are turned down in SYN-ACK.

The Option 0 in the CPL_PASS_ACCEPT_RPL will overwrite the previous value from CPL_PASS_OPEN_REQ.

Reject the connection: Terminator will send a RST packet to remote. The Option 0 fields L2T_IX is valid in order for Terminator to send out the RST.

Accept as a non-offloaded connection: The Terminator will set TCP state as NON-OFFLOAD, and start to tunnel future packets of this connection to control plane.

Note: the control plane software that interprets the CPL_PASS_ACCEPT_REQ command needs to synthesize an original SYN packet (including Ether header) based on info from CPL_PASS_ACCEPT_REQ, and forward it to the control plane native TCP stack. If there is information missing that is needed to synthesize the SYN packet, such as unknown TCP option parameters, then no SYN is synthesized. Later, a remote retransmitted SYN will be tunneled by Terminator that carries all needed information to the control plane stack.

The Option 0 fields are not used.

Selected Field Descriptions:

| Field | Type | Description |
| --- | --- | --- |
| tid | Unsigned | The connection tag used by Terminator to identify the proposed connection. This must match the tid field value from the CPL_PASS_ACCEPT_REQ. |

FADDR is the IP address of remote peer for the accepted TCP connection. Option 0 is defined in Section 0.

| Field | Type | Description |
| --- | --- | --- |
| status | Unsigned | Status of CPL_PASS_ACCEPT_REQ:<br>0: accept as an offloaded connection, with Option 0.<br>1: reject the connection.<br>2: accept as a non-offloaded connection. |

CPL_ACT_OPEN_REQ

TABLE 11

CPL_ACT_OPEN_REQ
CPL_ACT_OPEN_REQ
core->term :: request active connection

| Flit | Field | Type |
| --- | --- | --- |
| 0 | 63:56 | 0x05 |
| 0 | 55:32 | Atid |
| 0 | 31:16 | LP (local port) |
| 0 | 15:0 | FP (foreign port) |
| 1 | 63:32 | LADDR (local IP address) |
| 1 | 31:0 | FADDR (foreign IP address) |
| 2 | 63:8 | Option 0 |
| 2 | 7:7 | NON-OFFLOAD bit |
| 2 | 6:0 | reserved |
| 3 | 63:52 | Interface/VLAN Tag |
| 3 | 51:0 | reserved |

Command Description

The control plane sends CPL_ACT_OPEN_REQ to Terminator in order to initiate (active open) a new TCP connection to a remote peer. Connection options are carried in Option 0, common to CPL_PASS_OPEN_REQ.

When Terminator finishes the connection set up successfully, it moves to ESTABLISHED state, and it sends CPL_ACT_ESTABLISH to control plane notifying is of a new established connection. If the connection set up failed, Terminator sends CPL_ACT_OPEN_RPL with status FAILED to control plane.

Note:

To actively open an offloaded connection, host has a valid non-zero L2T_IX for the connection before calling CPL_ACT_OPEN_REQ.

If host wants to migrate a non-offloaded connection to Terminator as offloaded connection, it calls CPL_ACT_OPEN_REQ with L2T_IX=0.

If NON_OFFLOAD Bit Set:

Terminator will create an entry in TCAM and CM with TCB state marked as "Non-Offloaded connection".

After calling the CPL_ACT_OPEN_REQ, the control plane/host is responsible for sending out a fully encapsulated SYN in tunnel mode CPL_TX_PKT command.

If NON-OFFLOAD bit is set, the Option 0 is NOT used.

If the Terminator is globally configured for 5-tuple lookup, then the $5^{th}$ tuple for this connection is specified in the "Interface/VLAN tag" field. Whether it's an Interface or VLAN tag is determined by the global parameter "5-tuple lookup" defined in TP_GLOBAL_CONFIG register.

Selected Field Descriptions:

| Field | Type | Description |
|---|---|---|
| Atid | Range<br>MIN: 0x0<br>MAX: 16777215 (or 0xFFFFFF) | The Atid is specified by control plane when issuing an ACT_OPEN_REQ, and is echoed back in corresponding ACT_OPEN_RPL or ACT_ESTABLISH. Unlike tid or ptid, atid does not reference any Terminator memory location (TCAM or CM). Its pure purpose is to identify the proposed connection between control plane and Terminator. |

Option 0 is defined in Section 0.

| Field | Type | Description |
|---|---|---|
| Non-Offload | Unsigned | If set, this is an active open of non-offloaded (tunneled) connection. |

| Field | Type | Description |
|---|---|---|
| Interface Or VLAN Tag | Unsigned | Specify the Interface or VLAN tag this connection is to use.<br>In case of interface, the lower 10-bit of the 12-bit field is used to represent the 10 interfaces supported. In this case, one and only one bit should be set in the bitmap, e.g. 0000001000 specifies the connection should be set up through interface 4. This field is valid only if the Terminator is globally configured to be 5-tuple lookup mode (default: 4-tuple lookup). |

CPL_ACT_OPEN_RPL

TABLE 12

CPL_ACT_OPEN_RPL
CPL_ACT_OPEN_RPL
term->core :: reject the act_open_req

| Flit | Field | Type |
|---|---|---|
| 0 | 63:56 | 0x06 |
| 0 | 55:32 | Atid |
| 0 | 31:16 | LP (local port) |
| 0 | 15:0 | FP (foreign port) |
| 1 | 63:32 | LADDR (local IP address) |
| 1 | 31:0 | FADDR (foreign IP address) |
| 2 | 63:56 | Reserved |
| 2 | 55:32 | Tid |
| 2 | 31:8 | reserved |

TABLE 12-continued

CPL_ACT_OPEN_RPL
CPL_ACT_OPEN_RPL
term->core :: reject the act_open_req

| Flit | Field | Type |
|---|---|---|
| 2 | 7:0 | status |

Command Description

CPL_ACT_OPEN_RPL is sent from Terminator to the control plane as a reply to a previous control plane command CPL_ACT_OPEN_REQ that requests establish an active opened TCP connection.

If Terminator is configured to Protection Mode, control plane sends CPL_ACT_OPEN_REQ for NON-OFFLOAD connections for allocating TCAM and CM entries. As a result, Terminator sends the CPL_ACTIVE_OPEN_RPL message reporting success or fail of resource allocation in TCAM and CM. If succeed, the assigned TID is returned to control plane in Tid field. (Under Protection Mode, a TCP packet is forwarded to control plane/host only if its lookup matched a legitimate TCAM entry to protect against attacks.)

If the CPL_ACT_OPEN_REQ didn't specify NON-OFFLOAD, this CPL message is sent only if the connection set up failed. The status field provides the reason of failure, such as remote reject (got RST), SYN timeout, or local failure, such as TCAM error, etc. The status=22 or "connection already exist" is an error situation in which the same 4-tuple has been used by an existing connection.

If an offloaded connection established successfully, Terminator moves the connection into ESTABLISHED state, and sends CPL_ACT_ESTABLISH to control plane that carries the assigned Tid.

Selected Field Descriptions:

Parameter fields in this command (Atid and the 4-tuple) are all echoed from the original CPL_ACT_OPEN_REQ command.

| Field | Type | Description |
|---|---|---|
| Tid | 24-bit code | The Tid assigned by Terminator as a result of successively allocated TCAM and CM entries for the connection. This is used only if NON-OFFLOAD is specified in the CPL_ACT_OPEN_REQ. |

| Field | Type | Description |
|---|---|---|
| Status | 32-bit code | The status of the ACT_OPEN_REQ request (see Error Code definition in Section 0)<br>0: success (for non-offloaded connection only)<br>1: TCAM parity error<br>3: TCAM full<br>10: illegal local IP<br>11: inconsistent options<br>13: invalid ATID<br>16: memory error<br>20: remote peer reject/reset<br>22: connection already exist<br>23: ARP miss<br>30: connection establishment timed out<br>99: general error |

CPL_ACT_ESTABLISH

TABLE 13

CPL_ACT_ESTABLISH
term->core :: connection notification

| Flit | Field | Type |
| --- | --- | --- |
| 0 | 63:56 | 0x17 |
| 0 | 55:32 | Atid |
| 0 | 31:16 | LP(local port) |
| 0 | 15:0 | FP (foreign port) |
| 1 | 63:32 | LADDR (local IP address) |
| 1 | 31:0 | FADDR (foreign IP address) |
| 2 | 63:56 | TOS |
| 2 | 55:32 | tid (assigned by terminator) |
| 2 | 31:0 | reserved |
| 3 | 63:32 | ISS |
| 3 | 31:0 | IRS |

Command Description

CPL_ACT_ESTABLISH is sent from Terminator to the control plane when a new active opened connection has been established with a remote peer. The Atid is echoed from an earlier CPL_ACT_OPEN_REQ command and is used by control plane to identify the caller of ACT_OPEN_REQ. The tid is assigned by Terminator and is used by Terminator to manage the connection. From now on, control plane/host should use the tid to reference this connection with Terminator.

Selected Field Descriptions:

| Field | Type | Description |
| --- | --- | --- |
| Atid | Unsigned | This is the tag passed from control plane to Terminator in CPL_ACT_OPEN_REQ. It's echoed back to control plane here, indicating to control plane which active open request it asked for has been established. |

LP, FP, LADDR, and FADDR are the fully specified 4-tuple for the offloaded TCP connection.

| Field | Type | Description |
| --- | --- | --- |
| TOS | Unsigned | The first 6 bits of TOS field extracted from IP header of incoming packet from remote. |

| Field | Type | Description |
| --- | --- | --- |
| tid | Unsigned | The connection tag used by Terminator to identify the newly created connection. From now on, control plane should use this tid to communicate with Terminator. |

| Field | Type | Description |
| --- | --- | --- |
| ISS | 32-bit TCP sequence number | The initial send TCP sequence number used by Terminator for this offloaded connection. (Terminator → remote peer direction) Note: the value returned here is actually ISS + 1, which counted the 1 used by the SYN packet. |

| Field | Type | Description |
| --- | --- | --- |
| IRS | 32-bit TCP sequence number | The initial receive TCP sequence number received by Terminator for this offloaded connection. (Remote Peer → Terminator direction) Note: the value returned here is actually IRS + 1, which counted the 1 used by the SYN packet. |

CPL_GET_TCB

TABLE 14

CPL_GET_TCB
core->term :: get connection state data

| Flit | Field | Type |
| --- | --- | --- |
| 0 | 63:56 | 0x24 |
| 0 | 55:32 | tid |
| 0 | 31:0 | Reserved |

Command Description

Control plane sends CPL_GET_TCB command to Terminator to retrieve the entire TCP state information (TCB) for a connection specified by tid.

Selected Field Descriptions:

| Field | Type | Description |
| --- | --- | --- |
| tid | Unsigned | The connection id for getting the TCB state info. |

CPL_GET_TCB_RPL

TABLE 15

CPL_GET_TCB_RPL
term->core :: connection state response

| Flit | Field | Type |
| --- | --- | --- |
| 0 | 63:56 | 0x25 |
| 0 | 55:32 | tid |
| 0 | 31:16 | length |
| 0 | 15:8 | reserved |
| 0 | 7:0 | status |

Command Description

Terminator sends CPL_GET_TCB_RPL to control plane as a reply to an earlier CPL_GET_TCB command.

If a valid tid, this message returns the TCB (length=128 bytes) of the connection identified by tid.

If an invalid tid or command failure, this message returns length of zero.

The status indicates whether the CPL_GET_TCB succeeded or failed, and the reason of failure.

Selected Field Descriptions:

| Field | Type | Description |
| --- | --- | --- |
| tid | Unsigned | The connection id that the returned TCB state info is associated with. |

| Field | Type | Description |
|---|---|---|
| length | Unsigned | The number of bytes this message is returned in payload. This does not include bytes in CPL header. |

| Field | Type | Description |
|---|---|---|
| status | Unsigned | See Error Code definition in Section 0<br>0: success<br>12: invalid tid<br>16: memory error<br>99: general error |

CPL_SET_TCB

TABLE 16

CPL_SET_TCB
core->term :: write connection state data

| Flit | Field | Type |
|---|---|---|
| 0 | 63:56 | 0x26 |
| 0 | 55:32 | Tid |
| 0 | 31:16 | Length |
| 0 | 15:0 | reserved |

Command Description

Control plane sends CPL_SET_TCB to Terminator to write TCP state information for a connection. This command writes the entire TCB for the connection identified by tid into Terminator CM.

Selected Field Descriptions:

| Field | Type | Description |
|---|---|---|
| tid | Unsigned | The connection id to write its TCB state info. |

| Field | Type | Description |
|---|---|---|
| length | Unsigned | Number of bytes to write into the TCB. Currently, length must be 128 bytes. This does not include bytes in CPL header. |

CPL_SET_TCB_FIELD

TABLE 17

CPL_SET_TCB_FIELD
CPL_SET_TCB_FIELD
core->term :: set field in connection state TCB

| Flit | Field | Type |
|---|---|---|
| 0 | 63:56 | 0x27 |
| 0 | 55:32 | tid |
| 0 | 31:5 | reserved |
| 0 | 4:0 | offset |
| 1 | 63:32 | mask |
| 1 | 31:0 | value |

Command Description

While the previous CPL_SET_TCB command writes an entire TCB (128 bytes), this CPL_SET_TCB_FIELD allows write into individual fields in TCB. Control place can manipulate fields in TCB at maximum of 32-bit at a time. This 32-bit write aligns with 4-byte boundary.

The control plane sends this command to update various fields in the connection state maintained by Terminator's TCP protocol state machine. Examples of fields updated via this mechanism include direct data placement tag equivalent and tag reference fields as well as other ULP attributes that are largely opaque to the TCP protocol state machine. These fields consist of DDP page size, ULP mode and sub-mode. Other example includes modifying TCB maxseg field by PathMTU handler.

The tid identifies the connection and thus, the TCB to be manipulated. The offset specifies which 32 bit word within the TCB to be manipulated. The mask specifies which bits within the 32 bit word to be manipulated. The value provides the updated bit values for the bits specified in the mask.

For example, if control plane wants to set bits 8-11 of the first 32-bit word in TCB to a new value 5, then the parameters should be:

Offset=0

Mask=0x00000F00

Value=0x00000500

Selected Field Descriptions:

| Field | Type | Description |
|---|---|---|
| tid | Unsigned | The connection id for which the TCB to be manipulated. |

| Field | Type | Description |
|---|---|---|
| offset | Unsigned | Specifies which 32 bit word within the TCB to be manipulated. |

| Field | Type | Description |
|---|---|---|
| mask | Unsigned | Specifies which bits within the 32 bit word to be manipulated.<br>All bits to be changed have mask bit of 1, and all bits to remain unchanged have mask bit of 0. |

| Field | Type | Description |
|---|---|---|
| value | Unsigned | Provides the updated bit values for the bits specified in the mask.<br>The new value should be aligned with the mask bits as shown in the example above. |

CPL_SET_TCB_RPL

TABLE 18

CPL_SET_TCB_RPL
CPL_SET_TCB_RPL
term->core :: write connection state response

| Flit | Field | Type |
|---|---|---|
| 0 | 63:56 | 0x28 |
| 0 | 55:32 | Tid |
| 0 | 31:8 | Reserved |
| 0 | 7:0 | Status |

Command Description

Terminator sends CPL_SET_TCB_RPL to control plane as a reply to an earlier CPL_SET_TCB or CPL_SET_TCB_FIELD command.

The status indicates whether the earlier SET_TCB command succeeded or failed, as well as the reason of failure.

Note: this message Acks both CPL_SET_TCB and CPL_SET_TCB_FIELD commands. If control plane sends two CPL_SET_TCB and CPL_SET_TCB_FIELD contiguously, Terminator will respond with two CPL_SET_TCB_RPL messages in the order of earlier two SET_TCB commands.

Selected Field Descriptions:

| Field | Type | Description |
|---|---|---|
| tid | Unsigned | The connection id to write TCB state info. |

| Field | Type | Description |
|---|---|---|
| status | Unsigned | See Error Code definition in Section 0<br>0: success<br>12: invalid tid<br>15: invalid length<br>16: memory error<br>99: general error |

CPL_PCMD

TABLE 19

CPL_PCMD
CPL_PCMD
core->term :: apply pcmd and optional data in/out

| Flit | Field | Type |
|---|---|---|
| 0 | 63:56 | 0x29 |
| 0 | 55:32 | Tid |
| 0 | 31:16 | dlen_in |
| 0 | 15:0 | dlen_out |
| 1 | 63:60 | pcmd_mode |
| 1 | 59:56 | pcmd_fbck |
| 1 | 55:52 | pcmd_cmd |
| 1 | 51 | pcmd_mem |
| 1 | 50 | pcmd_bypass |
| 1 | 49 | pcmd_eop |
| 1 | 48 | pcmd_eoi |
| 1 | 47:16 | pcmd_addr |
| 1 | 15:0 | pcmd_len |

Command Description

The control plane sends this command to Terminator when control plane decides there is a need to set up Upper Layer Protocol (ULP) acceleration and Direct Data Placement (DDP) in Terminator. Current supported ULP acceleration includes: (a). TCP Payload DDP, (b). iSCSI, and (c). RDMA/iWARP.

At run time, this CPL command is used to set up pre-posted host memory address map in Terminator PM memory. These maps are later used to place ULP payload data directly into the posted host memories. When DDP finished, host issues a CPL_PCMD to invalidate the address map in PM.

See "ULP Acceleration and DDP" section in "Theory of Operation" Chapter for detailed description of ULP and DDP operations.

Note: Page Pod is defined and saved in PM in Big Endian format.

Selected Field Descriptions:

| Field | Type | Description |
|---|---|---|
| tid | Unsigned | The connection id associated with this operation.<br>For ULP initialization, this field is irrelevant. |

| Field | Type | Description |
|---|---|---|
| dlen_in | Unsigned | Data payload length (in bytes) to write into the PM.<br>This value should always be multiple of 32.<br>Terminator: limit to 16k<br>For ULP register write, this is set to 0. |

| Field | Type | Description |
|---|---|---|
| dlen_out | Unsigned | This field should be always set to 0 for ULP/DDP support. |

| Field | Type | Description |
|---|---|---|
| pcmd_mode | ordinal | This field should be always set to 0 for ULP/DDP support. |

| Field | Type | Description |
|---|---|---|
| pcmd_fbck | Unsigned | This field should be always set to 0 for ULP/DDP support. |

| Field | Type | Description | |
|---|---|---|---|
| Pcmd_cmd | Ordinal | PM_WRITE_CMD<br>(for write to PM memory) | 0x1 |

| Field | Type | Description |
|---|---|---|
| Pcmd_mem | Unsigned | 0: write to ULP register<br>1: write to PM memory |

| Field | Type | Description |
|---|---|---|
| Pcmd_bypass | Unsigned | This field should be always set to 0 for ULP/DDP support. |

| Field | Type | Description |
|---|---|---|
| Pcmd_eop | Unsigned | End-of-Packet bit.<br>Should always set to 1 (value of 0 for internal use only) |

| Field | Type | Description |
|---|---|---|
| Pcmd_eoi | Unsigned | Should always set to 1 (value of 0 for internal use only) |

| Field | Type | Description |
|---|---|---|
| Pcmd_addr | Unsigned | The physical byte address of PM memory |

| Field | Type | Description |
|---|---|---|
| Pcmd_len | Unsigned | For PM memory write, this should always set to the same value as dlen_in. |

CPL_CLOSE_CON_REQ

TABLE 20

CPL_CLOSE_CON_REQ
core->term :: request close of connection

| Flit | Field | Type |
|---|---|---|
| 0 | 63:56 | 0x07 |
| 0 | 55:32 | Tid |
| 0 | 31:0 | Reserved |

Command Description

CPL_CLOSE_CON_REQ is sent from control plane to Terminator to close a connection on Terminator. This command is used in both active close and passive close (responds to a remote initiated close) of a connection.

For active close, there are three scenarios depending on the configured mode for Active Close:

Terminator moves into 2MSL state, and the on-chip 2MSL timer set to normal value (60 sec). The TCAM and CM entries for this connection are removed after the 2MSL timer expired.

Host moves into 2MSL state, but terminator does not, i.e., Terminator removes TCAM and CM entries immediately, no on-chip 2MSL timer started. In this case, no ACK retransmitted if see remote FIN again. This mode uses ASK mode for passive opened connections. The host in 2MSL state can decide whether or not to accept a new connection with the same 4-tuple.

Both host and Terminator move into 2MSL state. Host start a normal 2MSL timer, whereas Terminator starts 2MSL timer with a smaller value, typically covers one RTT time. After Terminator 2MSL timer expired, the TCAM and CM entries are removed. After this, no retransmit of the last ACK from terminator. This mode also requires ASK mode with passive opened connections.

For non-offloaded connection close, host issues this command to remove TCAM and CM entries for that connection.

Selected Field Descriptions:

| Field | Type | Description |
|---|---|---|
| Tid | Unsigned | The connection id to close. |

CPL_CLOSE_CON_RPL

TABLE 21

CPL_CLOSE_CON_RPL
term->core :: close reply

| Flit | Field | Type |
|---|---|---|
| 0 | 63:56 | 0x08 |
| 0 | 55:32 | Tid |
| 0 | 31:8 | Reserved |
| 0 | 7:0 | Status |
| 1 | 63:32 | Send-next seq number |
| 1 | 31:0 | Receive-next seq number |

Command Description

CPL_CLOSE_CON_RPL is sent from Terminator to control plane as a reply to an earlier CPL_CLOSE_CON_REQ command. The tid carried in CPL_CLOSE_CON_REQ is echoed back here to the control plane.

Note:

For passive connection close, Terminator sends CPL_CLOSE_CON_RPL when the connection received the final ACK of the 4-way handshake, and TP has successively removed the connection's TCAM and CM entries.

For active connection close, Terminator sends CPL_CLOSE_CON_RPL when it received ACK to its FIN sent out earlier.

For non-offloaded connection close, Terminator sends CPL_CLOSE_RPL when it has successively removed the connection entry in TCAM and CM.

The Send-Next-Seq-Number and Receive-Next-Seq-Number are for statistic purposes. When an offloaded TCP connection closes (Terminator moved to TIME_WAIT state), Terminator automatically sends these two values to control plane notifying the last sent and received sequence numbers on the connection. Since control plane keeps per connection initial sequence numbers ISS and IRS, and number of times of send and receive sequence wrapped around, control plane can figure out how many bytes sent and received over the connection. This might be useful for billing and other statistic applications.

Note: if a connection is in half-close, i.e. the control plane called CPL_CLOSE_CON_REQ, Terminator sent a FIN, and remote answered an ACK, but remote peer continues sends bytes to Terminator, then these bytes may be not returned to control plane, and therefore not counted.

Selected Field Descriptions:

| Field | Type | Description |
|---|---|---|
| Tid | Unsigned | The connection id to close. This is echoed from the earlier CPL_CLOSE_CON_REQ command. |

| Field | Type | Description |
|---|---|---|
| status | Unsigned | Status of the close operation: (See Error Code definition in Section 0)<br>0: success<br>4. TCAM entry deletion failed<br>5: CM entry deletion failed<br>12: invalid TTD<br>40: connection in FiN_WAIT 2 state:<br>99: general error |

| Field | Type | Description |
|---|---|---|
| sent next seq | Unsigned | The sequence number of the last byte sent (including FIN) + 1 over the connection. |

| Field | Type | Description |
|---|---|---|
| rcv next seq | Unsigned | The sequence number of the last byte received (including FIN) + 1 over the connection. |

CPL_CLOSE_LISTSVR_REQ

TABLE 22

CPL_CLOSE_LISTSVR_REQ
core->term :: request close a listening server

| Flit | Field | Type |
|---|---|---|
| 0 | 63:56 | 0x09 |
| 0 | 55:32 | Ptid |
| 0 | 31:0 | reserved |

Command Description

CPL_CLOSE_LISTSVR_REQ is sent from control plane to Terminator to close a passive opened listening server on Terminator.

Selected Field Descriptions:

| Field | Type | Description |
|---|---|---|
| Ptid | Unsigned | The id of earlier passive opened listening server on Terminator. |

CPL_CLOSE_LISTSVR_RPL

TABLE 23

CPL_CLOSE_LISTSVR_RPL
CPL_CLOSE_LISTSVR_RPL
term->core :: close reply

| Flit | Field | Type |
|---|---|---|
| 0 | 63:56 | 0x0A |
| 0 | 55:32 | Ptid |
| 0 | 31:8 | Reserved |
| 0 | 7:0 | status |

Command Description

CPL_CLOSE_LISTSVR_RPL is sent from Terminator to control plane as a reply to an earlier CPL_CLOSE_LISTSVR_REQ command. The server id, Ptid, carried in CPL_CLOSE_LISTSVR_REQ is echoed back here to the control plane.

Note: Terminator sends CPL_CLOSE_LISTSVR_RPL when it has successively removed the server entry in TCAM and CM. If there are active connections on this server, these connections are still alive. In case the server application process has been killed, the control plane is responsible for issuing CPL_ABORT_REQ to each of these connections to tear them town.

Selected Field Descriptions:

| Field | Type | Description |
|---|---|---|
| Ptid | Unsigned | The server id to close. This is echoed from the earlier CPL_CLOSE_LISTSVR_REQ command. |

| Field | Type | Description |
|---|---|---|
| status | Unsigned | Status of the close operation: (See Error Code definition in Section 0)<br>0: success<br>4. TCAM entry deletion failed<br>5: CM entry deletion failed<br>14: invalid PTID<br>16: memory error<br>99: general error |

CPL_ABORT_REQ

TABLE 24

CPL_ABORT_REQ
CPL_ABORT_REQ
term->core || core->term :: connection is aborted

| Flit | Field | Type |
|---|---|---|
| 0 | 63:56 | 0x0B |
| 0 | 55:32 | Tid |
| 0 | 31:0 | reserved |
| 1 | 63:56 | reserved |
| 1 | 55:48 | Status/Command |
| 1 | 47:0 | reserved |

Command Description

CPL_ABORT_REQ is sent from control plane to Terminator to abort a connection. This causes Terminator to send a RST to the remote peer. The control plane can also specify in Command field that no RST needs to be sent. In this case, the Terminator just removes TCAM and CM entries for the aborted connection and sends CPL_ABORT_RPL back, no RST sent to wire.

This message can also been sent on the reverse direction from Terminator to control plane. This will happen when Terminator received a RST from remote. Terminator should not remove its TCAM and CM entries until received a CPL_ABORT_RPL message from control plane. The control plane should not send the CPL_ABORT_RPL message until it is sure that it will not send any more commands to that connection/tid.

Whenever the Terminator hits max number of retransmits (defined either by the global MAXRT or connection specific CONN_MAXRT in Option 0), Terminator sends CPL_ABORT_REQ to control plane. Control plane may check and/or decide making route change, ARP change, and then sends CPL_ABORT_RPL to Terminator to tell it to continue the retransmit or execute a reset. If control plane decides to change the number of retransmits or adjust L2 table index in TCB, it should call CPL_SET_TCB_FIELD with a new CONN_MAXRT value and/or L2T_IX value before sending CPL_ABORT_RPL. On the other hand, control plane can send CPL_ABORT_RPL to tell Terminator to reset the connection and send RST to remote.

When Terminator sends the CPL_ABORT_REQ to host, it includes the reason of abortion in the status field, so that control plane can react correspondingly.

Selected Field Descriptions:

| Field | Type | Description |
| --- | --- | --- |
| tid | Unsigned | The tid identifies the offloaded connection in Terminator that is to be aborted. |

| Field | Type | Description |
| --- | --- | --- |
| Status/ Command | Unsigned | When Terminator sends ABORT to control plane, it sets the status for reasons of abort. (See Error Code definition in Section 0)<br>20: RST from remote.<br>24: SYN arrived in wrong state.<br>31: rexmit timer time out.<br>32: persist timer time out.<br>33: Fin-Wait-2 timer time out.<br>34: Keepalive time out<br>99: general error<br>When control plane sends ABORT to Terminator, this is a command to Terminator:<br>0: sends RST to remote peer (default)<br>1: don't send RST to remote peer. |

CPL_ABORT_RPL

TABLE 25

| CPL_ABORT_RPL | | |
| --- | --- | --- |
| CPL_ABORT_RPL | | |
| core->term ‖ term->core :: ack of aborted connection | | |
| Flit | Field | Type |
| 0 | 63:56 | 0x0C |
| 0 | 55:32 | Tid |

TABLE 25-continued

| CPL_ABORT_RPL | | |
| --- | --- | --- |
| CPL_ABORT_RPL | | |
| core->term ‖ term->core :: ack of aborted connection | | |
| Flit | Field | Type |
| 0 | 31:0 | Reserved |
| 1 | 63:56 | Reserved |
| 1 | 55:48 | Status / Command |
| 1 | 47:0 | Reserved |

Command Description

CPL_ABORT_RPL is sent in either direction as a reply to an earlier CPL_ABORT_REQ command. The tid carried in CPL_ABORT_REQ is echoed back here.

If control plane sent a CPL_ABORT_REQ earlier, Terminator sends CPL_ABORT_RPL after it sends out the RST to remote, and successively removed the TCAM and CM entries for this connection. If the Terminator is in WAIT_ARP_RPL state, it cannot send the RST to wire. In this case, Terminator sends CPL_ABORT_RPL with status=WAIT_ARP_RPL to control plane, and TCAM/CM entries for this connection is not de-allocated. When control plane gets this reply, it can try to resolve this ARP for this connection. If ARP resolved, control plane sends CPL_ARP_MISS_RPL to this connection, and then followed by another CPL_ABORT_REQ. If ARP cannot be resolved, control plane sends CPL_ABORT_REQ with Command=No-RST-Sent.

If Terminator sent a CPL_ABORT_REQ earlier, control plane sends CPL_ABORT_RPL with 'status' field telling Terminator what to do.

Selected Field Descriptions:

| Field | Type | Description |
| --- | --- | --- |
| tid | Unsigned | Terminator echoes the connection id, tid, carried in CPL_ABORT_REQ. |

| Field | Type | Description |
| --- | --- | --- |
| Status/command | Unsigned | Status of the abort operation:<br>For CPL_ABORT_RPL sent from Terminator to control plane: (See Error Code definition in Section 0)<br>  0: success<br>  4: TCAM entry deletion failed<br>  5: CM entry deletion failed<br> 12: invalid TID<br> 41: The connection is in WAIT_ARP_RPL state.<br> 99: general error<br>For CPL_ABORT_RPL sent from control plane to Terminator, this is a command:<br>  0: delete the connection and send RST to remote (e.g., for max rexmit reached)<br>  1: delete the connection but no RST to send (e.g., when got RST from remote)<br>  2: retry the previous operation (e.g. restart the timer that earlier hit the max numbers) |

CPL_PEER_CLOSE

TABLE 26

| CPL_PEER_CLOSE | | |
|---|---|---|
| CPL_PEER_CLOSE | | |
| term->core :: peer has closed connection | | |
| Flit | Field | Type |
| 0 | 63:56 | 0x0D |
| 0 | 55:32 | Tid |
| 0 | 31:0 | Reserved |

Command Description

CPL_PEER_CLOSE is sent from Terminator to control plane when Terminator received a FIN from remote. If the FIN arrived while in ESTABLISHED state, it is a passive close, i.e., the remote initiated a close of the connection. Otherwise, it is an active close initiated by control plane.

Selected Field Descriptions:

| Field | Type | Description |
|---|---|---|
| tid | Unsigned | The tid identifies the connection that a remote peer wants to close. |

CPL_TX_DATA

TABLE 27

| CPL_TX_DATA | | |
|---|---|---|
| CPL_TX_DATA | | |
| core->term :: tx data | | |
| Flit | Field | Type |
| 0 | 63:56 | 0xB1 |
| 0 | 55:32 | Tid |
| 0 | 31:0 | Length |
| 1 | 63:32 | Reserved |
| 1 | 31:16 | Urgent Pointer |
| 1 | 15:15 | More Data bit |
| 1 | 14:14 | Shove bit |
| 1 | 13:10 | ULP Mode |
| 1 | 9:6 | ULP Submode |
| 1 | 5:0 | Reserved |

Command Description

Host/NPU sends CPL_TX_DATA to Terminator when it is to transfer certain payload data bytes to a remote peer over a connection. This message is used for offloaded TCP connection payload only. Sending non-TCP or non-offloaded-TCP packets is carried by a separate message CPL_TX_PKT (see below).

In case of PCI-X, data bytes are DMAed (by Terminator) separately following the CPL message.

In case of SPI-4, data bytes follow immediately the CPL message.

If More_Data bit set, it tells Terminator not to send the payload to wire, since there are more data to come. Terminator will accumulate all data with More Data bit set (even more than MSS size) until it sees a CPL_TX_DATA with More Data bit cleared. At that time, Terminator will burst all accumulated bytes to wire. However, if a retransmit timer expired, Terminator will retransmit a MSS size packet, which may include part of bytes that are previously indicated by More bit and saved in the Terminator send buffer.

If Shove bit set, it tells Terminator to send the payload to wire immediately, even though Nagle algorithm is on. This provides a mechanism to temporarily overwrite the Nagle algorithm on transmit. If host/control plane wants to 'always' overwrite Nagle algorithm, it can simply turn off the Nagle algorithm on this connection. Note: this Shove bit is independent of the TCP PUSH bit operation. Regardless of whether Shove bit set or not, Terminator follows the standard way of setting TCP PUSH bit, i.e., whenever the transmitted packet empties the send buffer, the PSH bit is set in TCP header. When both Nagle and PUSH bit are on, the Nagle takes priority over PUSH bit (per RFC 1122).

If the Urgent Pointer is not equal to 0, then it's a pointer to the Urgent byte in the data sequence. Terminator can identify the urgent byte by offsetting the urgent pointer from beginning of the payload minus 1. In other words, the Urgent Pointer points to the byte following the urgent byte (the Berkeley flavor of urgent byte implementation).

The ULP mode defines a connection is a normal TCP connection, an iSCSI connection, an RDMA/iWARP connection, a TCP DDP connection (allows out-of-order direct data placement based on sequence numbers), or an SSL connection.

If an iSCSI or RDMA/iWARP connection, then the ULP Submode further specifies whether the header CRC and/or data CRC is enabled for the connection.

Note: In one example,

The max data payload length for each CPL_TX_DATA command is limited to 16K bytes.

The max data payload length of each CPL_TX_DATA is also bounded by max of two PM TX pages, i.e., payload data cannot span three TX pages. For example, if register TP_PM_TX_PG_SIZ is configured to 4 k, then in best case, the max payload size is 8 k, in which the payload TCP sequence range aligned exactly with the TX page boundaries. In the worst case, the max payload size is 4 k+1 bytes, in which one byte mapped the last byte of the first page and the rest 4 k mapped into a second page.

Combining the above (1) and (2), it's recommended to use TX page size of 16 k or 64 k, unless it is known the applications always send small amount of data each time.

Selected Field Descriptions:

| Field | Type | Description |
|---|---|---|
| Tid | Unsigned | The connection Id for this data transfer. |

| Field | Type | Description |
|---|---|---|
| Length | Unsigned | Number of bytes to be transferred from host/NPU to Terminator. This does not include bytes in CPL header. In the first release, this length is limited to 16K bytes. |

| Field | Type | Description |
|---|---|---|
| Urgent Pointer | Unsigned | Defines a positive offset from the beginning of payload that points to the byte following Urgent byte in the payload data (the Berkeley flavor) |

| Field | Type | Description |
|---|---|---|
| More Data Bit | Unsigned | If 1, host/NPU indicates to Terminator that more data is coming, and therefore Terminator should hold these bytes and not transferred them to the wire immediately. If 0, Terminator should treat these bytes in a normal fashion. |

| Field | Type | Description |
|---|---|---|
| Shove Bit | Unsigned | If 1, host/NPU indicates to Terminator that the associated bytes need to be sent to wire immediately. If 0, Terminator should treat these bytes in a normal fashion. |

| Field | Type | Description |
|---|---|---|
| ULP Mode | Unsigned | Indicate the connection characteristics:<br>0: PASS  // this is a normal TCP connection<br>1: TCP DDP  // this is a direct placed TCP connection, that supports out-of-order data placement based on sequence number.<br>2: iSCSI  // this is an iSCSI connection<br>3: iWARP // this is an RDMA/iWARP connection<br>4: SSL  // this is an SSL or TLS connection |

| Field | Type | Description |
|---|---|---|
| ULP Submode | Unsigned | Valid only if ULP Mode is iSCSI or iWARP.<br>Bit 2-3: unused<br>Bit 1: Data CRC enabled<br>Bit 0: Header CRC enabled |

CPL_TX_DATA_ACK

TABLE 28

CPL_TX_DATA_ACK
CPL_TX_DATA_ACK
term->core :: tx data

| Flit | Field | Type |
|---|---|---|
| 0 | 63:56 | 0xB0 |
| 0 | 55:32 | tid |
| 0 | 31:0 | Credit_Ref |

Command Description

This message is used for flow control of data flowing from host/NPU to Terminator. A credit-based flow control mechanism is provided. For each connection host/NPU can send limited amount of data to Terminator, and then stop and wait for credits coming back. When Terminator has freed up send buffer space, it sends this message to host/NPU, indicating 'Credit' amount of space is freed by connection 'tid'. Since the Terminator buffer space is a shared global resource, host/NPU can decide which connection can use the freed space.

Note: the Credit_Ref field actually returns the reference position in TCP sequence space of current sent-but-unacked byte. The host/NPU is expected to keep this info, so that the actual credits (in byte) returned can be derived by the new value minus the previous value of the sent-but-unacked variable.

Selected Field Descriptions:

| Field | Type | Description |
|---|---|---|
| tid | Unsigned | The connection that freed up the Terminator send buffer space. |

| Field | Type | Description |
|---|---|---|
| Credit_ref | Unsigned | The updated sent-but-unacked byte location in TCP sequence space. |

CPL_RX_DATA

TABLE 29

CPL_RX_DATA
CPL_RX_DATA
term->core :: data received for connect

| Flit | Field | Type |
|---|---|---|
| 0 | 63:56 | 0xA0 |
| 0 | 55:32 | Tid |
| 0 | 31:0 | Length |
| 1 | 63:32 | Seq |
| 1 | 31:16 | Urgent Pointer |
| 1 | 15:8 | Reserved |
| 1 | 7:0 | Status |

Command Description

Terminator sends CPL_RX_DATA to host/NPU when it received certain payload data bytes from a connection. This message is used for offloaded TCP connection payload only. Receiving non-TCP or non-offloaded-TCP packets is carried by a separate message CPL_RX_PKT (see below).

In case of PCI-X, data bytes are DMAed (by Terminator) after the CPL message into a pre-allocated global system/kernel buffer (free-list). When direct data placement (DDP) of received data bytes is enabled for a connection, Terminator sends a different message CPL_RX_DATA_DDP to the host for the directly placed data bytes.

In case of SPI-4, data bytes follow immediately the CPL message. No direct data placement is supported over the SPI-4 interface.

If the Urgent Pointer is not equal to 0, then it's a pointer to the Urgent byte in the data sequence. SW can retrieve the urgent byte by adding the urgent pointer to the sequence number minus 1 to get the location of the urgent byte. In other words, the Urgent Pointer points to the byte following the urgent byte (the Berkeley flavor). If the Urgent Pointer is not equal to 0, then it's a pointer to the Urgent byte in the data sequence.

Selected Field Descriptions:

| Field | Type | Description |
|---|---|---|
| tid | Unsigned | The connection Id for the received data. |

| Field | Type | Description |
|---|---|---|
| length | Unsigned | The number of bytes received in this message. This does not include bytes in CPL header. |

| Field | Type | Description |
|---|---|---|
| seq | Unsigned | The sequence number of the first byte in the received byte stream carried in this message. |

| Field | Type | Description |
|---|---|---|
| Urgent Pointer | Unsigned | Defines a positive offset from the Sequence Number above that point to the byte following Urgent byte in the payload data.<br>Urgent Pointer=0 indicates no UGT byte. |

| Field | Type | Description |
|---|---|---|
| status | Unsigned | Status of the received bytes. (See Error Code definition in Section 0)<br>0: success<br>99: general error |

CPL_RX_DATA_ACK

TABLE 30

CPL_RX_DATA_ACK
CPL_RX_DATA_ACK
core->term :: flow control for rx data

| Flit | Field | Type |
|---|---|---|
| 0 | 63:56 | 0xA3 |
| 0 | 55:32 | tid |
| 0 | 31:0 | Credit |

Command Description

This message is used for flow control of data flowing from Terminator to host/NPU. A credit-based flow control mechanism is provided. For each connection Terminator can send limited amount of data to host/NPU, and then stop and wait for credits coming back. When host/NPU has consumed its receive buffer space, it sends this message to Terminator, indicating 'Credit' amount of space is freed by connection 'tid'.

Since the CPL_RX_DATA_ACK returns available host memory buffer space to Terminator which in turn opens up the TCP advertised receiving window to remote peer, the host returns the CPL_RX_DATA_ACK quickly to avoid TCP receive window close. The SGE Command Queue 1 can be configured with higher priority than Queue 0 (see 0) and host send CPL_RX_DATA_ACK in Command Queue 1 to Terminator.

Selected Field Descriptions:

| Field | Type | Description |
|---|---|---|
| tid | Unsigned | The connection that freed up the host/NPU receive buffer space. |

| Field | Type | Description |
|---|---|---|
| credit | Unsigned | Number of bytes in host/NPU receive buffer being freed. |

CPL_RX_DATA_DDP

TABLE 31

CPL_RX_DATA_DDP
term->core :: DDP rx data for connection

| Flit | Field | Type |
|---|---|---|
| 0 | 63:56 | 0xA1 |
| 0 | 55:32 | Tid |
| 0 | 31:0 | Length |
| 1 | 63:32 | Seq |
| 1 | 31:0 | Next expected seq |
| 2 | 63:32 | ULP_CRC |
| 2 | 31:20 | DDP_Valid |
| 2 | 19:8 | reserved |
| 2 | 7:0 | Status |

Command Description

Terminator sends CPL_RX_DATA_DDP to host when it received certain payload data bytes from a connection. In contrast to CPL_RX_DATA in which payload data bytes are placed in a global shared buffer space (the free-list), in CPL_RX_DATA_DDP, payload bytes are directly placed in a per-connection pre-posted buffer memory in host. This avoids a memory copy in host OS kernel. This message is only used for offloaded TCP connection with direct data placement enabled.

Terminator supports three kinds DDP:

iSCSI PDU payload data

RDMA/iWARP PDU payload data

TCP DDP for socket applications

In case of iSCSI and RDMA/iWARP, Terminator performs TCP re-ordering for out-of-order arrived packets, and then DDP in-order payload data into host pre-posted memories.

In case of TCP DDP, Terminator DMAs out-of-order packet payload directly into DDP memory. There is no re-ordering done by Terminator. Both the current expected sequence number and the actual arrived sequence numbers are delivered to the host, so that host can determine if all expected data has arrived in the DDP memory.

Note: for a TCP DDP connection, whenever Terminator receives a packet with UGT bit set, it will switch to non-DDP mode and deliver all payload bytes to the free-list. Host may decide to re-post host memory and re-start DDP mode for the connection if needed.

DDP is supported on PCI-X interface only. No direct data placement is supported over the SPI-4 interface.

Selected Field Descriptions:

| Field | Type | Description |
|---|---|---|
| tid | Unsigned | The connection Id for the received data. |

| Field | Type | Description |
|---|---|---|
| length | Unsigned | The number of bytes received in this message including ULP header, such as iSCSI header, and data payload. This does not include bytes in CPL header. |

| Field | Type | Description |
|---|---|---|
| seq | Unsigned | This field is useful mainly to the TCP Payload DDP, where TCP data can be placed out-of-order. This field contains the starting seq number of DDPed payload data. If in order, the seq number plus the Length value should equal to the Next Expected Seq. Host may use this seq and the Next expected seq to keep track of missing pieces in the DDPed memory. |

| Field | Type | Description |
|---|---|---|
| Next expected seq | Unsigned | This field is useful mainly to the TCP Payload DDP, where TCP data can be placed out-of-order. This field contains the next expected receive TCP sequence number for this connection (i.e. the Terminator has received and acked this number minus one so far). When Terminator placed out-of-order TCP packets into host memory, host may receive multiple CPL_RX_DATA_DDP with the same seq field until the missing pieces arrived. Host driver may use this number to determine whether all expected data has arrived in the DDP memory. |

| Field | Type | Description |
|---|---|---|
| ULP_CRC | Unsigned | This field is used to carry upper layer protocols (ULP), such as iSCSI or RDMA, data payload CRC. Terminator performs CRC check and then passes the original CRC to host. The verification result is returned in the DDP_Valid field. Note: the iSCSI header CRC is delivered to host free-list along with the header. |

| Field | Type | Description |
|---|---|---|
| status | Unsigned | Status of the received bytes. (See Error Code definition in Section 0) 0: successful 99: general error Note: 0 means the data has been successfully delivered to host, either in pre-posed memory (DDP succeed) or free-list (DDP failed). 99 indicates the data failed to be delivered to host. |

| Field | Type | Description |
|---|---|---|
| DDP_Valid | Unsigned | Status returned to host on ULP/DDP validation and CRC checking. If set, the bits indicate: Bit 20: Bad ULP header CRC. Bit 21: Bad ULP data CRC Bit 22: unused Bit 23: Invalid Ulimit - the TAG contains a map address that is beyond the TP map region boundary. Bit 24: Invalid Offset - data length of the segment goes beyond the end of the DDP map. Bit 25: Invalid Color - the TAG contains a Color that does not match the Color in Page Pod. Bit 26: Invalid TID - the Page Pod to be used not owned by this connection. Bit 27: Invalid PagePod - The Page Pod to be used has Valid Bit = 0 Bit 28-31: ULP Mode: 0: Normal 1: TCP DDP 2: iSCSI 3: iWARP 4: SSL |

CPL_TX_PKT

TABLE 32

CPL_TX_PKT
core->term :: tx data

| Flit | Field | Type |
|---|---|---|
| 0 | 63:56 | 0xB2 |
| 0 | 55:52 | Reserved |
| 0 | 51:48 | interface |
| 0 | 47:32 | reserved |
| 0 | 31:0 | Length |

Command Description

Host/NPU sends CPL_TX_PKT to Terminator when it needs to send a tunneled packet to a specified interface. The tunneled packet can be either non-TCP packet or non-offloaded-TCP packet.

Tunneled packets are fully encapsulated with Ether header, IP header, and any Layer 3 headers. These Ether packets are transferred from host/NPU immediate after the CPL_TX_PKT message.

If "UDP Checksum Offload" is configured, for a non-fragmented UDP packet, Terminator will calculate and insert the UDP checksum in UDP header. For fragmented UDP packets, host sends Terminator all fragments of a datagram in one shot, i.e., these fragments are not interleaved with other UDP datagrams or segments. Also host sends the first fragment last. Note: fragmented UDP packets are allowed to interleave with other non-UDP packets or fragments, such as TCP fragments.

If "TCP Checksum Offload" is configured, Terminator will calculate and insert TCP checksum for all tunneled TCP packets. For a fragmented TCP segments, host sends all fragments in one shot, i.e., they are not interleaved with other TCP segments or fragments. Also host sends the first fragment last. A fragmented TCP segment is allowed to be interleaved with other non-TCP packets or fragments, such as UDP fragments.

Note:

When TCP or UDP checksum is turned on, there is no requirement on the value in TCP or UDP header checksum field from host, i.e., the header checksum field can be any value. Terminator will do the checksum by itself and overwrite the header checksum field with the calculated final checksum, which includes the necessary pseudo-header checksum.

In the 1$^{st}$ release, if the Ether payload (i.e., the number of bytes following Ether header) is less than 10 bytes, the driver pads the packet and makes the Ether payload more than 10 bytes. This does not affect IP packets, since IP header is 20 bytes long.

Selected Field Descriptions:

| Field | Type | Description |
|---|---|---|
| interface | Unsigned | The network interface this packet is sent to. |

| Field | Type | Description |
|---|---|---|
| length | Unsigned | The length of the tunneled packet in bytes. This does not include bytes in CPL header. Note: In the first release, this length is limited to 16K bytes. Typically a tunneled packet length is less than the max MTU supported on an interface, e.g., 9K. |

CPL_RX_PKT

TABLE 33

| CPL_RX_PKT term->core :: data frame | | |
|---|---|---|
| Flit | Field | Type |
| 0 | 63:56 | 0xAD |
| 0 | 55:52 | Reserved |
| 0 | 51:48 | Interface |
| 0 | 47:32 | checksum /(partial checksum) |
| 0 | 31:0 | Length |

Command Description

Terminator sends CPL_RX_PKT to control plane/NPU when it received a tunneled packet from an interface. A tunneled packet can be either non-TCP packet or non-offloaded-TCP packet.

If "UDP Checksum Offload" is configured, for a non-fragmented UDP packet, Terminator sets the checksum field to 0xFFFF if the UDP checksum is right, and non-0xFFFF if the UDP checksum is wrong. For fragmented UDP packets, the checksum field carries a partial checksum calculated by Terminator on the packet. Control plane is responsible for adding each partial checksum together and doing final checksum verification. Note: the partial checksums includes the pseudo-header checksum.

If "TCP Checksum Offload" is configured, Terminator will calculate checksum for all TCP packets, including tunneled packets. If the TCP checksum wrong, the packet is dropped, and the corresponding on-chip TCP MIB counter is incremented. That is: a tunneled TCP packet with wrong checksum is not delivered to the control plane. For a fragmented TCP packet, the checksum field carries a partial checksum calculated by Terminator. Control plane is responsible for adding each partial checksum together and doing final checksum verification.

Note: for fragmented TCP or UDP packets, Terminator handles on per-packet basis. There is no requirement on the order of fragments arrival.

If "IP Checksum Offload" is configured, Terminator will drop any IP packet if its IP header checksum is wrong, and the corresponding on-chip IP MIB counter is incremented.

Selected Field Descriptions:

| Field | Type | Description |
|---|---|---|
| interface | Unsigned | The network interface this packet arrived. |

| Field | Type | Description |
|---|---|---|
| cksum | Unsigned | Partial checksum for fragmented packet. For non-fragmented packets, if global UDP or TCP checksum offload set, this field carries the HW checksum verification result: 0xFFFF: checksum correct none 0xFFFF: checksum wrong |

| Field | Type | Description |
|---|---|---|
| length | Unsigned | The length of the tunneled packet in bytes, not including the CPL header. |

CPL_RTE_DELETE_REQ

TABLE 34

| CPL_RTE_DELETE_REQ core->term :: Invalidate line in Routing TCAM | | |
|---|---|---|
| Flit | Field | Type |
| 0 | 63:56 | 0xC0 |
| 0 | 55:32 | Atid |
| 0 | 31:30 | Reserved |
| 0 | 29:19 | L2T_LUT_BASE |
| 0 | 18:8 | L2T_LUT_IX |
| 0 | 7:0 | Reserved |

Command Description

The control plane sends CPL_RTE_DELETE_REQ to invalidate a line in the Routing Table portion of the TCAM.

The Terminator writes a pattern into the TCAM at the line pointed to by L2T_LUT_BASE concatenated with L2T_LUT_IX that will ensure that no possible search key will "match" on this line.

Selected Field Descriptions:

| Field | Type | Description |
|---|---|---|
| Atid | Range (0x0-0xFFFFFF) | Control plane selected ID that is used by control plane to locate associated CPL_RTE_DELETE_RPL. |

| Field | Type | Description |
|---|---|---|
| L2T_LUT_BASE | unsigned | This value should be equal to the TP_TCAM_ROUT_BASE/2048, or the top 11 bits of the 22-bit TP_TCAM_ROUT_BASE register value. |

| Field | Type | Description |
|---|---|---|
| L2T_LUT_IX | Range<br>MIN  0<br>MAX  0x7FF | This is the index or relative address of the Entry in Routing Table portion of TCAM (and L2T_LUT table) to be invalidated.<br>This index concatenated with the L2T_LUT_BASE forms a 22-bit physical address for an Entry in TCAM Routing Region. |

CPL_RTE_DELETE_RPL

TABLE 35

CPL_RTE_DELETE_RPL
term->core :: Reply of CPL_RTE_DELETE_REQ

| Flit | Field | Type |
|---|---|---|
| 0 | 63:56 | 0xC1 |
| 0 | 55:32 | Atid |
| 0 | 31:24 | Status |
| 0 | 23:0 | Reserved |

Command Description

This is the reply of CPL_RTE_DELETE_REQ command.

Selected Field Descriptions:

The Atid is echoed back from the CPL_RTE_DELETE_REQ command that triggered this reply.

| Field | Type | Description |
|---|---|---|
| status | unsigned | Status of the received bytes. (See Error Code definition in Section 0)<br>0: success<br>1: TCAM parity error<br>99: general error |

CPL_RTE_WRITE_REQ

TABLE 36

CPL_RTE_WRITE_REQ
core->term :: Write to Routing TCAM and/or LUT

| Flit | Field | Type |
|---|---|---|
| 0 | 63:56 | 0xC2 |
| 0 | 55:32 | Atid |
| 0 | 31:30 | Control |
| 0 | 29:19 | L2T_LUT_BASE |
| 0 | 18:8 | L2T_LUT_IX |
| 0 | 7:0 | L2T_IX |

TABLE 36-continued

CPL_RTE_WRITE_REQ
core->term :: Write to Routing TCAM and/or LUT

| Flit | Field | Type |
|---|---|---|
| 1 | 63:32 | NETMASK |
| 1 | 31:0 | FADDR (foreign IP address) |

Command Description

The control plane sends CPL_RTE_WRITE_REQ to change either a line in the TCAM, a line in the L2T_LUT table, or both. If both the TCAM and L2T_LUT are being changed, then the writes are performed in an atomic way so that no other process will read mixtures of old and new versions of the TCAM and L2T_LUT. Command will return CPL_RTE_WRITE_RPL on completion.

Programmer can use this command to update TCAM and/or L2T_LUT table, and use CPL_L2T_WRITE_REQ to update L2T table independently. However, if to create a brand new routing entry which involves writing all of the L2T table, L2T_LUT table, and TCAM, then programmer issues CPL_L2T_WRITE_REQ before CPL_RTE_WRITE_REQ to provide the integrity.

Selected Field Descriptions:

| Field | Type | Description |
|---|---|---|
| Atid | Range (0x0-0xFFFFFF) | Control plane selected ID that is used by control plane to locate associated CPL_RTE_WRITE_RPL. |

| Field | Type | Description |
|---|---|---|
| Control | 2-bit mask | If bit is set, perform the write, if clear don't:<br>bit 0: Write the FADDR and NETMASK to the TCAM at L2T_LUT_IX.<br>bit 1: Write the L2T_IX to the L2T_LUT at L2T_LUT_IX |

| Field | Type | Description |
|---|---|---|
| L2T_IX | Range<br>MIN  1<br>MAX  0xFF | Value to put into L2T_LUT at L2T_LUT_IX.<br>Note: value of 0 in L2T_LUT_IX indicates an invalid routing entry. |

| Field | Type | Description |
|---|---|---|
| L2T_LUT_BASE | unsigned | This value should be equal to the TP_TCAM_ROUT_BASE/2048, or the top 11 bits of the 22-bit TP_TCAM_ROUT_BASE register value. |

| Field | Type | Description |
|---|---|---|
| L2T_LUT_IX | Range MIN 0 MAX 0x7FF | Line in Routing Table portion of TCAM to write FADDR and NETMASK into and also the line in the L2T_LUT to write the L2T_IX into. |

| Field | Type | Description |
|---|---|---|
| NETMASK | 32-bit Mask | If FADDR is full 32-bit address, this should be all one's, indicating all bits are significant. If FADDR is a subnet, then the host part of the mask should be set zeros (don't care), and upper network bits should be set to all ones (care). |

| Field | Type | Description |
|---|---|---|
| FADDR | 32-bit Foreign IP or subnet | IP or subnet to put in TCAM at L2T_LUT_IX |

CPL_RTE_WRITE_RPL

TABLE 37

CPL_RTE_WRITE_RPL
CPL_RTE_WRITE_RPL
term->core :: Reply of CPL_RTE_WRITE_REQ

| Flit | Field | Type |
|---|---|---|
| 0 | 63:56 | 0xD3 |
| 0 | 55:32 | Atid |
| 0 | 31:24 | Status |
| 0 | 23:0 | reserved |

Command Description

This is the reply of CPL_RTE_WRITE_REQ command. The command execution status is returned in Status field.

Selected Field Descriptions:

The Atid field is the same as for the original CPL_RTE_WRITE_REQ command.

| Field | Type | Description |
|---|---|---|
| status | unsigned | Status of the received bytes. (See Error Code definition in Section 0) 0: success 1: TCAM parity error 99: general error |

CPL_RTE_READ_REQ

TABLE 38

CPL_RTE_READ_REQ
CPL_RTE_READ_REQ
core->term :: Read from Routing Table in TCAM and LUT

| Flit | Field | Type |
|---|---|---|
| 0 | 63:56 | 0xC3 |
| 0 | 55:32 | Atid |
| 0 | 31:31 | Select |
| 0 | 30:30 | reserved |
| 0 | 29:19 | L2T_LUT_BASE |
| 0 | 18:8 | L2T_LUT_IX |
| 0 | 7:0 | reserved |

Command Description

The control plane sends CPL_RTE_READ_REQ to read a line the Routing Table portion of the TCAM and its associated L2T_LUT entry, which is addressed by L2T_LUT_BASE concatenated with L2T_LUT_IX. The reads are performed in an atomic way to guarantee that fields from different components of routing hardware are consistent. This command will return CPL_RTE_READ_RPL on completion.

The 'select' bit is used to indicate whether reading destination IP (FADDR) in TCAM plus L2T_IX in L2T_LUT table or the destination subnet mask in TCAM. If want to read both FADDR and NETMASK in TCAM, then two CPL_RTE_READ_REQs are needed.

Selected Field Descriptions:

| Field | Type | Description |
|---|---|---|
| Atid | Range (0x0-0xFFFFFF) | Control plane selected ID that is used by control plane to locate associated CPL_RTE_READ_RPL. |

| Field | Type | Description |
|---|---|---|
| select | unsigned | 0: read FADDR in TCAM and L2T_IX in L2T_LUT. 1: read NETMASK in TCAM |

| Field | Type | Description |
|---|---|---|
| L2T_LUT_BASE | unsigned | This value should be equal to the TP_TCAM_ROUT_BASE / 2048, or the top 11 bits of the 22-bit TP_TCAM_ROUT_BASE register value. |

| Field | Type | Description |
|---|---|---|
| L2T_LUT_IX | Range MIN 0 MAX 0x7FF | The line in the L2T_LUT to read. |

CPL_RTE_READ_RPL

TABLE 39

CPL_RTE_READ_RPL
CPL_RTE_READ_RPL
term->core :: Reply of CPL_RTE_READ_REQ

| Flit | Field | Type |
|---|---|---|
| 0 | 63:56 | 0xC4 |
| 0 | 55:32 | Atid |
| 0 | 31:24 | Status |
| 0 | 23:8 | reserved |
| 0 | 7:0 | L2T_IX |
| 1 | 63:63 | Select |
| 1 | 62:32 | Reserved |
| 1 | 31:0 | FADDR or NETMASK |

Command Description

This is the reply of CPL_RTE_READ_REQ command. This commands returns the FADDR read from TCAM and L2T_IX read from L2T_LUT table or NETMASK read from TCAM.

The 'select' is echoed from the original CPL_RTE_READ_REQ. If select=0, this CPL_RTE_READ_RPL returns L2T_IX and FADDR. Otherwise, it returns the NETMASK.

Note: a L2T_LUT entry value L2T_IX=0 indicates an invalid routing entry.

Selected Field Descriptions:

The Atid field is the same as for the original CPL_RTE_READ_REQ command.

| Field | Type | Description |
|---|---|---|
| status | unsigned | Status of the received bytes. (See Error Code definition in Section 0)<br>0: success<br>1: TCAM error<br>18: invalid routing entry<br>99: general error |

| Field | Type | Description |
|---|---|---|
| select | unsigned | 0: returns FADDR and L2T_IX<br>1: returns NETMASK |

See the CPL_RTE_WRITE_REQ command for descriptions of other fields.

CPL_L2T_WRITE_REQ

TABLE 40

CPL_L2T_WRITE_REQ
CPL_L2T_WRITE_REQ
core->term :: Write to the L2T

| Flit | Field | Type |
|---|---|---|
| 0 | 63:56 | 0xC5 |
| 0 | 55:32 | Atid |
| 0 | 31:24 | reserved |
| 0 | 23:20 | INT |
| 0 | 19:8 | VLAN |
| 0 | 7:0 | L2T_IX |

TABLE 40-continued

CPL_L2T_WRITE_REQ
CPL_L2T_WRITE_REQ
core->term :: Write to the L2T

| Flit | Field | Type |
|---|---|---|
| 1 | 63:48 | reserved |
| 1 | 47:0 | DMAC |

Command Description

The control plane sends CPL_L2T_WRITE_REQ to write a line in the L2T. The writes are performed in an atomic way so that no process will ever read mixtures of old and new versions of the INT, VLAN, and DMAC. Command will return CPL_L2T_WRITE_RPL on completion.

In response to this command, Terminator will write DMAC, INT, and VLAN Tag, into the routing hardware L2T table entry indexed by L2T_IX.

Programmer can use this command to update L2T table, and use CPL_RTE_WRITE_REQ to update TCAM and/or L2T_LUT table independently. However, to create a brand new routing entry which involves writing all of the L2T table, L2T_LUT table, and TCAM, then programmer issues CPL_L2T_WRITE_REQ before CPL_RTE_WRITE_REQ to provide the integrity.

Selected Field Descriptions:

| Field | Type | | Description |
|---|---|---|---|
| Atid | Range<br>(0x0-0xFFFFFF) | | Control plane selected ID that is used by control plane to locate associated CPL_L2T_WRITE_RPL. |

| Field | Type | | Description |
|---|---|---|---|
| L2T_IX | Range | | The line in the L2T to write to. |
| | MIN | 1 | Note: value of 0 is invalid here. |
| | MAX | 0xFF | |

| Field | Type | | Description |
|---|---|---|---|
| INT | Range | | Interface to send segment out. Also used by |
| | MIN | 0 | hardware to select line in SMT table when |
| | MAX | 9 | transmitting segments on this interface. See the CPL_SMT_WRITE_REQ command for more details. |

| Field | Type | | Description |
|---|---|---|---|
| VLAN | Range | | If 0, then no VLAN configured. In this case, if |
| | MIN | 0 | 802.1p priority bits are non-zero, then the |
| | MAX | 0xFFF | 4-byte VLAN tag is still inserted, with the 12-bit VLAN = 0. If 802.1p bits are zero, then the 4-byte VLAN tag is not inserted in the |

-continued

| Field | Type | Description |
|---|---|---|
| | | Ether header.<br>If non 0 or 0xFFF, then this is a valid VLAN tag, which will be inserted in the egress Ether header. |

| Field | Type | Description |
|---|---|---|
| DMAC | 48-bit DMAC address | Destination MAC Address to put in L2T at L2T_IX |

CPL_L2T_WRITE_RPL

TABLE 41

CPL_L2T_WRITE_RPL
term->core :: Reply of CPL_L2T_WRITE_REQ

| Flit | Field | Type |
|---|---|---|
| 0 | 63:56 | 0xD4 |
| 0 | 55:32 | Atid |
| 0 | 31:24 | status |
| 0 | 23:0 | reserved |

Command Description

This is the reply of CPL_L2T_WRITE_REQ command. The status of the command is returned in "status" field.

Selected Field Descriptions:

The Atid is the same as for the original CPL_L2T_WRITE_REQ command.

| Field | Type | Description |
|---|---|---|
| status | Unsigned | See Error Code definition in Section 0<br>0: success<br>16: memory error<br>99: general error |

CPL_L2T_READ_REQ

TABLE 42

CPL_L2T_READ_REQ
core->term :: Read from L2T

| Flit | Field | Type |
|---|---|---|
| 0 | 63:56 | 0xC6 |
| 0 | 55:32 | Atid |
| 0 | 31:8 | Reserved |
| 0 | 7:0 | L2T_IX |

Command Description

The control plane sends CPL_L2T_READ_REQ to read a line in the L2T at L2T_IX. The reads are performed in an atomic way so fields from different components of the L2T are consistent. The Terminator will return CPL_L2T_READ_RPL on completion.

Selected Field Descriptions:

| Field | Type | Description |
|---|---|---|
| Atid | Range (0x0-0xFFFFFF) | Control plane selected ID used by control plane to locate associated CPL_RTE_READ_RPL. |

| Field | Type | Description |
|---|---|---|
| L2T_IX | Range<br>MIN 1<br>MAX 0xFF | The line in the L2T to read.<br>Note: value of 0 is invalid here. |

CPL_L2T_READ_RPL

TABLE 43

CPL_L2T_READ_RPL
term->core :: Reply of CPL_L2T_READ_REQ

| Flit | Field | Type |
|---|---|---|
| 0 | 63:56 | 0xC7 |
| 0 | 55:32 | Atid |
| 0 | 31:24 | status |
| 0 | 23:20 | INT |
| 0 | 19:8 | VLAN |
| 0 | 7:0 | reserved |
| 1 | 63:48 | reserved |
| 1 | 47:0 | DMAC |

Command Description

This is the reply of CPL_L2T_READ_REQ command. This command returns the DMAC, INT, and VLAN Tag, fields read from the L2T table.

Selected Field Descriptions:

The Atid field is the same as for the original CPL_L2T_READ_REQ command.

| Field | Type | Description |
|---|---|---|
| status | Unsigned | See Error Code definition in Section 0<br>0: success<br>16: memory error<br>99: general error |

See the CPL_L2T_WRITE_REQ command for descriptions of other fields.

CPL_SMT_WRITE_REQ

TABLE 44

CPL_SMT_WRITE
core->term :: Write to the SMT

| Flit | Field | Type |
|---|---|---|
| 0 | 63:56 | 0xC8 |
| 0 | 55:32 | Atid |
| 0 | 31:24 | reserved |
| 0 | 23:20 | INT |
| 0 | 19:17 | MAX_MTU_IX |
| 0 | 16:0 | reserved |
| 1 | 63:48 | reserved |

TABLE 44-continued

CPL_SMT_WRITE
core->term :: Write to the SMT

| Flit | Field | Type |
| --- | --- | --- |
| 1 | 47:0 | SMAC1 |
| 2 | 63:48 | reserved |
| 2 | 47:0 | SMAC0 |

Command Description

The control plane sends CPL_SMT_WRITE_REQ to change the SMT, (Source Mac Table). The writes are performed in an atomic way so that no other process will read mixtures of old and new versions of SMAC0, SMAC1 and MAX_MTU_IX. Command will return CPL_SMT_WRITE_RPL on completion.

In response to this command, Terminator will write to the appropriate routing hardware SMT table.

Selected Field Descriptions:

| Field | Type | Description |
| --- | --- | --- |
| Atid | Range (0x0-0xFFFFFF) | Control plane selected ID used by control plane to locate associated CPL_SMT_WRITE_RPL. |

| Field | Type | Description |
| --- | --- | --- |
| INT | Range MIN 0 MAX 9 | Specified the Line in the SMT. Each line in SMT is associated with one physical Interface on Terminator card. |

| Field | Type | Description |
| --- | --- | --- |
| MAX_MTU_IX | Range MIN 0 MAX 7 | Index into the Max MTU table. The Max MTU table is programmed with 8 possible MTU values. The combination of this index with its associated entry in Max MTU table will select the value that is sent out by Terminator in its TCP MSS option (minus appropriate header size). |

| Field | Type | Description |
| --- | --- | --- |
| SMAC0 | 48-bit SMAC address | Source MAC Address to put in SMT column 0 at TNT. This value will be used as source MAC if TCB SM_SEL == 0 (the SM_SEL is set in Option 0 defined in 0). |

| Field | Type | Description |
| --- | --- | --- |
| SMAC1 | 48-bit SMAC address | Source MAC Address to put in SMT column 1 at INT. This is used as source MAC if TCB SM_SEL = 1. |

CPL_SMT_WRITE_RPL

TABLE 45

CPL_SMT_WRITE_RPL
term->core :: Reply of CPL_SMT_WRITE_REQ

| Flit | Field | Type |
| --- | --- | --- |
| 0 | 63:56 | 0xD5 |
| 0 | 55:32 | Atid |
| 0 | 31:24 | status |
| 0 | 23:0 | reserved |

Command Description

This is the reply of CPL_SMT_WRITE_REQ command. The status of the command is returned in the "status" field.

Selected Field Descriptions:

The Atid field is the same as for the original CPL_SMT_WRITE_REQ.

| Field | Type | Description |
| --- | --- | --- |
| status | Unsigned | See Error Code definition in Section 0 0: success 16: memory error 99: general error |

CPL_SMT_READ_REQ

TABLE 46

CPL_SMT_READ_REQ
CPL_SMT_READ_REQ
core->term :: Read from SMT

| Flit | Field | Type |
| --- | --- | --- |
| 0 | 63:56 | 0xC9 |
| 0 | 55:32 | Atid |
| 0 | 31:24 | reserved |
| 0 | 23:20 | INT |
| 0 | 19:0 | reserved |

Command Description

The control plane sends CPL_SMT_READ_REQ to read a line in the SMT (Source MAC Table) at index of INT. The reads are performed in an atomic way to guarantee that fields from different components of the SMT are consistent. This command will return CPL_SMT_READ_RPL on completion.

Selected Field Descriptions:

| Field | Type | Description |
| --- | --- | --- |
| Atid | Range (0x0 – 0xFFFFFF) | Control plane selected ID used by control plane to locate associated CPL_SMT_READ_RPL. |

| Field | Type | Description |
|---|---|---|
| INT | Range | The line in the SMT to read. |
|  | MIN 0 |  |
|  | MAX 9 |  |

CPL_SMT_READ_RPL

TABLE 47

CPL_SMT_READ_RPL
CPL_SMT_READ_RPL
term->core :: ACK of CPL_SMT_READ_REQ

| Flit | Field | Type |
|---|---|---|
| 0 | 63:56 | 0xCA |
| 0 | 55:32 | Atid |
| 0 | 31:24 | Status |
| 0 | 23:20 | Reserved |
| 0 | 19:17 | MAX_MTU_IX |
| 0 | 16:0 | Reserved |
| 1 | 63:48 | Reserved |
| 1 | 47:0 | SMAC1 |
| 2 | 63:48 | Reserved |
| 2 | 47:0 | SMAC0 |

Command Description

This is the ACK of the CPL_SMT_READ_REQ command. This command returns the SMAC0, SMAC1, and MAX_MTU_IX fields read from the SMT table.

Selected Field Descriptions:
The Atid is the same as for the original CPL_SMT_READ_REQ command.

| Field | Type | Description |
|---|---|---|
| status | Unsigned | See Error Code definition in Section 0 |
|  |  | 0: success |
|  |  | 16: memory error |
|  |  | 99: general error |

See the CPL_SMT_WRITE_REQ command for descriptions of other fields.

CPL_ARP_MISS_REQ

TABLE 48

CPL_ARP_MISS_REQ
CPL_ARP_MISS_REQ
term->core :: Terminator could not route outgoing segment

| Flit | Field | Type |
|---|---|---|
| 0 | 63:56 | 0xCD |
| 0 | 55:32 | Tid |
| 0 | 31:0 | FADDR(foreign IP address) |
| 1 | 63:48 | Reason |
| 1 | 47:0 | Reserved |

Command Description

Terminator sends this request to the control plane when it is unable to route an egress segment. This can occur because of:
A TCAM lookup failure
The cached L2T_IX has become stale (i.e. L2T_IX=0)
The FADDR is unreachable
The control plane wants to control routing directly for this FADDR.

The reason field can be used to help determine the cause of the ARP miss request and to optimize processing of the request.

When core software receives one of these messages, it should:
Determine if an ARP request is needed
Send the request
Wait for the reply
Update the routing hardware
Send the CPL_ARP_MISS_RPL message so the connection can resume.

The control plane also has the option of responding to this by calling CPL_SET_TCB_FIELD to set the TCAM_BYPASS mode and set the L2T_IX directly in TCB. After calling CPL_SET_TCB_FIELD, the control plane must then send a CPL_ARP_MISS_RPL to resume the connection.

This message may also be received in cases where the FADDR is not reachable, and in these cases the control plane will respond by aborting the connection.

In one special case, receiving a SYN in AUTO mode, Terminator will not yet have allocated a TID for the connection. In this case, Terminator will send this request with a TID of 0xFFFFFF. When the control plane sees TID=0xFFFFFF, it will resolve the ARP and update the routing hardware, but it will not send a CPL_ARP_MISS_RPL back to Terminator, as there is no connection to resume. When the remote TCP stack resends the SYN, Terminator will now be able to send back a SYN/ACK segment automatically.

Selected Field Descriptions:

| Field | Type | Description |
|---|---|---|
| Tid | Unsigned | The connection tag used by Terminator to identify which connection is unable to route its egress segments. A value of 0xFFFFFF indicates we received a SYN in AUTO mode and dropped the segment. |

| Field | Type | Description |
|---|---|---|
| FADDR | 32-bit IP address | The foreign IP address that caused the ARP miss in Terminator's L2 table. |

| Field | Type | Description |
|---|---|---|
| Reason | Unsigned | 0: TCAM miss, i.e., the FADDR is unreachable. |
|  |  | 1: TCAM hit, but TCAM lookup returned L2T_IX==0, i.e., there is no valid entry in Terminator L2T table for this FADDR. |

CPL_ARP_MISS_RPL

TABLE 49

| | CPL_ARP_MISS_RPL CPL_ARP_MISS_RPL core->term :: Restart connection after CPL_ARP_MISS_REQ | |
|---|---|---|
| Flit | Field | Type |
| 0 | 63:56 | 0xCE |
| 0 | 55:32 | Tid |
| 0 | 31:0 | reserved |

Command Description

The control plane sends this command as a reply to a CPL_ARP_MISS_REQ. The control plane sends this after it has either updated the routing hardware or determined that the routing hardware will now yield an appropriate DMAC, and it has updated the TCB cached L2T_IX value. When Terminator receives this command, it will attempt transmitting an appropriate segment to the remote TCP, depending on the connection state.

The control plane sends this CPL_ARP_MISS_RPL to Terminator only if TID is not equal to 0xFFFFFF.

Selected Field Descriptions:

| Field | Type | Description |
|---|---|---|
| Tid | Unsigned | Identifies the connection we want to send this command to. |

CPL_ERROR

| | CPL_ERROR term->core :: Terminator informs control plane an error occurred | |
|---|---|---|
| Flit | Field | Type |
| 0 | 63:56 | 0xD7 |
| 0 | 55:32 | Tid |
| 0 | 31:0 | Error code |

Command Description

Terminator sends this message to control plane when the protocol engine encountered an error. This is a generic unsolicited message sent on errors that need immediate attention from control plane.

Selected Field Descriptions:

| Field | Type | Description |
|---|---|---|
| tid | Unsigned | The connection id to which the error occurred during processing its packet. |

| Field | Type | Description |
|---|---|---|
| Error code | Unsigned | See Error Code definition in Section 0 0: success |

| Field | Type | Description |
|---|---|---|
| | | 1: TCAM parity error ... 99: general error |

What is claimed is:

1. A method of communicating among a producer station and a consumer station in a computer system, comprising:
   in the producer station, maintaining a producer generation indication;
   in the consumer station, maintaining a consumer generation indication;
   in the producer station, writing information, including the producer generation indication maintained in the producer station, into each of at least one entry of a data structure in a memory associated with the computer system; and
   in the consumer station,
      receiving information from each of at least one of the entries of the data structure, and
      processing the received information, including comparing the consumer generation indication maintained in the consumer station to the producer generation indication in that entry to determine whether the information in that entry includes valid information.

2. The method of claim 1, further comprising:
   in the consumer station, consuming information determined to be valid.

3. The method of claim 1, wherein:
   the producer station sequences the producer generation indication such that the producer generation indication written into each particular entry of the data structure a current time is different from the producer generation indication written into that particular entry of the data structure an immediately previous time; and
   the consumer station sequences the consumer generation indication such that the consumer generation indication to which the producer generation indication for each particular entry is compared is different from a previous time valid data is consumed from that particular entry.

4. The method of claim 3, wherein:
   the consumer station sequences the consumer generation indication according to a first predetermined sequence and the producer station sequences the producer generation indication according to a second predetermined sequence.

5. The method of claim 4, wherein:
   the first predetermined sequence corresponds to the second predetermined sequence.

6. The method of claim 5, wherein:
   the first predetermined sequence is identical to the second predetermined sequence.

7. The method of claim 1, wherein the data structure is a queue.

8. The method of claim 2, wherein:
   consuming information determined to be valid includes causing a data transfer of payload data among the producer station and the consumer station based on the information.

9. The method of claim 8, wherein:
consuming information includes:
processing the information determined to be valid to determine parameters of the data transfer.

10. The method of claim 9, wherein:
the data transfer is a direct memory access data transfer; and
the determined parameters are determined parameters associated with the direct memory access data transfer.

11. The method of claim 10, wherein:
the determined parameters associated with the direct memory access data transfer include parameters associated with addresses of memory locations involved in the direct memory access data transfer.

12. The method of claim 8, wherein:
the data transfer of payload data among the producer station and the consumer station based on the information is a data transfer of payload data from the producer station to the consumer station.

13. The method of claim 12, further comprising:
transferring the payload data from the consumer station to a peer station.

14. The method of claim 8, wherein:
the data transfer of payload data among the producer station and the consumer station based on the information is a data transfer of payload data from the consumer station to the producer station.

15. The method of claim 14, further comprising:
transferring the payload data from a peer station to the consumer station.

16. The method of claim 2, further comprising:
providing consumption information from the consumer station to the producer station.

17. The method of claim 16, further comprising:
in the producer station, regulating the step of writing information based on the consumption information provided from the consumer station.

18. The method of claim 1, wherein:
receiving information from each of at least one of the entries of the data structure includes receiving the information via a direct memory access.

19. The method of claim 1, further comprising:
in the consumer station, entering a sleep mode if none of the received information is determined to be valid.

20. The method of claim 19, further comprising:
providing an indication of the sleep mode from the consumer station to the host station.

21. The method of claim 20, further comprising:
in the producer station, when the consumer station is in sleep mode, causing a wakeup indication to be provided to the consumer station in correspondence with writing the information into the data structure in the memory.

22. The method of claim 21, wherein:
providing a wakeup indication includes the producer station writing to a register to cause the wakeup indication to be provided to the consumer station.

23. The method of claim 21, further comprising:
in the consumer station, upon receiving the wakeup indication, again receiving information from each of at least one of the entries of the data structure, and processing the received information.

24. A method of communicating among a host station and a scatter gather engine (SGE) station, comprising:
in the host station, maintaining a host generation indication;
in the SGE station, maintaining an SGE generation indication;
in the host station, writing information, including the host generation indication maintained in the host station, into an entry of a data structure in a memory associated with the host station; and
in the SGE station,
receiving information from each of at least one of the entries of the data structure, and
processing the received information, including comparing the SGE generation indication maintained in the SGE station to the host generation indication in the entry to determine whether the information in that entry includes valid information.

25. The method of claim 24, further comprising:
in the SGE station, consuming information determined to be valid.

26. The method of claim 24, wherein:
the host station sequences the host generation indication such that the host generation indication written into each particular entry of the data structure a current time is different from the host generation indication written into that particular entry of the data structure an immediately previous time; and
the SGE station sequences the SGE generation indication such that the SGE generation indication to which the host generation indication for each particular entry is compared is different from a previous time valid data is consumed from that particular entry.

27. The method of claim 26, wherein:
the SGE station sequences the SGE generation indication according to a first predetermined sequence and the host station sequences the host generation indication according to a second predetermined sequence.

28. The method of claim 27, wherein:
the first predetermined sequence corresponds to the second predetermined sequence.

29. The method of claim 28, wherein:
the first predetermined sequence is identical to the second predetermined sequence.

30. The method of claim 24, wherein the data structure is a queue.

31. The method of claim 25, wherein:
consuming information determined to be valid includes causing a data transfer of payload data among the host station and the SGE station based on the information.

32. The method of claim 31, wherein:
consuming information includes processing the information determined to be valid to determine parameters of the data transfer.

33. The method of claim 32, wherein:
the data transfer is a direct memory access data transfer; and
the determined parameters are determined parameters associated with the direct memory access data transfer.

34. The method of claim 32, wherein:
the determined parameters associated with the direct memory access data transfer include parameters associated with addresses of memory locations involved in the direct memory access data transfer.

35. The method of claim 31, wherein:
the data transfer of payload data among the host station and the SGE station based on the information is a data transfer of payload data from the host station to the SGE station.

36. The method of claim 35, further comprising:
transferring the payload data from the SGE station to a peer station.

37. The method of claim 31, wherein:

the data transfer of payload data among the host station and the SGE station based on the information is a data transfer of payload data from the SGE station to the host station.

38. The method of claim 37, further comprising:

transferring the payload data from a peer station to the SGE station.

39. The method of claim 25, further comprising:

providing consumption information from the SGE station to the host station.

40. The method of claim 39, further comprising:

in the host station, regulating the step of writing information based on the consumption information provided from the SGE station.

41. The method of claim 24, wherein:

receiving information from each of at least one of the entries of the data structure includes receiving the information via a direct memory access.

42. The method of claim 24, further comprising:

in the SGE station, entering a sleep mode if none of the received information is determined to be valid.

43. The method of claim 42, further comprising:

providing an indication of the sleep mode from the SGE station to the host station.

44. The method of claim 43, further comprising:

in the host station, when the SGE station is in sleep mode, causing a wakeup indication to be provided to the SGE station in correspondence with writing the information into the data structure in the memory.

45. The method of claim 44, wherein:

providing a wakeup indication includes the host station writing to a register to cause the wakeup indication to be provided to the SGE station.

46. The method of claim 44, further comprising:

in the SGE station, upon receiving the wakeup indication, again receiving information from each of at least one of the entries of the data structure, and processing the received information.

\* \* \* \* \*